US008065337B2

(12) United States Patent
Furusho

(10) Patent No.: US 8,065,337 B2
(45) Date of Patent: Nov. 22, 2011

(54) SHARED-MEMORY MULTIPROCESSOR SYSTEM AND METHOD FOR PROCESSING INFORMATION

(75) Inventor: Shinji Furusho, Kanagawa (JP)

(73) Assignee: Turbo Data Laboratories, Inc., Kanagawa (JP)

( * ) Notice: Subject to any disclaimer, the term of this patent is extended or adjusted under 35 U.S.C. 154(b) by 0 days.

(21) Appl. No.: 12/856,429

(22) Filed: Aug. 13, 2010

(65) Prior Publication Data

US 2010/0312802 A1 Dec. 9, 2010

Related U.S. Application Data

(62) Division of application No. 11/883,264, filed as application No. PCT/JP2006/310110 on May 22, 2006, now Pat. No. 7,801,903.

(30) Foreign Application Priority Data

May 24, 2005 (JP) .................................. 2005-150604

(51) Int. Cl.
*G06F 7/00* (2006.01)
*G06F 17/30* (2006.01)
(52) U.S. Cl. ........ 707/796; 707/801; 709/213; 711/148; 712/16; 719/318
(58) Field of Classification Search .......... 707/600–831; 709/213; 711/114, 147, 148, 153, 165, 170, 711/173; 712/16, 220; 719/318
See application file for complete search history.

(56) References Cited

U.S. PATENT DOCUMENTS

| 5,842,207 | A | 11/1998 | Fujiwara et al. | 707/7 |
| 6,643,644 | B1 | 11/2003 | Furusho | 707/5 |
| 6,886,082 | B1 * | 4/2005 | Furusho | 711/154 |
| 7,890,705 | B2 * | 2/2011 | Furusho | 711/147 |
| 2006/0265379 | A1 | 11/2006 | Furusho | 707/10 |
| 2007/0174843 | A1 * | 7/2007 | Furusho | 719/318 |

FOREIGN PATENT DOCUMENTS

| JP | 5-242049 A | 9/1993 |
| WO | 00/10103 | 2/2000 |
| WO | 2004/092948 A1 | 10/2004 |

OTHER PUBLICATIONS

Kunieda H et al., Effective processor array architecture with shared memory, Dec. 5-8, 1994, IEEE, 133-138.*
Agarwal A., Automatic partitioning of parallel loops and data arrays for distributed shared-memory multiprocessors, Sep. 1995, IEEE, vol. 6, 943-962.*
Amato, N.M., "A Comparison of Parallel Sorting Algorithms on Different Architectures," Technical Report, TR98-029, Department of Computer Science and Engineering, Texas A&M University, p. 1-17, Jan. 1996.
Bader, D. A., "SIMPLE: A Methodology for Programming High Performance Algorithms on Clusters of Symmetric Multiprocessors (SMPs)," Journal of Parallel and Distributed Computing, v.58 n.1, p. 92-108, Jul. 1999.

* cited by examiner

*Primary Examiner* — Jean B Fleurantin
(74) *Attorney, Agent, or Firm* — Ladas & Parry, LLP

(57) ABSTRACT

Large-scale table data stored in a shared memory are sorted by a plurality of processors in parallel. According to the present invention, the records subjected to processing are first divided for allocation to the plurality of processors. Then, each processor counts the numbers of local occurrences of the field value sequence numbers associated with the records to be processed. The numbers of local occurrences of the field value sequence numbers counted by each processor is then converted into global cumulative numbers, i.e., the cumulative numbers used in common by the plurality of processors. Finally, each processor utilizes the global cumulative numbers as pointers to rearrange the order of the allocated records.

5 Claims, 45 Drawing Sheets

FIG.2

| RECORD NUMBER | GENDER | AGE | HEIGHT (cm) |
|---|---|---|---|
| 0 | FEMALE | 3 | 78 |
| 1 | MALE | 1 | 82 |
| 2 | FEMALE | 2 | 69 |
| 3 | FEMALE | 1 | 82 |
| 4 | MALE | 3 | 91 |
| 5 | FEMALE | 1 | 76 |
| 6 | FEMALE | 1 | 78 |
| 7 | FEMALE | 2 | 84 |
| 8 | MALE | 3 | 87 |
| 9 | FEMALE | 3 | 80 |

FIG.3

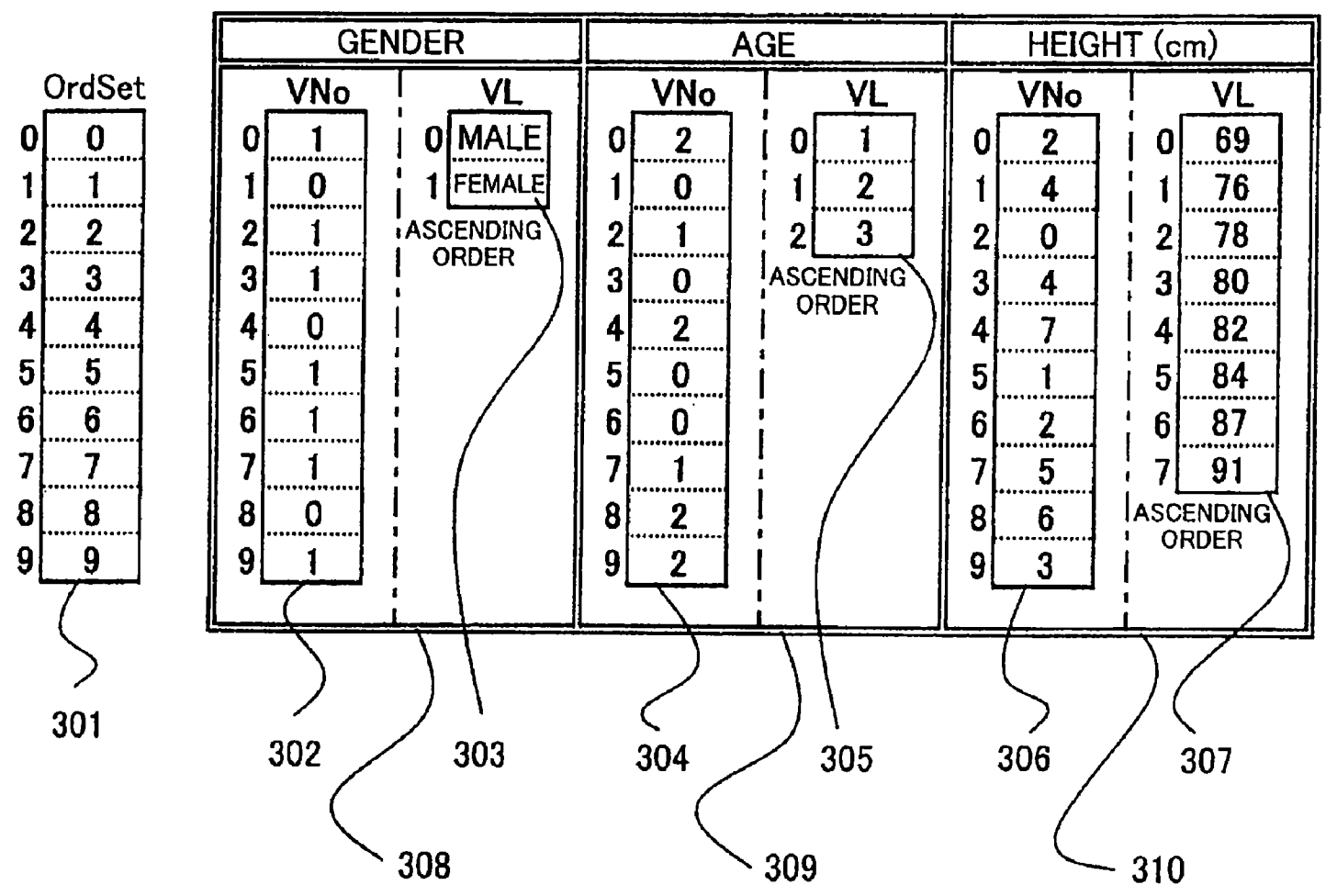

| | GENDER | | AGE | | HEIGHT (cm) | |
|---|---|---|---|---|---|---|
| | VNo | VL | VNo | VL | VNo | VL |
| 0 | 1 | 0 MALE | 2 | 0 1 | 2 | 0 69 |
| 1 | 0 | 1 FEMALE | 0 | 1 2 | 4 | 1 76 |
| 2 | 1 | ASCENDING ORDER | 1 | 2 3 | 0 | 2 78 |
| 3 | 1 | | 0 | ASCENDING ORDER | 4 | 3 80 |
| 4 | 0 | | 2 | | 7 | 4 82 |
| 5 | 1 | | 0 | | 1 | 5 84 |
| 6 | 1 | | 0 | | 2 | 6 87 |
| 7 | 1 | | 1 | | 5 | 7 91 |
| 8 | 0 | | 2 | | 6 | ASCENDING ORDER |
| 9 | 1 | | 2 | | 3 | |

302 — 303 — 308
304 — 305 — 309
306 — 307 — 310

OrdSet: 0,1,2,3,4,5,6,7,8,9 — 301

FIG.6

| OrdSet | |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 16 |
| 17 | 17 |
| 18 | 18 |
| 19 | 19 |

CPU-0: 0–4, CPU-1: 5–9, CPU-2: 10–14, CPU-3: 15–19

| AGE | VNo |
|---|---|
| 0 | 1 |
| 1 | 3 |
| 2 | 4 |
| 3 | 0 |
| 4 | 1 |
| 5 | 2 |
| 6 | 0 |
| 7 | 3 |
| 8 | 0 |
| 9 | 2 |
| 10 | 1 |
| 11 | 0 |
| 12 | 4 |
| 13 | 1 |
| 14 | 0 |
| 15 | 2 |
| 16 | 3 |
| 17 | 1 |
| 18 | 4 |
| 19 | 1 |

| | VL |
|---|---|
| 0 | 16 |
| 1 | 18 |
| 2 | 20 |
| 3 | 21 |
| 4 | 23 |

ASCENDING ORDER

| | Count-0 | Count-1 | Count-2 | Count-3 |
|---|---|---|---|---|
| 0 | 0 | 0 | 0 | 0 |
| 1 | 0 | 0 | 0 | 0 |
| 2 | 0 | 0 | 0 | 0 |
| 3 | 0 | 0 | 0 | 0 |
| 4 | 0 | 0 | 0 | 0 |

PREPARE COUNT ARRAYS (WHOSE ARRAY SIZE IS EQUAL TO SIZE OF VL ARRAY) AS MANY AS THERE ARE PROCESSORS, AND INITIALIZE ARRAY ELEMENTS TO ZERO

SUB-STEP 1

SUB-STEP 2

SUB-STEP 3

SUB-STEP 4

FIG.9A

SUB-STEP 5

STEP-5      AGE

| | | OrdSet | | VNo | | Count-0 | | Count-1 | | Count-2 | | Count-3 |
|---|---|---|---|---|---|---|---|---|---|---|---|---|
| CPU-0 | 0 | 0 | 0 | 1 | 0 | 1 | 0 | 2 | 0 | 1->2 | 0 | 0 |
| | 1 | 1 | 1 | 3 | 1 | 1->2 | 1 | 0 | 1 | 2 | 1 | 1->2 |
| | 2 | 2 | 2 | 4 | 2 | 0 | 2 | 1->2 | 2 | 0 | 2 | 1 |
| | 3 | 3 | 3 | 0 | 3 | 1 | 3 | 1 | 3 | 0 | 3 | 1 |
| | 4 | (4) → | 4 | (1) | 4 | 1 | 4 | 0 | 4 | 1 | 4 | 1 |
| CPU-1 | 5 | 5 | 5 | 2 | | | | | | | | |
| | 6 | 6 | 6 | 0 | | | | | | | | |
| | 7 | 7 | 7 | 3 | | | | | | | | |
| | 8 | 8 | 8 | 0 | | | | | | | | |
| | 9 | (9) → | 9 | (2) | | | | | | | | |
| CPU-2 | 10 | 10 | 10 | 1 | | | | | | | | |
| | 11 | 11 | 11 | 0 | | | | | | | | |
| | 12 | 12 | 12 | 4 | | | | | | | | |
| | 13 | 13 | 13 | 1 | | | | | | | | |
| | 14 | (14) → | 14 | (0) | | | | | | | | |
| CPU-3 | 15 | 15 | 15 | 2 | | | | | | | | |
| | 16 | 16 | 16 | 3 | | | | | | | | |
| | 17 | 17 | 17 | 1 | | | | | | | | |
| | 18 | 18 | 18 | 4 | | | | | | | | |
| | 19 | (19) → | 19 | (1) | | | | | | | | |

FIG.9B

OUTCOME OF COUNT-UP

AGE

| | | OrdSet | | VNo | | Count-0 | | Count-1 | | Count-2 | | Count-3 |
|---|---|---|---|---|---|---|---|---|---|---|---|---|
| CPU-0 | 0 | 0 | 0 | 1 | 0 | 1 | 0 | 2 | 0 | 2 | 0 | 0 |
| | 1 | 1 | 1 | 3 | 1 | 2 | 1 | 0 | 1 | 2 | 1 | 2 |
| | 2 | 2 | 2 | 4 | 2 | 0 | 2 | 2 | 2 | 0 | 2 | 1 |
| | 3 | 3 | 3 | 0 | 3 | 1 | 3 | 1 | 3 | 0 | 3 | 1 |
| | 4 | 4 | 4 | 1 | 4 | 1 | 4 | 0 | 4 | 1 | 4 | 1 |
| CPU-1 | 5 | 5 | 5 | 2 | | | | | | | | |
| | 6 | 6 | 6 | 0 | | | | | | | | |
| | 7 | 7 | 7 | 3 | | | | | | | | |
| | 8 | 8 | 8 | 0 | | | | | | | | |
| | 9 | 9 | 9 | 2 | | | | | | | | |
| CPU-2 | 10 | 10 | 10 | 1 | | | | | | | | |
| | 11 | 11 | 11 | 0 | | | | | | | | |
| | 12 | 12 | 12 | 4 | | | | | | | | |
| | 13 | 13 | 13 | 1 | | | | | | | | |
| | 14 | 14 | 14 | 0 | | | | | | | | |
| CPU-3 | 15 | 15 | 15 | 2 | | | | | | | | |
| | 16 | 16 | 16 | 3 | | | | | | | | |
| | 17 | 17 | 17 | 1 | | | | | | | | |
| | 18 | 18 | 18 | 4 | | | | | | | | |
| | 19 | 19 | 19 | 1 | | | | | | | | |

FIG.10A

CONVERSION INTO CUMULATIVE NUMBERS WITH HORIZONTAL DIRECTION FIRST (ASCENDING ORDER SORTING)

| | OrdSet | AGE VNo | | | | | |
|---|---|---|---|---|---|---|---|
| | | | | START Count-0 ⤳ Count-1 ⤳ Count-2 ⤳ Count-3 | | | |
| CPU-0 | 0 | 0 | 1 | CPU-0 ⇒ (1) 1→0 | (2) 2→1 | (3) 2→3 | (4) 0→5 ⇒ (5) |
| | 1 | 1 | 3 | | | | |
| | 2 | 2 | 4 | | | | |
| | 3 | 3 | 0 | | | | |
| | 4 | 4 | 1 | | | | |
| CPU-1 | 5 | 5 | 2 | CPU-1 (5) 2→5 | (6) 0→7 | (7) 2→7 | (8) 2→9 ⇒ (9) |
| | 6 | 6 | 0 | | | | |
| | 7 | 7 | 3 | | | | |
| | 8 | 8 | 0 | | | | |
| | 9 | 9 | 2 | | | | |
| CPU-2 | 10 | 10 | 1 | CPU-2 (9) 0→11 | (10) 2→11 | (11) 0→13 | (12) 1→13 ⇒ (13) |
| | 11 | 11 | 0 | | | | |
| | 12 | 12 | 4 | | | | |
| | 13 | 13 | 1 | | | | |
| | 14 | 14 | 0 | | | | |
| CPU-3 | 15 | 15 | 2 | CPU-3 (13) 1→14 | (14) 1→15 | (15) 0→16 | (16) 1→16 ⇒ (17) |
| | 16 | 16 | 3 | | | | |
| | 17 | 17 | 1 | (17) 1→17 | (18) 0→18 | (19) 1→18 | (20) 1→19 ⇒ END |
| | 18 | 18 | 4 | | | | |
| | 19 | 19 | 1 | | | | |

FIG.10B

ORDER AND RESULT OF CONVERSION INTO CUMULATIVE NUMBERS

| | | |
|---|---|---|
| (1) Count-0: 0 | 1 | 1→0 |
| (2) Count-1: 0 | 2 | 2→1 |
| (3) Count-2: 0 | 2 | 2→3 |
| (4) Count-3: 0 | 0 | 0→5 |
| (5) Count-0: 1 | 2 | 2→5 |
| (6) Count-1: 1 | 0 | 0→7 |
| (7) Count-2: 1 | 2 | 2→7 |
| (8) Count-3: 1 | 2 | 2→9 |
| (9) Count-0: 2 | 0 | 0→11 |
| (10) Count-1: 2 | 2 | 2→11 |
| (11) Count-2: 2 | 0 | 0→13 |
| (12) Count-3: 2 | 1 | 1→13 |
| (13) Count-0: 3 | 1 | 1→14 |
| (14) Count-1: 3 | 1 | 1→15 |
| (15) Count-2: 3 | 0 | 0→16 |
| (16) Count-3: 3 | 1 | 1→16 |
| (17) Count-0: 4 | 1 | 1→17 |
| (18) Count-1: 4 | 0 | 0→18 |
| (19) Count-2: 4 | 1 | 1→18 |
| (20) Count-3: 4 | 1 | 1→19 |
| | | →20 |

SUB-STEP 1

SUB-STEP 2

SUB-STEP 3

SUB-STEP 4

SUB-STEP 5

OUTCOME OF TRANSFER

| | OrdSet' |
|---|---|
| 0 | 3 |
| 1 | 6 |
| 2 | 8 |
| 3 | 11 |
| 4 | 14 |
| 5 | 0 |
| 6 | 4 |
| 7 | 10 |
| 8 | 13 |
| 9 | 17 |
| 10 | 19 |
| 11 | 5 |
| 12 | 9 |
| 13 | 15 |
| 14 | 1 |
| 15 | 7 |
| 16 | 16 |
| 17 | 2 |
| 18 | 12 |
| 19 | 18 |

FIG.14A

AGE 16

| | OrdSet' |
|---|---|
| 0 | 3 |
| 1 | 6 |
| 2 | 8 |
| 3 | 11 |
| 4 | 14 |
| 5 | 0 |
| 6 | 4 |
| 7 | 10 |
| 8 | 13 |
| 9 | 17 |
| 10 | 19 |
| 11 | 5 |
| 12 | 9 |
| 13 | 15 |
| 14 | 1 |
| 15 | 7 |
| 16 | 16 |
| 17 | 2 |
| 18 | 12 |
| 19 | 18 |

| | AGE | AREA |
|---|---|---|
| 0 | 18 | Tokyo |
| 1 | 21 | Chiba |
| 2 | 23 | Yoko |
| 3 | 16 | Chiba |
| 4 | 18 | Saita |
| 5 | 20 | Yoko |
| 6 | 16 | Tokyo |
| 7 | 21 | Tokyo |
| 8 | 16 | Chiba |
| 9 | 20 | Saita |
| 10 | 18 | Yoko |
| 11 | 16 | Yoko |
| 12 | 23 | Saita |
| 13 | 18 | Chiba |
| 14 | 16 | Tokyo |
| 15 | 20 | Saita |
| 16 | 21 | Yoko |
| 17 | 18 | Tokyo |
| 18 | 23 | Chiba |
| 19 | 18 | Yoko |

FIG.14B

AGE 18

| | OrdSet' |
|---|---|
| 0 | 3 |
| 1 | 6 |
| 2 | 8 |
| 3 | 11 |
| 4 | 14 |
| 5 | 0 |
| 6 | 4 |
| 7 | 10 |
| 8 | 13 |
| 9 | 17 |
| 10 | 19 |
| 11 | 5 |
| 12 | 9 |
| 13 | 15 |
| 14 | 1 |
| 15 | 7 |
| 16 | 16 |
| 17 | 2 |
| 18 | 12 |
| 19 | 18 |

| | AGE | AREA |
|---|---|---|
| 0 | 18 | Tokyo |
| 1 | 21 | Chiba |
| 2 | 23 | Yoko |
| 3 | 16 | Chiba |
| 4 | 18 | Saita |
| 5 | 20 | Yoko |
| 6 | 16 | Tokyo |
| 7 | 21 | Tokyo |
| 8 | 16 | Chiba |
| 9 | 20 | Saita |
| 10 | 18 | Yoko |
| 11 | 16 | Yoko |
| 12 | 23 | Saita |
| 13 | 18 | Chiba |
| 14 | 16 | Tokyo |
| 15 | 20 | Saita |
| 16 | 21 | Yoko |
| 17 | 18 | Tokyo |
| 18 | 23 | Chiba |
| 19 | 18 | Yoko |

FIG.14C

AGE 20

| | OrdSet' |
|---|---|
| 0 | 3 |
| 1 | 6 |
| 2 | 8 |
| 3 | 11 |
| 4 | 14 |
| 5 | 0 |
| 6 | 4 |
| 7 | 10 |
| 8 | 13 |
| 9 | 17 |
| 10 | 19 |
| 11 | 5 |
| 12 | 9 |
| 13 | 15 |
| 14 | 1 |
| 15 | 7 |
| 16 | 16 |
| 17 | 2 |
| 18 | 12 |
| 19 | 18 |

| | AGE | AREA |
|---|---|---|
| 0 | 18 | Tokyo |
| 1 | 21 | Chiba |
| 2 | 23 | Yoko |
| 3 | 16 | Chiba |
| 4 | 18 | Saita |
| 5 | 20 | Yoko |
| 6 | 16 | Tokyo |
| 7 | 21 | Tokyo |
| 8 | 16 | Chiba |
| 9 | 20 | Saita |
| 10 | 18 | Yoko |
| 11 | 16 | Yoko |
| 12 | 23 | Saita |
| 13 | 18 | Chiba |
| 14 | 16 | Tokyo |
| 15 | 20 | Saita |
| 16 | 21 | Yoko |
| 17 | 18 | Tokyo |
| 18 | 23 | Chiba |
| 19 | 18 | Yoko |

FIG.15A

AGE 21

| OrdSet' | |
|---|---|
| 0 | 3 |
| 1 | 6 |
| 2 | 8 |
| 3 | 11 |
| 4 | 14 |
| 5 | 0 |
| 6 | 4 |
| 7 | 10 |
| 8 | 13 |
| 9 | 17 |
| 10 | 19 |
| 11 | 5 |
| 12 | 9 |
| 13 | 15 |
| 14 | 1 |
| 15 | 7 |
| 16 | 16 |
| 17 | 2 |
| 18 | 12 |
| 19 | 18 |

| | AGE | AREA |
|---|---|---|
| 0 | 18 | Tokyo |
| 1 | 21 | Chiba |
| 2 | 23 | Yoko |
| 3 | 16 | Chiba |
| 4 | 18 | Saita |
| 5 | 20 | Yoko |
| 6 | 16 | Tokyo |
| 7 | 21 | Tokyo |
| 8 | 16 | Chiba |
| 9 | 20 | Saita |
| 10 | 18 | Yoko |
| 11 | 16 | Yoko |
| 12 | 23 | Saita |
| 13 | 18 | Chiba |
| 14 | 16 | Tokyo |
| 15 | 20 | Saita |
| 16 | 21 | Yoko |
| 17 | 18 | Tokyo |
| 18 | 23 | Chiba |
| 19 | 18 | Yoko |

FIG.15B

AGE 23

| OrdSet' | |
|---|---|
| 0 | 3 |
| 1 | 6 |
| 2 | 8 |
| 3 | 11 |
| 4 | 14 |
| 5 | 0 |
| 6 | 4 |
| 7 | 10 |
| 8 | 13 |
| 9 | 17 |
| 10 | 19 |
| 11 | 5 |
| 12 | 9 |
| 13 | 15 |
| 14 | 1 |
| 15 | 7 |
| 16 | 16 |
| 17 | 2 |
| 18 | 12 |
| 19 | 18 |

| | AGE | AREA |
|---|---|---|
| 0 | 18 | Tokyo |
| 1 | 21 | Chiba |
| 2 | 23 | Yoko |
| 3 | 16 | Chiba |
| 4 | 18 | Saita |
| 5 | 20 | Yoko |
| 6 | 16 | Tokyo |
| 7 | 21 | Tokyo |
| 8 | 16 | Chiba |
| 9 | 20 | Saita |
| 10 | 18 | Yoko |
| 11 | 16 | Yoko |
| 12 | 23 | Saita |
| 13 | 18 | Chiba |
| 14 | 16 | Tokyo |
| 15 | 20 | Saita |
| 16 | 21 | Yoko |
| 17 | 18 | Tokyo |
| 18 | 23 | Chiba |
| 19 | 18 | Yoko |

FIG.16A

CONVERSION INTO CUMULATIVE NUMBERS
WITH HORIZONTAL DIRECTION FIRST
(DESCENDING ORDER SORTING)

FIG.16B

ORDER AND RESULT
OF CONVERSION INTO
CUMULATIVE NUMBERS

| | |
|---|---|
| (1) Count-0: 4 | 1→0 |
| (2) Count-1: 4 | 0→1 |
| (3) Count-2: 4 | 1→1 |
| (4) Count-3: 4 | 1→2 |
| (5) Count-0: 3 | 1→3 |
| (6) Count-1: 3 | 1→4 |
| (7) Count-2: 3 | 0→5 |
| (8) Count-3: 3 | 1→5 |
| (9) Count-0: 2 | 0→6 |
| (10) Count-1: 2 | 2→6 |
| (11) Count-2: 2 | 0→8 |
| (12) Count-3: 2 | 1→8 |
| (13) Count-0: 1 | 2→9 |
| (14) Count-1: 1 | 0→11 |
| (15) Count-2: 1 | 2→11 |
| (16) Count-3: 1 | 2→13 |
| (17) Count-0: 0 | 1→15 |
| (18) Count-1: 0 | 2→16 |
| (19) Count-2: 0 | 2→18 |
| (20) Count-3: 0 | 0→20 |

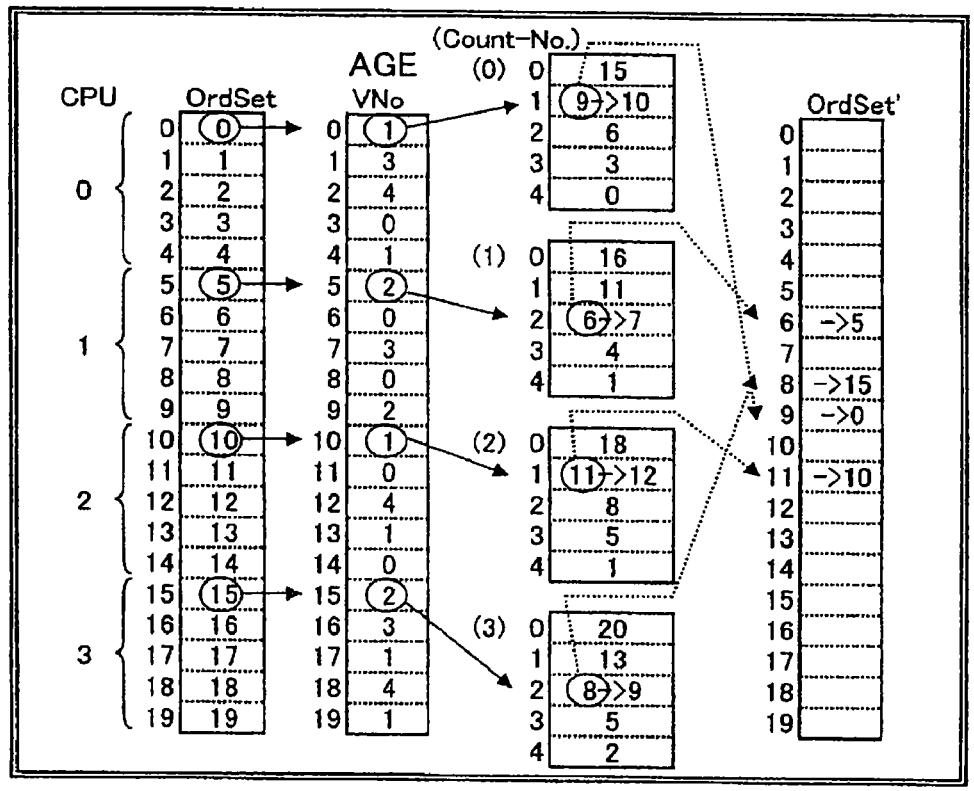
FIG.17A SUB-STEP 1
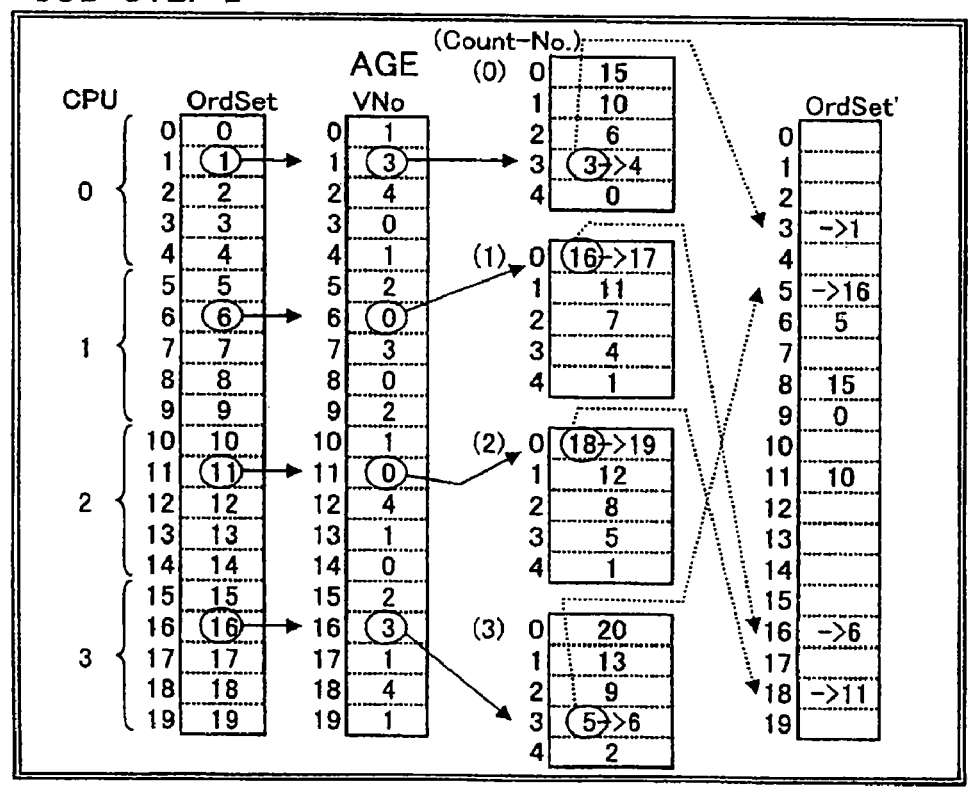
FIG.17B SUB-STEP 2

SUB-STEP 3

SUB-STEP 4

SUB-STEP 5

OUTCOME OF TRANSFER

| | OrdSet' |
|---|---|
| 0 | 2 |
| 1 | 12 |
| 2 | 18 |
| 3 | 1 |
| 4 | 7 |
| 5 | 16 |
| 6 | 5 |
| 7 | 9 |
| 8 | 15 |
| 9 | 0 |
| 10 | 4 |
| 11 | 10 |
| 12 | 13 |
| 13 | 17 |
| 14 | 19 |
| 15 | 3 |
| 16 | 6 |
| 17 | 8 |
| 18 | 11 |
| 19 | 14 |

FIG.20A

AGE 23

| | OrdSet' |
|---|---|
| 0 | 2 |
| 1 | 12 |
| 2 | 18 |
| 3 | 1 |
| 4 | 7 |
| 5 | 16 |
| 6 | 5 |
| 7 | 9 |
| 8 | 15 |
| 9 | 0 |
| 10 | 4 |
| 11 | 10 |
| 12 | 13 |
| 13 | 17 |
| 14 | 19 |
| 15 | 3 |
| 16 | 6 |
| 17 | 8 |
| 18 | 11 |
| 19 | 14 |

| | AGE | AREA |
|---|---|---|
| 0 | 18 | Tokyo |
| 1 | 21 | Chiba |
| 2 | 23 | Yoko |
| 3 | 16 | Chiba |
| 4 | 18 | Saita |
| 5 | 20 | Yoko |
| 6 | 16 | Tokyo |
| 7 | 21 | Tokyo |
| 8 | 16 | Chiba |
| 9 | 20 | Saita |
| 10 | 18 | Yoko |
| 11 | 16 | Yoko |
| 12 | 23 | Saita |
| 13 | 18 | Chiba |
| 14 | 16 | Tokyo |
| 15 | 20 | Saita |
| 16 | 21 | Yoko |
| 17 | 18 | Tokyo |
| 18 | 23 | Chiba |
| 19 | 18 | Yoko |

FIG.20B

AGE 21

| | OrdSet' |
|---|---|
| 0 | 2 |
| 1 | 12 |
| 2 | 18 |
| 3 | 1 |
| 4 | 7 |
| 5 | 16 |
| 6 | 5 |
| 7 | 9 |
| 8 | 15 |
| 9 | 0 |
| 10 | 4 |
| 11 | 10 |
| 12 | 13 |
| 13 | 17 |
| 14 | 19 |
| 15 | 3 |
| 16 | 6 |
| 17 | 8 |
| 18 | 11 |
| 19 | 14 |

| | AGE | AREA |
|---|---|---|
| 0 | 18 | Tokyo |
| 1 | 21 | Chiba |
| 2 | 23 | Yoko |
| 3 | 16 | Chiba |
| 4 | 18 | Saita |
| 5 | 20 | Yoko |
| 6 | 16 | Tokyo |
| 7 | 21 | Tokyo |
| 8 | 16 | Chiba |
| 9 | 20 | Saita |
| 10 | 18 | Yoko |
| 11 | 16 | Yoko |
| 12 | 23 | Saita |
| 13 | 18 | Chiba |
| 14 | 16 | Tokyo |
| 15 | 20 | Saita |
| 16 | 21 | Yoko |
| 17 | 18 | Tokyo |
| 18 | 23 | Chiba |
| 19 | 18 | Yoko |

FIG.21A

AGE 20

OrdSet'
| | |
|---|---|
| 0 | 2 |
| 1 | 12 |
| 2 | 18 |
| 3 | 1 |
| 4 | 7 |
| 5 | 16 |
| 6 | 5 |
| 7 | 9 |
| 8 | 15 |
| 9 | 0 |
| 10 | 4 |
| 11 | 10 |
| 12 | 13 |
| 13 | 17 |
| 14 | 19 |
| 15 | 3 |
| 16 | 6 |
| 17 | 8 |
| 18 | 11 |
| 19 | 14 |

| | AGE | AREA |
|---|---|---|
| 0 | 18 | Tokyo |
| 1 | 21 | Chiba |
| 2 | 23 | Yoko |
| 3 | 16 | Chiba |
| 4 | 18 | Saita |
| 5 | 20 | Yoko |
| 6 | 16 | Tokyo |
| 7 | 21 | Tokyo |
| 8 | 16 | Chiba |
| 9 | 20 | Saita |
| 10 | 18 | Yoko |
| 11 | 16 | Yoko |
| 12 | 23 | Saita |
| 13 | 18 | Chiba |
| 14 | 16 | Tokyo |
| 15 | 20 | Saita |
| 16 | 21 | Yoko |
| 17 | 18 | Tokyo |
| 18 | 23 | Chiba |
| 19 | 18 | Yoko |

FIG.21B

AGE 18

OrdSet'
| | |
|---|---|
| 0 | 2 |
| 1 | 12 |
| 2 | 18 |
| 3 | 1 |
| 4 | 7 |
| 5 | 16 |
| 6 | 5 |
| 7 | 9 |
| 8 | 15 |
| 9 | 0 |
| 10 | 4 |
| 11 | 10 |
| 12 | 13 |
| 13 | 17 |
| 14 | 19 |
| 15 | 3 |
| 16 | 6 |
| 17 | 8 |
| 18 | 11 |
| 19 | 14 |

| | AGE | AREA |
|---|---|---|
| 0 | 18 | Tokyo |
| 1 | 21 | Chiba |
| 2 | 23 | Yoko |
| 3 | 16 | Chiba |
| 4 | 18 | Saita |
| 5 | 20 | Yoko |
| 6 | 16 | Tokyo |
| 7 | 21 | Tokyo |
| 8 | 16 | Chiba |
| 9 | 20 | Saita |
| 10 | 18 | Yoko |
| 11 | 16 | Yoko |
| 12 | 23 | Saita |
| 13 | 18 | Chiba |
| 14 | 16 | Tokyo |
| 15 | 20 | Saita |
| 16 | 21 | Yoko |
| 17 | 18 | Tokyo |
| 18 | 23 | Chiba |
| 19 | 18 | Yoko |

FIG.21C

AGE 16

OrdSet'
| | |
|---|---|
| 0 | 2 |
| 1 | 12 |
| 2 | 18 |
| 3 | 1 |
| 4 | 7 |
| 5 | 16 |
| 6 | 5 |
| 7 | 9 |
| 8 | 15 |
| 9 | 0 |
| 10 | 4 |
| 11 | 10 |
| 12 | 13 |
| 13 | 17 |
| 14 | 19 |
| 15 | 3 |
| 16 | 6 |
| 17 | 8 |
| 18 | 11 |
| 19 | 14 |

| | AGE | AREA |
|---|---|---|
| 0 | 18 | Tokyo |
| 1 | 21 | Chiba |
| 2 | 23 | Yoko |
| 3 | 16 | Chiba |
| 4 | 18 | Saita |
| 5 | 20 | Yoko |
| 6 | 16 | Tokyo |
| 7 | 21 | Tokyo |
| 8 | 16 | Chiba |
| 9 | 20 | Saita |
| 10 | 18 | Yoko |
| 11 | 16 | Yoko |
| 12 | 23 | Saita |
| 13 | 18 | Chiba |
| 14 | 16 | Tokyo |
| 15 | 20 | Saita |
| 16 | 21 | Yoko |
| 17 | 18 | Tokyo |
| 18 | 23 | Chiba |
| 19 | 18 | Yoko |

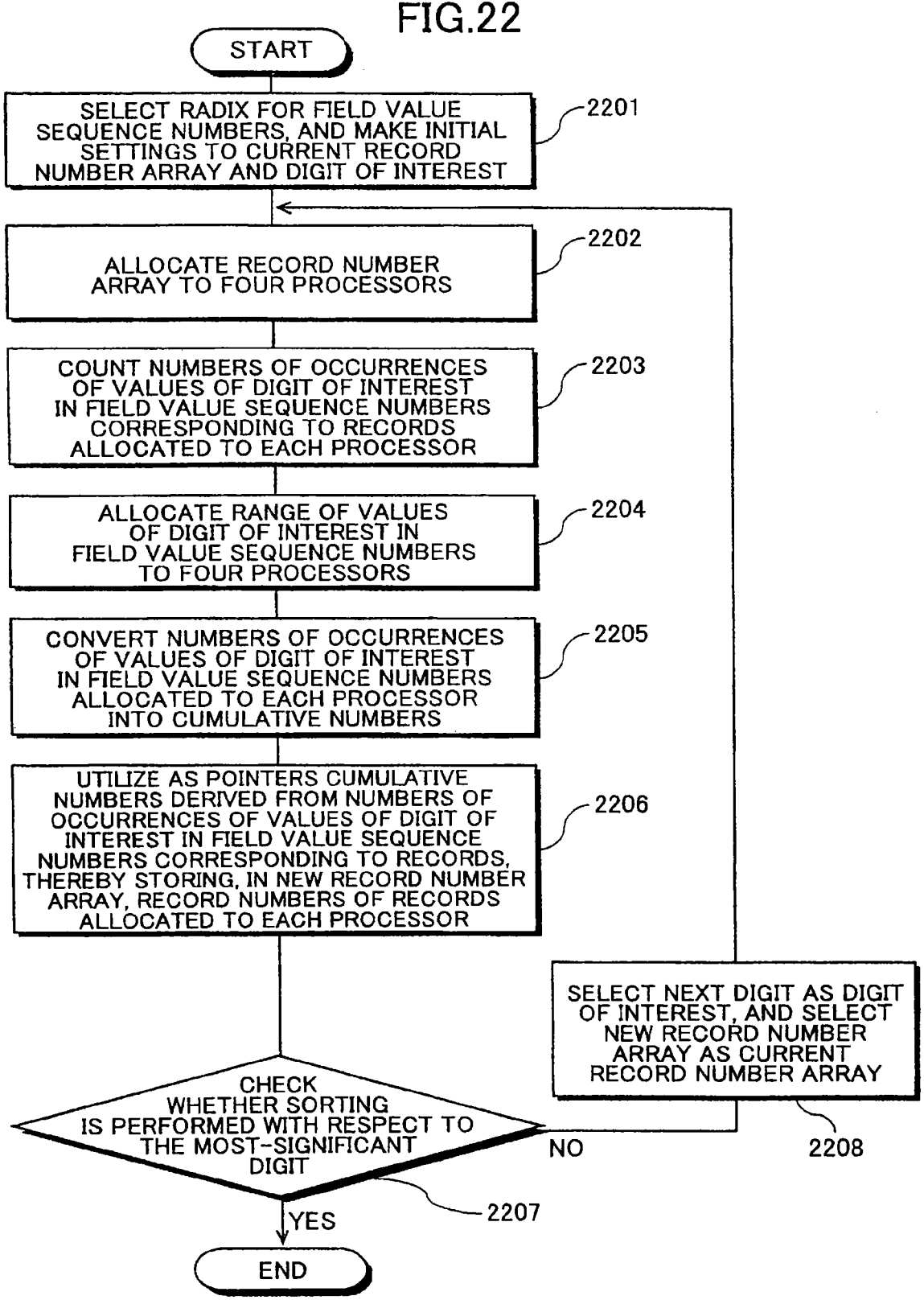

SUB-STEP 1 OF FIRST-STAGE COUNT

SUB-STEP 2 OF FIRST-STAGE COUNT

SUB-STEP 3 OF FIRST-STAGE COUNT

SUB-STEP 4 OF FIRST-STAGE COUNT

FIG.25A

SUB-STEP 5 OF FIRST-STAGE COUNT

| | OrdSet | | AGE VNo | | Count-0 | | Count-1 | | Count-2 | | Count-3 |
|---|---|---|---|---|---|---|---|---|---|---|---|
| CPU-0 | 0: 0 | 0: 1 | | 0: 2 | 0: 2 | 0: 2→3 | 0: 1 |
| | 1: 1 | 1: 3 | | 1: 1→2 | 1: 0 | 1: 2 | 1: 1→2 |
| | 2: 2 | 2: 4 | | 2: 0 | 2: 1→2 | 2: 0 | 2: 1 |
| | 3: 3 | 3: 0 | | 3: 1 | 3: 1 | 3: 0 | 3: 1 |
| | 4: (4) → 4: (1) MOD4 | | | | | |
| CPU-1 | 5: 5 | 5: 2 | | | | | |
| | 6: 6 | 6: 0 | | | | | |
| | 7: 7 | 7: 3 | | | | | |
| | 8: 8 | 8: 0 | | | | | |
| | 9: (9) → 9: (2) MOD4 | | | | | |
| CPU-2 | 10: 10 | 10: 1 | | | | | |
| | 11: 11 | 11: 0 | | | | | |
| | 12: 12 | 12: 4 | | | | | |
| | 13: 13 | 13: 1 | | | | | |
| | 14: (14) → 14: (0) MOD4 | | | | | |
| CPU-3 | 15: 15 | 15: 2 | | | | | |
| | 16: 16 | 16: 3 | | | | | |
| | 17: 17 | 17: 1 | | | | | |
| | 18: 18 | 18: 4 | | | | | |
| | 19: (19) → 19: (1) MOD4 | | | | | |

FIG.25B

OUTCOME OF FIRST-STAGE COUNT-UP

| | OrdSet | AGE VNo | Count-0 | Count-1 | Count-2 | Count-3 |
|---|---|---|---|---|---|---|
| CPU-0 | 0: 0 | 0: 1 | 0: 2 | 0: 2 | 0: 3 | 0: 1 |
| | 1: 1 | 1: 3 | 1: 2 | 1: 0 | 1: 2 | 1: 2 |
| | 2: 2 | 2: 4 | 2: 0 | 2: 2 | 2: 0 | 2: 1 |
| | 3: 3 | 3: 0 | 3: 1 | 3: 1 | 3: 0 | 3: 1 |
| | 4: 4 | 4: 1 | | | | |
| CPU-1 | 5: 5 | 5: 2 | | | | |
| | 6: 6 | 6: 0 | | | | |
| | 7: 7 | 7: 3 | | | | |
| | 8: 8 | 8: 0 | | | | |
| | 9: 9 | 9: 2 | | | | |
| CPU-2 | 10: 10 | 10: 1 | | | | |
| | 11: 11 | 11: 0 | | | | |
| | 12: 12 | 12: 4 | | | | |
| | 13: 13 | 13: 1 | | | | |
| | 14: 14 | 14: 0 | | | | |
| CPU-3 | 15: 15 | 15: 2 | | | | |
| | 16: 16 | 16: 3 | | | | |
| | 17: 17 | 17: 1 | | | | |
| | 18: 18 | 18: 4 | | | | |
| | 19: 19 | 19: 1 | | | | |

FIG.26A

FIRST-STAGE CONVERSION INTO CUMULATIVE NUMBERS WITH HORIZONTAL DIRECTION FIRST (ASCENDING ORDER SORTING)

| | AGE | |
|---|---|---|
| OrdSet | | VNo |
| 0 | 0 | 1 |
| 1 | 1 | 3 |
| 2 | 2 | 4 |
| 3 | 3 | 0 |
| 4 | 4 | 1 |
| 5 | 5 | 2 |
| 6 | 6 | 0 |
| 7 | 7 | 3 |
| 8 | 8 | 0 |
| 9 | 9 | 2 |
| 10 | 10 | 1 |
| 11 | 11 | 0 |
| 12 | 12 | 4 |
| 13 | 13 | 1 |
| 14 | 14 | 0 |
| 15 | 15 | 2 |
| 16 | 16 | 3 |
| 17 | 17 | 1 |
| 18 | 18 | 4 |
| 19 | 19 | 1 |

CPU-0: rows 0–4
CPU-1: rows 5–9
CPU-2: rows 10–14
CPU-3: rows 15–19

START
⇓
|        | Count-0 | ↷ | Count-1 | ↷ | Count-2 | ↷ | Count-3 | |
|---|---|---|---|---|---|---|---|---|
| CPU-0 | (1) 2→0 | | (2) 0 2→2 | | (3) 0 3→4 | | (4) 0 1→7 | ⇒ (5) |
| CPU-1 | (5) 1 2→8 | | (6) 1 0→10 | | (7) 1 2→12 | | (8) 1 2→12 | ⇒ (9) |
| CPU-2 | (9) 2 0→14 | | (10) 2 2→14 | | (11) 2 0→16 | | (12) 2 1→16 | ⇒ (13) |
| CPU-3 | (13) 3 1→17 | | (14) 3 1→18 | | (15) 3 0→19 | | (16) 3 1→19 | ⇒ END |

FIG.26B

ORDER AND RESULT OF FIRST-STAGE CONVERSION INTO CUMULATIVE NUMBERS

| | |
|---|---|
| (1) Count-0: 0 | 2 |
| (2) Count-1: 0 | 2 |
| (3) Count-2: 0 | 3 |
| (4) Count-3: 0 | 1 |
| (5) Count-0: 1 | 2 |
| (6) Count-1: 1 | 0 |
| (7) Count-2: 1 | 2 |
| (8) Count-3: 1 | 2 |
| (9) Count-0: 2 | 2 |
| (10) Count-1: 2 | 2 |
| (11) Count-2: 2 | 0 |
| (12) Count-3: 2 | 2 |
| (13) Count-0: 3 | 1 |
| (14) Count-1: 3 | 1 |
| (15) Count-2: 3 | 0 |
| (16) Count-3: 3 | 1 |

⇩

| 2→0 |
| 2→2 |
| 3→4 |
| 1→7 |
| 2→8 |
| 0→10 |
| 2→12 |
| 2→14 |
| 0→14 |
| 2→16 |
| 0→16 |
| 1→17 |
| 1→18 |
| 0→19 |
| 1→19 |
| →20 |

SUB-STEP 1 OF FIRST-STAGE RECORD NUMBER TRANSFER

SUB-STEP 2 OF FIRST-STAGE RECORD NUMBER TRANSFER

SUB-STEP 3 OF FIRST-STAGE RECORD NUMBER TRANSFER

SUB-STEP 4 OF FIRST-STAGE RECORD NUMBER TRANSFER

SUB-STEP 5 OF FIRST-STAGE RECORD NUMBER TRANSFER

OUTCOME OF FIRST-STAGE RECORD NUMBER TRANSFER

FIG.30

| OrdSet' | | AGE | | | VL | | Count-0 | | Count-1 | | Count-2 | | Count-3 | |
|---|---|---|---|---|---|---|---|---|---|---|---|---|---|---|
| 0 | 2 | 0 | VNo 1 | 0 | 16 | 0 | 0 | 0 | 0 | 0 | 0 | 0 | 0 | 0 |
| 1 | 3 | 1 | 3 | 1 | 18 | 1 | 0 | 1 | 0 | 1 | 0 | 1 | 0 | |
| 2 | 6 | 2 | 4 | 2 | 20 | | | | | | | | | |
| 3 | 8 | 3 | 0 | 3 | 21 | | | | | | | | | |
| 4 | 11 | 4 | 1 | 4 | 23 | | | | | | | | | |
| 5 | 12 | 5 | 2 | ASCENDING ORDER | | | | | | | | | | |
| 6 | 14 | 6 | 0 | | | | | | | | | | | |
| 7 | 18 | 7 | 3 | | | | | | | | | | | |
| 8 | 0 | 8 | 0 | | | | | | | | | | | |
| 9 | 4 | 9 | 2 | | | | | | | | | | | |
| 10 | 10 | 10 | 1 | | | | | | | | | | | |
| 11 | 13 | 11 | 0 | | | | | | | | | | | |
| 12 | 17 | 12 | 4 | | | | | | | | | | | |
| 13 | 19 | 13 | 1 | | | | | | | | | | | |
| 14 | 5 | 14 | 0 | | | | | | | | | | | |
| 15 | 9 | 15 | 2 | | | | | | | | | | | |
| 16 | 15 | 16 | 3 | | | | | | | | | | | |
| 17 | 1 | 17 | 1 | | | | | | | | | | | |
| 18 | 7 | 18 | 4 | | | | | | | | | | | |
| 19 | 16 | 19 | 1 | | | | | | | | | | | |

CPU-0: rows 0–4
CPU-1: rows 5–9
CPU-2: rows 10–14
CPU-3: rows 15–19

SUB-STEP 1 OF SECOND-STAGE COUNT-UP

SUB-STEP 2 OF SECOND-STAGE COUNT-UP

SUB-STEP 3 OF SECOND-STAGE COUNT-UP

SUB-STEP 4 OF SECOND-STAGE COUNT-UP

SUB-STEP 5 OF SECOND-STAGE COUNT-UP

OUTCOME OF SECOND-STAGE COUNT-UP

FIG.34

CONVERSION INTO CUMULATIVE NUMBERS

| | OrdSet' | | AGE VNo |
|---|---|---|---|
| 0 | 2 | 0 | 1 |
| 1 | 3 | 1 | 3 |
| 2 | 6 | 2 | 4 |
| 3 | 8 | 3 | 0 |
| 4 | 11 | 4 | 1 |
| 5 | 12 | 5 | 2 |
| 6 | 14 | 6 | 0 |
| 7 | 18 | 7 | 3 |
| 8 | 0 | 8 | 0 |
| 9 | 4 | 9 | 2 |
| 10 | 10 | 10 | 1 |
| 11 | 13 | 11 | 0 |
| 12 | 17 | 12 | 4 |
| 13 | 19 | 13 | 1 |
| 14 | 5 | 14 | 0 |
| 15 | 9 | 15 | 2 |
| 16 | 15 | 16 | 3 |
| 17 | 1 | 17 | 1 |
| 18 | 7 | 18 | 4 |
| 19 | 16 | 19 | 1 |

Rows 0–4: CPU-0; 5–9: CPU-1; 10–14: CPU-2; 15–19: CPU-3

Count-0: 0 4→0 ; 1 1→17

Count-1: 0 3→4 ; 1 12→18

Count-2: 0 5→7 ; 1 0→20

Count-3: 0 5→12 ; 1 0→20

SUB-STEP 1 OF SECOND-STAGE RECORD NUMBER TRANSFER

SUB-STEP 2 OF SECOND-STAGE RECORD NUMBER TRANSFER

SUB-STEP 3 OF SECOND-STAGE RECORD NUMBER TRANSFER

SUB-STEP 4 OF SECOND-STAGE RECORD NUMBER TRANSFER

SUB-STEP 5 OF SECOND-STAGE RECORD NUMBER TRANSFER

OUTCOME OF SECOND-STAGE RECORD NUMBER TRANSFER

FIG.38A

AGE 16

| | OrdSet" | | AGE | AREA |
|---|---|---|---|---|
| 0 | 3 | 0 | 18 | Tokyo |
| 1 | 6 | 1 | 21 | Chiba |
| 2 | 8 | 2 | 23 | Yoko |
| 3 | 11 | 3 | 16 | Chiba |
| 4 | 14 | 4 | 18 | Saita |
| 5 | 0 | 5 | 20 | Yoko |
| 6 | 4 | 6 | 16 | Tokyo |
| 7 | 10 | 7 | 21 | Tokyo |
| 8 | 13 | 8 | 16 | Chiba |
| 9 | 17 | 9 | 20 | Saita |
| 10 | 19 | 10 | 18 | Yoko |
| 11 | 5 | 11 | 16 | Yoko |
| 12 | 9 | 12 | 23 | Saita |
| 13 | 15 | 13 | 18 | Chiba |
| 14 | 1 | 14 | 16 | Tokyo |
| 15 | 7 | 15 | 20 | Saita |
| 16 | 16 | 16 | 21 | Yoko |
| 17 | 2 | 17 | 18 | Tokyo |
| 18 | 12 | 18 | 23 | Chiba |
| 19 | 18 | 19 | 18 | Yoko |

FIG.38B

AGE 18

| | OrdSet" | | AGE | AREA |
|---|---|---|---|---|
| 0 | 3 | 0 | 18 | Tokyo |
| 1 | 6 | 1 | 21 | Chiba |
| 2 | 8 | 2 | 23 | Yoko |
| 3 | 11 | 3 | 16 | Chiba |
| 4 | 14 | 4 | 18 | Saita |
| 5 | 0 | 5 | 20 | Yoko |
| 6 | 4 | 6 | 16 | Tokyo |
| 7 | 10 | 7 | 21 | Tokyo |
| 8 | 13 | 8 | 16 | Chiba |
| 9 | 17 | 9 | 20 | Saita |
| 10 | 19 | 10 | 18 | Yoko |
| 11 | 5 | 11 | 16 | Yoko |
| 12 | 9 | 12 | 23 | Saita |
| 13 | 15 | 13 | 18 | Chiba |
| 14 | 1 | 14 | 16 | Tokyo |
| 15 | 7 | 15 | 20 | Saita |
| 16 | 16 | 16 | 21 | Yoko |
| 17 | 2 | 17 | 18 | Tokyo |
| 18 | 12 | 18 | 23 | Chiba |
| 19 | 18 | 19 | 18 | Yoko |

FIG.38C

AGE 20

| | OrdSet" | | AGE | AREA |
|---|---|---|---|---|
| 0 | 3 | 0 | 18 | Tokyo |
| 1 | 6 | 1 | 21 | Chiba |
| 2 | 8 | 2 | 23 | Yoko |
| 3 | 11 | 3 | 16 | Chiba |
| 4 | 14 | 4 | 18 | Saita |
| 5 | 0 | 5 | 20 | Yoko |
| 6 | 4 | 6 | 16 | Tokyo |
| 7 | 10 | 7 | 21 | Tokyo |
| 8 | 13 | 8 | 16 | Chiba |
| 9 | 17 | 9 | 20 | Saita |
| 10 | 19 | 10 | 18 | Yoko |
| 11 | 5 | 11 | 16 | Yoko |
| 12 | 9 | 12 | 23 | Saita |
| 13 | 15 | 13 | 18 | Chiba |
| 14 | 1 | 14 | 16 | Tokyo |
| 15 | 7 | 15 | 20 | Saita |
| 16 | 16 | 16 | 21 | Yoko |
| 17 | 2 | 17 | 18 | Tokyo |
| 18 | 12 | 18 | 23 | Chiba |
| 19 | 18 | 19 | 18 | Yoko |

FIG.39A

AGE 21

| | OrdSet" |
|---|---|
| 0 | 3 |
| 1 | 6 |
| 2 | 8 |
| 3 | 11 |
| 4 | 14 |
| 5 | 0 |
| 6 | 4 |
| 7 | 10 |
| 8 | 13 |
| 9 | 17 |
| 10 | 19 |
| 11 | 5 |
| 12 | 9 |
| 13 | 15 |
| 14 | 1 |
| 15 | 7 |
| 16 | 16 |
| 17 | 2 |
| 18 | 12 |
| 19 | 18 |

| | AGE | AREA |
|---|---|---|
| 0 | 18 | Tokyo |
| 1 | 21 | Chiba |
| 2 | 23 | Yoko |
| 3 | 16 | Chiba |
| 4 | 18 | Saita |
| 5 | 20 | Yoko |
| 6 | 16 | Tokyo |
| 7 | 21 | Tokyo |
| 8 | 16 | Chiba |
| 9 | 20 | Saita |
| 10 | 18 | Yoko |
| 11 | 16 | Yoko |
| 12 | 23 | Saita |
| 13 | 18 | Chiba |
| 14 | 16 | Tokyo |
| 15 | 20 | Saita |
| 16 | 21 | Yoko |
| 17 | 18 | Tokyo |
| 18 | 23 | Chiba |
| 19 | 18 | Yoko |

FIG.39B

AGE 23

| | OrdSet" |
|---|---|
| 0 | 3 |
| 1 | 6 |
| 2 | 8 |
| 3 | 11 |
| 4 | 14 |
| 5 | 0 |
| 6 | 4 |
| 7 | 10 |
| 8 | 13 |
| 9 | 17 |
| 10 | 19 |
| 11 | 5 |
| 12 | 9 |
| 13 | 15 |
| 14 | 1 |
| 15 | 7 |
| 16 | 16 |
| 17 | 2 |
| 18 | 12 |
| 19 | 18 |

| | AGE | AREA |
|---|---|---|
| 0 | 18 | Tokyo |
| 1 | 21 | Chiba |
| 2 | 23 | Yoko |
| 3 | 16 | Chiba |
| 4 | 18 | Saita |
| 5 | 20 | Yoko |
| 6 | 16 | Tokyo |
| 7 | 21 | Tokyo |
| 8 | 16 | Chiba |
| 9 | 20 | Saita |
| 10 | 18 | Yoko |
| 11 | 16 | Yoko |
| 12 | 23 | Saita |
| 13 | 18 | Chiba |
| 14 | 16 | Tokyo |
| 15 | 20 | Saita |
| 16 | 21 | Yoko |
| 17 | 18 | Tokyo |
| 18 | 23 | Chiba |
| 19 | 18 | Yoko |

FIG.40

FIRST-STAGE COUNT-UP (OrdSet[0])

| | OrdSet | | VNo × 1/4 | | Count-1 |
|---|---|---|---|---|---|
| 0 | (0) → | 0 | 2 → | 0 → 0 | 0->1 |
| 1 | 1 | 1 | 8 | 1 | 0 |
| 2 | 2 | 2 | 6 | 2 | 0 |
| 3 | 3 | 3 | 0 | | |
| 4 | 4 | 4 | 2 | | |
| 5 | 5 | 5 | 3 | | |
| 6 | 6 | 6 | 1 | | |
| 7 | 7 | 7 | 5 | | |
| 8 | 8 | 8 | 1 | | |
| 9 | 9 | 9 | 4 | | |
| 10 | 10 | 10 | 2 | | |
| 11 | 11 | 11 | 1 | | |
| 12 | 12 | 12 | 7 | | |
| 13 | 13 | 13 | 2 | | |
| 14 | 14 | 14 | 1 | | |
| 15 | 15 | 15 | 4 | | |
| 16 | 16 | 16 | 5 | | |
| 17 | 17 | 17 | 2 | | |
| 18 | 18 | 18 | 6 | | |
| 19 | 19 | 19 | 2 | | |

FIRST-STAGE COUNT-UP (OrdSet[7])

| | OrdSet | | VNo | | Count-1 |
|---|---|---|---|---|---|
| 0 | 0 | 0 | 2 | | 0 | 5 |
| 1 | 1 | 1 | 8 | | 1 | 1->2 |
| 2 | 2 | 2 | 6 | | 2 | 1 |
| 3 | 3 | 3 | 0 | | | |
| 4 | 4 | 4 | 2 | | | |
| 5 | 5 | 5 | 3 | | | |
| 6 | 6 | 6 | 1 | ×1/4 | | |
| 7 | (7) → | 7 | (5) → | (1) | | |
| 8 | 8 | 8 | 1 | | | |
| 9 | 9 | 9 | 4 | | | |
| 10 | 10 | 10 | 2 | | | |
| 11 | 11 | 11 | 1 | | | |
| 12 | 12 | 12 | 7 | | | |
| 13 | 13 | 13 | 2 | | | |
| 14 | 14 | 14 | 1 | | | |
| 15 | 15 | 15 | 4 | | | |
| 16 | 16 | 16 | 5 | | | |
| 17 | 17 | 17 | 2 | | | |
| 18 | 18 | 18 | 6 | | | |
| 19 | 19 | 19 | 2 | | | |

FIRST-STAGE COUNT-UP (OrdSet[19])

| | OrdSet | | VNo | | Count-1 |
|---|---|---|---|---|---|
| 0 | 0 | 0 | 2 | | 0 | 11->12 |
| 1 | 1 | 1 | 8 | | 1 | 7 |
| 2 | 2 | 2 | 6 | | 2 | 1 |
| 3 | 3 | 3 | 0 | | | |
| 4 | 4 | 4 | 2 | | | |
| 5 | 5 | 5 | 3 | | | |
| 6 | 6 | 6 | 1 | | | |
| 7 | 7 | 7 | 5 | | | |
| 8 | 8 | 8 | 1 | | | |
| 9 | 9 | 9 | 4 | | | |
| 10 | 10 | 10 | 2 | | | |
| 11 | 11 | 11 | 1 | | | |
| 12 | 12 | 12 | 7 | | | |
| 13 | 13 | 13 | 2 | | | |
| 14 | 14 | 14 | 1 | | | |
| 15 | 15 | 15 | 4 | | | |
| 16 | 16 | 16 | 5 | | | |
| 17 | 17 | 17 | 2 | | | |
| 18 | 18 | 18 | 6 | ×1/4 | | |
| 19 | (19) → | 19 | (2) → | (0) | | |

FIRST-STAGE CONVERSION INTO CUMULATIVE NUMBERS

FIRST-STAGE RECORD NUMBER TRANSFER (OrdSet[0])

FIRST-STAGE RECORD NUMBER TRANSFER (OrdSet[19])

SECOND-STAGE COUNT-UP (OrdSet[12])

SECOND-STAGE COUNT-UP (OrdSet[18])

SECOND-STAGE CONVERSION INTO CUMULATIVE NUMBERS

SECOND-STAGE RECORD NUMBER TRANSFER (OrdSet'[14])

SECOND-STAGE RECORD NUMBER TRANSFER (OrdSet'[18])

SHARED-MEMORY MULTIPROCESSOR SYSTEM AND METHOD FOR PROCESSING INFORMATION

CROSS-REFERENCE TO RELATED APPLICATIONS

This application is the divisional of U.S. patent application Ser. No. 11/883,264 filed on Jul. 26, 2007, which is the national entry of PCT Application No. PCT/JP2006/310110 filed on May 22, 2006, which claims priority to Japanese Patent Application No. 2005-150604 filed on May 24, 2005 the disclosure of which is incorporated herein by reference in its entirety.

TECHNICAL FIELD

The present invention relates to a method for processing information in a shared-memory multiprocessor system in which a plurality of processors share a memory to perform parallel processing, and particularly relates to an information processing method for sorting large-scale table data in the shared memory by use of the plurality of processors.

The present invention also relates to a shared-memory multiprocessor system that performs such information processing method.

The present invention further relates to a program for performing such information processing method.

The present invention further relates to a memory medium storing such program.

BACKGROUND ART

In this day and age when computers are used in every corner of society and networks such as the Internet are widely used, the storing and processing of large-scale data has become common occurrence.

There has been an effort to develop efficient algorithms for processing large-scale data. Processing that is frequently required when large-scale data, especially large-scale table data, is processed is sorting. As efficient sorting algorithms, radix sort and counting sort (also referred to as distribution counting sort) are known. Counting sort may be utilized for the sorting of each digit in radix sort. Although counting sort is an efficient algorithm, its application is limited by the requirement of the following conditions:

1) objects to be sorted are integers;
2) the upper limit and lower limit of the integers to be sorted are known; and
3) a difference between the upper limit and lower limit of the integers to be sorted is not exceedingly large.

Against this background, the inventor of the present invention has developed a data management mechanism that is suitable for the high-speed searching, summarizing, and sorting of large-scale table data (see Patent Document 1). This data management mechanism uses an information block for representing the individual field values of a field included in table data. In this information block, field values belonging to a field of the table data are represented by field value sequence numbers assigned to the respective field values and an array of the actual field values arranged in an order of field value sequence numbers. An array is provided in which the field value sequence numbers corresponding to the field values of respective records are arranged in the order of record numbers. The field value of a given record is identified by finding the value corresponding to the field value sequence number of this given record in the array of the field values. Further, a record to be processed in table data is identified by use of an array in which record numbers are arranged in sequence.

The information block is a table in which field values corresponding to field value sequence numbers are stored in the order of field value sequence numbers with respect to each field of the table data, wherein the field value sequence numbers represent the sequencing of field values (i.e., assigning integers to field values) belonging to a given field. The field values may be any type of data such as numerical values (integer, fixed point, floating point, or the like) or character strings. This data management mechanism has an advantage in that a value of any data type can be treated as an integer that is a field value sequence number. Namely, when character-string data are to be sorted according to this data management mechanism, for example, character-string data are not the actual sort objects subjected to sorting, but field value sequence numbers corresponding to the values of character-string data are the actual sort objects that are to be sorted. In so doing, the results of sorting are represented by an array in which record numbers are arranged in sequence. In this manner, the information-block-based data management mechanism developed by the inventor of the present invention is advantageous in that the above-noted conditions 1) through 3) required for the application of counting sort are satisfied.

There has also been an effort to introduce parallel processing in order to perform a vast amount of computation at high speed that is necessary for the purpose of processing large-scale data. For the sorting purpose, also, various parallel sorting algorithms have been developed. In general, parallel processing architectures are classified manly into distributed-memory type and shared-memory type. In the case of the distributed-memory type, a system is configured by combining a plurality of processors each having a local memory. In this arrangement, it is possible in theory to design a hardware system incorporating hundreds to tens of thousands of processes. However, the distributed-memory type is fraught with technical problems such as the complexity of distributed data management and the low efficiency of processor-to-processor communication. In the shared-memory type, on the other hand, a plurality of processors share a single large memory space. In this arrangement, traffic between a set of processors and the shared memory becomes bottleneck, so that it is believed to be difficult to implement a system incorporating more than 100 processors in practice.

Against this background, it is now possible to obtain a personal computer that is implemented as a shared-memory multiprocessor system using a plurality of CPUs. Typical CPUs used in such a personal computer operate with internal clock that is five to six times faster than the clock of the memory bus, and are provided with an automatic parallel processing mechanism and pipeline processing mechanism embedded therein, thereby processing one item of data in one clock cycle (i.e., memory bus clock cycle).

[Patent Document 1] International Publication WO00/10103

DISCLOSURE OF INVENTION

Problem to be Solved by the Invention

It is thus desired to combine an efficient sorting algorithm and a shared-memory multiprocessor system in order to process large-scale table data.

Counting sort that is known to be an efficient sorting algorithm is limited as to its application by the requirement of the above-noted conditions 1) through 3). Because of this, it is difficult to apply counting sort to the processing of large-scale table data unless the information-block-based data management mechanism developed by the inventor of the present invention is utilized. It should be noted that the technology for performing parallel sorting on large-scale table data in a shared-memory multiprocessor system are not known to date.

Accordingly, it is an object of the present invention to utilize the information-block-based data management mechanism so as to provide an information processing method for sorting large-scale table data stored in the shared memory in a parallel manner by use of a plurality of processors.

Further, it is another object of the present invention to provide a shared-memory multiprocessor system that performs such information processing method.

Moreover, it is a further object of the present invention to provide a program for performing such information processing method.

Also, it is another object of the present invention to provide a memory medium having such a program recorded therein.

Means to Solve the Problem

The present invention is relied on a data management mechanism having its basis on the information block that is a table in which field values corresponding to field value sequence numbers are stored in the order (either ascending order or descending order) of field value sequence numbers with respect to each field of the table data, wherein the field value sequence numbers represent the sequencing of field values (i.e., assigning integers to field values) belonging to a given field. The field values may be any type of data such as numerical values (integer, fixed point, floating point, or the like) or character strings. With the use of this data management mechanism, a value of any data type can be treated as an integer that is a field value sequence number. Namely, when data of any given type are to be sorted according to this data management mechanism, the data of this type are not the actual sort objects subjected to sorting, but field value sequence numbers corresponding to the values of this data are the actual sort objects that are to be sorted. Accordingly, the data management mechanism based on this information block satisfies the requirements for application of the counting sort. Further, since a record to be processed in table data is identified by use of an array in which record numbers are arranged in sequence, the results of sorting will be represented by an array in which record numbers are arranged in sequence.

The present invention applies such data management mechanism to a shared-memory multiprocessor system, thereby achieving an information processing method for sorting large-scale table data in the shared memory by a plurality of processors in parallel, and also achieving a shared-memory multiprocessor system performing such information processing method. For this purpose, according to the present invention, the records subjected to processing are first divided for allocation to the plurality of processors. Then, each processor counts the numbers of local occurrences of the field value sequence numbers associated with the records to be processed. The numbers of local occurrences of the field value sequence numbers counted by each processor is then converted into global cumulative numbers, i.e., the cumulative numbers used in common by the plurality of processors. Finally, each processor utilizes the global cumulative numbers as pointers to rearrange the order of the allocated records. According to the present invention, thus, records can be sorted in parallel with respect to the filed values of a given record field (e.g., integers, fixed-point numerical values, floating-point numerical values, and character strings) in a shared-memory multiprocessor system.

A plurality of processors may perform in a parallel fashion the allocation of records to be processed to the plurality of processors, the counting of the numbers of local occurrences, and the rearrangement of the order of the allocated records. The computation of global cumulative numbers may be performed by utilizing parallel processing by the plurality of processors, but can be performed by one processor or part of the processors while maintaining sufficient speed because a cache hit rate is high due to sequential accessing of the memory.

The principle of the present invention as described above is implemented by various embodiments as follows.

The first embodiment of the present invention is directed to an information processing method for rearranging the order of records according to the field values of the records in a predetermined field in a shared-memory multiprocessor system. A shared-memory multiprocessor system includes a shared memory to store a record number array in which record numbers of table data records are stored according to a predetermined record order, a field value sequence number array in which field value sequence numbers corresponding to field values of the table data records in the predetermined field are stored according to the record numbers, and a field value array in which the field values of the table data are stored according to an order of the field value sequence numbers corresponding to the field values, and further includes a plurality of processors operable to access the shared memory. The information processing method of the present invention includes:

a step of dividing the record number array into portions which are allocated to a first plurality of processors;

a step of counting, by each of the first plurality of processors, numbers of occurrences of the field value sequence numbers corresponding to the records contained in an allocated portion of the record number array;

a step of dividing a range of the field value sequence numbers into portions which are allocated to a second plurality of processors;

a step of converting, by each of the second plurality of processors, the numbers of occurrences of the field value sequence numbers in an allocated portion into cumulative numbers in an order of the field value sequence numbers and in an order of the portions of the record number array within a range corresponding to the same field value sequence number; and a step of utilizing, by each of the first plurality of processors, as pointers the cumulative numbers of the field value sequence numbers corresponding to the records contained in the allocated portion of the record number array, thereby storing the record numbers contained in the allocated portion of the record number array in a new record number array.

This information processing method achieves parallel processing with respect to the counting of the numbers of occurrences of field value sequence numbers, parallel processing with respect to the conversion of the numbers of occurrences into cumulative numbers, and parallel processing with respect to the generation of a new record number array. The present invention thus expands the technology of counting sort such that it is applicable to the shared-memory multiprocessor system environment, thereby achieving the parallel sorting of large-scale table data in a shared-memory multiprocessor system. Among the plurality of processors constituting the multiprocessor system, a first plurality of processors selected arbitrarily take care of respective portions of the recode number array, and a second plurality of processes selected arbitrarily take care of the respective ranges of the field value sequence numbers. It should be noted that the number of the first plurality and the number of the second plurality may be equal to the total number of processors constituting the multiprocessor system, or may be only part of these.

The information processing method of the present invention may utilize the concept of radix sort with respect to the field value sequence numbers, thereby achieving the multi-stage parallel sorting of large-scale table data in a shared-memory multiprocessor system. If the size of the field value sequence number array is large, for example, the field value sequence number array may be compressed to improve the efficiency of processing. To this end, the information processing method of the present invention includes:

a step of selecting radix representation of the field value sequence numbers in response to a range of the field value sequence numbers; and a step of repeating sorting with respect to a digit of interest that is selected successively from a least significant digit to a most significant digit in the radix representation of the field value sequence numbers, by use of the record number array as a current record number array for a first time sorting and by use of a new record number array as a current record number array for a second time sorting and onward.

With this arrangement, parallel sorting is performed separately for each digit of the field value sequence numbers from the least significant digit to the most significant digit. The above-noted sorting includes:

a step of dividing the current record number array into portions which are allocated to a first plurality of processors;

a step of counting, by each of the first plurality of processors, numbers of occurrences of values of the digit of interest in the field value sequence numbers corresponding to the records contained in an allocated portion of the record number array;

a step of dividing a range of the values of the digit of interest of the field value sequence numbers into portions which are allocated to a second plurality of processors;

a step of converting, by each of the second plurality of processors, the numbers of occurrences of the values of the digit of interest in the field value sequence numbers in an allocated portion into cumulative numbers in an order of the values of the digit of interest in the field value sequence numbers and in an order of the portions of the record number array within a range corresponding to the same value of the digit of interest in the field value sequence number; and a step of utilizing, by each of the first plurality of processors, as pointers the cumulative numbers of the values of the digit of interest in the field value sequence numbers corresponding to the records contained in the allocated portion of the record number array, thereby storing the record numbers contained in the allocated portion of the record number array in the new record number array.

According to the present invention, sorting is repeated with respect to the digit of interest selected successively from the least significant digit to the most significant digit of the field value sequence numbers, so that sorting regarding the field value sequence numbers is achieved in conformity with the concept of radix sort. The parallel sorting of large-scale table data is thus achieved in a shared-memory multiprocessor system.

In the multi-stage parallel sorting described above, the step of converting the numbers of occurrences of the values of the digit of interest in the field value sequence numbers into cumulative numbers is performed in parallel by a second plurality of processors. Depending on the circumstances, however, this step may be performed at high speed without parallel processing by a plurality of processors. This is because the process of this step is performed sequentially, so that the cache hit rate will be high. In consideration of this, the information processing method of the present invention includes:

a step of selecting radix representation of the field value sequence numbers in response to a range of the field value sequence numbers; and a step of repeating sorting with respect to a digit of interest that is selected successively from a least significant digit to a most significant digit in the radix representation of the field value sequence numbers, by use of the record number array as a current record number array for a first time sorting and by use of a new record number array as a current record number array for a second time sorting and onward, wherein the sorting includes:

a step of dividing the current record number array into portions which are allocated to a plurality of processors;

a step of counting, by each processor, numbers of occurrences of values of the digit of interest in the field value sequence numbers corresponding to the records contained in an allocated portion of the record number array;

a step of converting, by at least one processor, the numbers of occurrences of the values of the digit of interest in the field value sequence numbers in an allocated portion into cumulative numbers in an order of the values of the digit of interest in the field value sequence numbers and in an order of the portions of the record number array within a range corresponding to the same value of the digit of interest in the field value sequence number; and a step of utilizing, by said each processor, as pointers the cumulative numbers of the values of the digit of interest in the field value sequence numbers corresponding to the records contained in the allocated portion of the record number array, thereby storing the record numbers contained in the allocated portion of the record number array in the new record number array.

In this information processing method, the range of the digit of interest of field value sequence numbers is not divided for allocation to a plurality of processors, and at least one processor, or preferably one processor alone, converts the numbers of occurrences of the values of digit of interest in field value sequence numbers into cumulative numbers. In this case also, sorting is repeated with respect to the digit of interest selected successively from the least significant digit to the most significant digit of the field value sequence numbers, so that sorting regarding the field value sequence numbers is achieved in conformity with the concept of radix sort. The parallel sorting of large-scale table data is thus achieved in a shared-memory multiprocessor system.

To achieve the objects as described above, the present invention provides an information processing method of rearranging an order of records according to field values of the records in a predetermined field in a shared-memory multiprocessor system, which includes a shared memory to store a record number array in which record numbers of table data records are stored according to a predetermined record order, a field value sequence number array in which field value sequence numbers corresponding to field values of the table data records in the predetermined field are stored according to the record numbers, and a field value array in which the field values of the table data are stored according to an order of the field value sequence numbers corresponding to the field values, and further includes a plurality of processors operable to access the shared memory. The information processing method includes:

a step of dividing the record number array into portions which are allocated to a plurality of processors;

a step of rearranging, by each of the plurality of processors, an order of the records contained in the allocated portion of the record number array according to the field value sequence numbers corresponding to the records, thereby storing the record numbers of the records in a new record number array.

To achieve the objects as described above, further, the present invention provides an information processing method of rearranging an order of records according to field values of the records in a predetermined field in a shared-memory multiprocessor system, which includes a shared memory to store a record number array in which record numbers of table data records are stored according to a predetermined record order, a field value sequence number array in which field value sequence numbers corresponding to field values of the table data records in the predetermined field are stored according to the record numbers, and a field value array in which the field values of the table data are stored according to an order of the field value sequence numbers corresponding to the field values, and further includes a plurality of processors operable to access the shared memory. The information processing method includes:

a step of selecting radix representation of the field value sequence numbers in response to a range of the field value sequence numbers;

a step of rearranging record numbers in the record number array with respect to an upper-order digit of the radix representation of the field value sequence numbers so as to generate an intermediate record number array that has sections thereof arranged in an order of values of the upper-order digit;

a step of allocating the sections of the intermediate record number array to respective processors; and a step of rearranging, by each of the processors allocated to the respective sections, the record numbers in the corresponding section of the intermediate record number array in an order of values of a lower-order digit of the field value sequence numbers.

The second embodiment of the present invention is directed to a shared-memory multiprocessor system that includes a shared memory and a plurality of processors operable to access the shared memory, and that performs the information processing method of the present invention described above. In the shared-memory multiprocessor system of the present invention, the shared memory stores a record number array in which record numbers of table data records are stored according to a predetermined record order, a field value sequence number array in which field value sequence numbers corresponding to field values of the table data records in the predetermined field are stored according to the record numbers, and a field value array in which the field values of the table data are stored according to an order of the field value sequence numbers corresponding to the field values. With this arrangement, the shared-memory multiprocessor system of the present invention can utilize the data management mechanism based on the block information.

Each of the processors includes:

a part to determine a portion of the record number array that is to be taken care of by a corresponding processor;

a part to count numbers of occurrences of the field value sequence numbers corresponding to the records contained in the portion of the record number array;

a part to determine a range of the field value sequence numbers that is to be taken care of by a corresponding processor;

a part to convert the numbers of occurrences of the field value sequence numbers in the range that is taken care of into cumulative numbers in an order of the field value sequence numbers and in an order of portions of the record number array within a range corresponding to the same field value sequence number; and a part to utilize as pointers the cumulative numbers of the field value sequence numbers corresponding to the records contained in the portion of the record number array, thereby storing the record numbers contained in the portion of the record number array in a new record number array.

Since each processor can operate in parallel, parallel processing is achieved with respect to the counting of the numbers of occurrences, with respect to the conversion of the numbers of occurrences into cumulative numbers, and with respect to the generation of a new record number array.

There is a need to carry over the obtained cumulative numbers in the order of field value sequence numbers when the numbers of occurrences of field value sequence numbers are to be converted into cumulative numbers. Because of this, the cumulative numbers obtained by the part to convert the numbers of occurrences into the cumulative numbers in a processor taking care of an immediately preceding range of the field value sequence numbers are referred to by the part to convert the numbers of occurrences into the cumulative numbers in a processor taking care of an immediately following range.

In the shared-memory multiprocessor system of the present invention, for the purpose of utilizing the concept of radix sort with respect to the field value sequence numbers to achieve the multi-stage parallel sorting of large-scale table data, each processor includes:

a part to select radix representation of the field value sequence numbers in response to a range of the field value sequence numbers; and a part to repeat sorting by selecting a digit of interest successively from a least significant digit to a most significant digit in the radix representation of the field value sequence numbers, by use of the record number array as a current record number array for a first time sorting and by use of a new record number array as a current record number array for a second time sorting and onward.

With this arrangement, parallel sorting is performed sequentially on a digit-by-digit basis from the least significant digit to the most significant digit of the field value sequence numbers. Further, the part to repeat sorting includes:

a part to determine a portion of the record number array that is to be taken care of by a corresponding processor;

a part to count numbers of occurrences of values of the digit of interest in the field value sequence numbers corresponding to the records contained in the portion of the record number array;

a part to determine a range of the values of the digit of interest in the field value sequence numbers that is to taken care of by a corresponding processor;

a part to convert the numbers of occurrences of the values of the digit of interest in the field value sequence numbers in the range that is taken care of into cumulative numbers in an order of the values of the digit of interest in the field value sequence numbers and in an order of portions of the record number array within a range corresponding to the same value of the digit of interest in the field value sequence number; and a part to utilize as pointers the cumulative numbers of the values of the digit of interest in the field value sequence numbers corresponding to the records contained in the portion of the record number array, thereby storing the record numbers contained in the portion of the record number array in a new record number array. With this arrangement, parallel sorting is performed on a digit-by-digit basis with respect to the field value sequence numbers. According to the present invention, a plurality of processors perform parallel processing with respect to the counting of the numbers of occurrences, the conversion of the numbers of occurrences into cumulative numbers, and the generation of a new record number array in the sorting performed separately for each digit of the field value sequence numbers.

In order for the plurality of processors to share the task of converting the numbers of occurrences into cumulative numbers, in the present invention, the cumulative numbers obtained by the part to convert the numbers of occurrences into the cumulative numbers in a processor taking care of an immediately preceding range of the digit of interest in the field value sequence numbers are referred to by the part to convert the numbers of occurrences into the cumulative numbers in a processor taking care of an immediately following range.

The shared-memory multiprocessor system of the present invention that performs the multi-stage parallel sorting of large-scale table data may use at least one processor, or preferably one processor, alone, to perform the conversion of the numbers of occurrences of the values of the digit of interest into cumulative numbers. To this end, each processor in the shared-memory multiprocessor system of the present invention includes a part to select radix representation of the field value sequence numbers in response to the range of the field value sequence numbers, and a part to repeat sorting by selecting a digit of interest successively from a least significant digit to a most significant digit in the radix representation of the field value sequence numbers, by use of the record number array as a current record number array for a first time sorting and by use of a new record number array as a current record number array for a second time sorting and onward.

The part to repeat the sorting in each processor includes a part to determine a portion of the record number array that is taken care of by the corresponding processor, and a part to count the numbers of occurrences of values of the digit of interest in the field value sequence numbers corresponding to the records contained in the portion of the record number array.

Further, the part to repeat sorting in at least one processor includes a part to convert the numbers of occurrences of the values of the digit of interest in the field value sequence numbers into cumulative numbers in an order of the values of the digit of interest in the field value sequence numbers and in an order of portions of the record number array within a range corresponding to the same value of the digit of interest in the field value sequence number.

Moreover, the above-noted part to repeat sorting further includes a part to utilize as pointers the cumulative numbers of the values of the digit of interest in the field value sequence numbers corresponding to the records contained in the portion of the record number array, thereby storing the record numbers contained in the portion of the record number array in the new record number array.

According to the present invention, there is no need for each processor to determine a range of the values of the digit of interest in the field value sequence numbers that is to be taken care of by the corresponding processor, and, also, there is no need for a plurality of processors to share the task of converting the numbers of occurrences into cumulative numbers. The configuration of the shared-memory multiprocessor system is thus simplified.

The third embodiment of the present invention provides a program that implements the information processing method as described above.

The fourth embodiment of the present invention provides a computer-readable record medium that has such program recorded therein.

Advantage of the Invention

The present invention can provide an information processing apparatus that can perform the high-speed parallel sorting of large-scale table data in the shared-memory multiprocessor system environment.

BEST MODE FOR CARRYING OUT THE INVENTION

In the following, various embodiments of the present invention will be described with reference to the accompanying drawings.

[Configuration of Computer System]

FIG. 1 is a schematic diagram showing an embodiment of a computer system that performs an information processing method for sorting records according to the field values of the records in a predetermined field according to the present invention. As shown in FIG. 1, a computer system 10 includes p processors (CPU) 12-1, 12-2, ..., and 12-p for executing programs to control the entirety and individual parts of the system, a shared memory 14 such as a RAM (Random Access Memory) for storing work data and the like, a ROM (Read Only Memory) 15 for storing programs and the like, a fixed storage medium 18 such as a hard disk, a CD-ROM driver 20 for accessing a CD-ROM 19, an interface (I/F) 22 disposed between the CD-ROM driver 20 or external network (not shown) and an external terminal for connection, an input apparatus 24 comprised of a keyboard and mouse, and a CRT display apparatus 26. The CPU 12, the RAM 14, the ROM 16, the external storage medium 18, the I/F 22, the input apparatus 24, and the display apparatus 26 are connected to each other via the bus 2B. Although not illustrated, each CPU may be provided with a dedicated local memory.

A program for sorting records according to the field values of the records in a predetermined field according to the present embodiment may be stored in the CD-ROM 19 and read by the CD-ROM driver 20, or may be stored in the ROM 16 in advance. Alternatively, the program may be read from the CD-ROM 19 for storage in a predetermined area of the external storage medium 18. Alternatively, the program may be supplied from an external source via the network (not shown), the external terminal, and the I/F 22.

A shared-memory multiprocessor system according to the present embodiment may be implemented by the computer system 10 executing a program for sorting records according to the field values of the records in a predetermined field.

[Information-Block-Based Data Management Mechanism]

FIG. 2 is a drawing showing an example of table data for explaining a data management mechanism. This table data is stored in the computer as a data structure as shown in FIG. 3 by using the data management mechanism described in International Publication No. WO00/10103 described above.

As shown in FIG. 3, an array 301 (hereinafter simply referred to as "OrdSet") that assigns sequence numbers representing the order of internal data to sequence numbers representing the order of individual records of table data is provided in which the sequence numbers representing the order of internal data are arranged as values with respect to the respective table-data records. In this example, all of the table data are represented as the internal data, so that the record numbers of table data correspond to the sequence numbers representing the order of internal data.

As for gender, for example, it can be learned from the array OrdSet 301 that the sequence number representing the order of internal data corresponding to record 0 of the table data is "0". An actual gender value of the record having sequence number "0", which is either "male" or "female", is obtained by referring to a pointer array 302 (hereinafter simply referred to "VNo") that points to a value list 303 (hereinafter simply referred to "VL") in which actual values are sorted in a predetermined sequence. The pointer array 302 stores pointers pointing to the items of the actual value list 303 according to the order of sequence numbers stored in the array OrdSet 301. With this arrangement, the gender field value corresponding to record "0" of the table data is obtained by: (1) extracting sequence number "0" corresponding to record "0" from the array OrdSet 301; (2) extracting item "1" corresponding to sequence number "0" from the pointer array 302 pointing to the value list; and (3) extracting item "female" from the value list 303 that is indicated by item "1" extracted from the pointer array 302 pointing to the value list.

Any field value can be similarly obtained with respect to other records and with respect to age and height.

In this manner, table data is represented by a combination of the value list VL and the pointer array VNo pointing to the value list, and this combination is referred to as "information block". In FIG. 3, the information blocks regarding gender, age, and height are shown as information blocks 308, 309, and 310, respectively.

If a single memory (defined as meaning a single address space for access despite one or more physical entities) is used, it suffices for a single computer to store in the memory an array OrdSet for ordered set and a value list VL and pointer array VNo constituting each information block. In order to maintain a large number of records, however, it is desirable to perform parallel processing on the large number of records since the required memory size increases in response to the record size.

In the present embodiment, thus, the plurality of processors access record data stored in the shared memory, thereby achieving high-speed sorting based on the parallel processing by the plurality of processors.

[Parallel Sorting]

In the following, a description will be given of a parallel sorting method, which is an information processing method for sorting records according to the field values of the records in a predetermined field in a shared-memory multiprocessor system according to the present embodiment. FIGS. 4A and 4B are drawings showing a data structure of sort object. Table data 401 shown in FIG. 4A represents the data structure of a sort object by use of a matrix format, in which 20 records from record 0 to record 19 are included. Each record is comprised of two fields, i.e., "age" and "area". A data structure 402 shown in FIG. 4B represents a data structure stored in the shared memory 14 of the computer system 10. A record number array (OrdSet: representing an ordered set) 403 shown in FIG. 4B stores record numbers 0 to 19 in a predetermined order. In this example, the record numbers are stored in the following order: 0 to 19. Age data and area data are stored as an information block 404 and an information block 405, respectively. The age information block 404 includes a field value sequence number array 406 (which may hereinafter be referred to as VNo: value number) in which field value sequence numbers corresponding to age field values are stored in the order of record numbers, and further includes a field value array 407 (which may hereinafter be referred to as VL: value list) in which the age field values are stored in the order of field value sequence numbers corresponding to these field values. By the same token, the area information block 405 includes a field value sequence number array 408 in which field value sequence numbers corresponding to area field values are stored in the order of record numbers, and further includes a field value array 409 in which the area field values are stored in the order of field value sequence numbers corresponding to these field values. The p processors 12-1, . . . , and 12-p of the computer system 10 can access these data stored in the shared memory 14.

FIG. 5 is a flowchart showing a parallel sorting method according to an embodiment of the present invention. In this embodiment, the number of CPUs is four, all of which operate in parallel. It should be noted that the number of CPUs in the system and the number of CPUs operating in parallel are not limited to this example. In the following, for the sake of convenience of explanation, a description will be given of a case in which the age field items are sorted in an ascending order of age. The items of the age field value array are arranged in an ascending order of age. The parallel sorting method is comprised of 5 steps, i.e., step 501 to step 505.

Step 501: The record number array is divided four-fold, and the divided portions are allocated to the four CPUs (see FIG. 6).

Step 502: The CPUs operate in parallel to count the numbers of occurrences of field value sequence numbers corresponding to the records contained in the allocated portion of the record number array (see FIGS. 7A and 7B through FIGS. 9A and 9B).

Step 5-3: The range of the field value sequence numbers, i.e., five values from field value sequence number 0 to field value sequence number 4, are allocated to the four CPUs. For example, field value sequence numbers 0 and 1 are allocated to CPU-0, and field value sequence numbers 2 through 4 are allocated to CPU-1 through CPU-3, respectively (see FIG. 10A).

Step 504: Each of the four CPUs converts the numbers of occurrences of allocated field value sequence numbers to cumulative numbers in the order of field value sequence numbers and in the order of the record number array portions within a range corresponding to the same field value sequence number (see FIGS. 10A and 10B).

Step 505: The four CPUs utilize as pointers the cumulative numbers of field value sequence numbers corresponding to the records contained in the allocated portions of the record number array, thereby storing record numbers contained in the allocated record-number-array portions in another record number array (see FIGS. 11A and 11B through FIGS. 13A and 13B).

In the following, each step will be described in detail.

FIG. 6 is a drawing for explaining the initialization step 501 of the parallel sorting method. The four CPUs CPU-0 through CPU-3 are allocated with respective four records taken in sequence from the top of the record number array. For example, CPU-0 takes care of first item OrdSet[0] to fifth item OrdSet[4] of the record number array ("x" as appear in OrdSet[x] means the subscript of array OrdSet). Count arrays Count-0, Count-1, Count-2, and Count-3 are provided in the shared memory 14 for the purpose of counting the numbers of occurrences of field value sequence numbers, and are assigned to the respective CPUs. The number of the Count arrays is identical to the number of CPUs, and the array size of each Count array is identical to the size of the VL array. The elements of the Count arrays are initialized to zero.

FIGS. 7A and 7B through FIGS. 9A and 9B are drawings for explaining the count-up step 502 of the parallel sorting method. In sub-step 1 of FIG. 7A, CPU-0 reads value "0" of OrdSet[0], and uses this read value "0" as a subscript to read value "1" of VNo[0], followed by using this value "1" as a subscript to increment value "0" of Count-0[1] to "1", for example. By the same token, CPU-1 reads value "5" of OrdSet[5], and uses this read value "5" as a subscript to read value "2" of VNo[5], followed by using this value "2" as a subscript to increment value "0" of Count-1[2] to "1". The same also applies in the case of CPU-2 and CPU-3. In sub-step of FIG. 7B, CPU-0 reads value "1" of OrdSet[1], and uses this read value "1" as a subscript to read value "3" of VNo[1], followed by using this value "3" as a subscript to increment value "0" of Count-0[3] to "1", for example. The same also applies in the case of CPU-1, CPU-2, and CPU-3. As shown in FIGS. 8A and 8B and FIG. 9A, each processor reads an element from the array OrdSet allocated thereto, and uses this element as a subscript to read an element from the array VNo, followed by using this read element as a subscript to increment the corresponding element of the Count array. In the end, the count-up results as shown in FIG. 9B are obtained. Element Count-0[i] of the array Count-0 shown in FIGS. 9A and 9B represents the number of occurrences of age field value sequence number i corresponding to the records contained in the range from OrdSet[0] to OrdSet[4] of the array OrdSet allocated to CPU-0. For example, Count-0[0] indicates that the number of occurrences of field value sequence number 0 within the range allocated to CPU-0 is 1, and Count-3[1] indicates that the number of occurrences of field value sequence number 1 within the range allocated to CPU-3 is 2.

FIGS. 10A and 10B are drawings for explaining the accumulation steps 503 and 504 of the parallel sorting method. In this example, cumulative numbers are obtained in an ascending order of field value sequence numbers in conformity with the ascending order sorting. CPU-0 takes care of the task of obtaining cumulative numbers for the first and second rows (i.e., field value sequence numbers 0 and 1) of the Count array, and CPU-1 through CPU-3 take care of the task of obtaining cumulative numbers for the third through fifth rows (i.e., field value sequence numbers 3 through 5) of the Count array, respectively. As shown in FIG. 10A, accumulation is first performed in the horizontal direction (i.e., with respect to a row having the same subscript), and, then, the cumulative number of the preceding row is added to the cumulative numbers of the following row, resulting in the obtainment of all the cumulative numbers. It should be noted that accumulation in the horizontal direction can be performed by each CPU in parallel.

Count[i][j] is used to represent a count value of field value sequence number j ($0 \leq j \leq q-1$) counted up by CPU-i that is the i-th CPU ($0 \leq i \leq p-1$), and a cumulative number is indicated by Count'[i][j]. Then, the accumulation process can be described as follows.
Count'[0][0]=0
Count'[i][0]=Count'[i−1][q−1]+Count[i−1][q] i>1
Count'[i][j]=Count'[i][j−1]+Count[i][j−1] j>1

In the cumulative number computation described above, there is a need to carry over offset Count'[i−1][q−1] from a preceding row to a following row. Although the CPUs perform the respective portions of the cumulative number computation in this embodiment, one of the processors may be selected to make this processor solely perform the cumulative number computation.

FIG. 10B shows the sequence of the accumulation process in the vertical direction. For example, in FIG. 10B, the row corresponding to "(1) Count-0: 0" indicates that count value "1" of first element Count-0[0] of the array Count-0 is converted into cumulative number 0. Namely, when a series of count values:
1,2,2,0,2,0,2,2,0,2,0,1,1,1,0,1,1,0,1,1
is converted into cumulative numbers, the result will be obtained as follows.
0,1,3,5,5,7,7,9,11,11,13,13,14,15,16,16,17,18,18,19

FIGS. 11A and 11B through FIGS. 13A and 13B are drawings for explaining the transfer step 505 that stores record numbers in a new record number array. In the transfer step, each CPU reads a record number belonging to the allocated range from the record number array OrdSet, and uses this record number as a subscript to read a field value sequence number from the pointer array VNo, followed by using this field value sequence number as a subscript to read a cumulative number from the Count array that is associated with the CPU and contains cumulative numbers. The obtained cumulative number is used as a pointer to store the record number in a new record number array OrdSet', followed by incrementing the cumulative number of the Count array by 1.

In sub-step 1 of FIG. 11A, for example, CPU-0 reads value "0" (i.e., record number 0) of OrdSet[0], and then reads value "1" of VNo[0], followed by reading value "5" of Count-0[1] of the assigned Count array, and then setting record number 0 in OrdSet[5], with an increment of the value of Count-0[1] to 6. This transfer process for record numbers are similarly performed as shown in sub-step 2 of FIG. 11B, sub-steps 3 and 4 of FIGS. 12A and 12B, and sub-step 5 of FIG. 13A. In the end, the new record number array OrdSet' shown in FIG. 13B is obtained.

FIGS. 14A through 14C and FIGS. 15A and 15B are drawings showing outcomes obtained by the parallel sorting method according to the embodiment of the present invention applied to the data structure shown in FIG. 4B. In this example, ascending-order sorting is performed with respect to the age field, so that the obtained record number array OrdSet' includes records that are arranged in an ascending order of age, and have age field values 16, 18, 20, 21, and 23. Further, the order of records corresponding to the same age remains the same as the order of records as appear in the original record number array OrdSet.

The parallel sorting method has been described with reference to an example of ascending order sorting regarding age, but may as well be applied to descending order sorting regarding age. Descending order sorting is performed similarly to ascending order sorting, but is different from ascending order sorting with regard to the order of accumulation process. FIGS. 16A and 16B are drawings for explaining the accumulation step of the parallel sorting method according to the embodiment of the present invention. As shown in FIG. 16A, accumulation is first performed in the horizontal direction (i.e., with respect to a row having the same subscript), and, then, the cumulative number of the following row is added to the cumulative numbers of the preceding row, resulting in the obtainment of all the cumulative numbers. It should be noted that accumulation in the horizontal direction can be performed by each CPU in parallel.

Count[i][j] is used to represent a count value of field value sequence number j ($0 \leq j \leq q-1$) counted up by CPU-i that is the i-th CPU ($0 \leq i \leq p-1$), and a cumulative number is indicated by Count'[i][j]. Then, the accumulation process can be described as follows.
Count'[p−1][0]=0
Count'[i][0]=Count'[i+1][q−1]+Count[i+1][q] i>1
Count'[i][j]=Count'[i][j−1]+Count[i][j−1] j>1

In the cumulative number computation described above, there is a need to carry over offset Count'[i+1][q−1] from a following row to a preceding row. Although the CPUs perform the respective portions of the cumulative number computation in this embodiment, one of the processors may be selected to make this processor solely perform the cumulative number computation. FIG. 16B shows the sequence of the accumulation process in the vertical direction. In FIG. 16B, the row corresponding to "(1) Count-0: 4", for example, indicates that count value "1" of first element Count-0[4] of the array Count-0 is converted into cumulative number 0.

FIGS. 17A and 17B through FIGS. 19A and 19B are drawings for explaining the transfer step 505 of the descending order parallel sorting method. In the transfer step, each CPU reads a record number belonging to the allocated range from the record number array OrdSet, and uses this record number as a subscript to read a field value sequence number from the pointer array VNo, followed by using this field value sequence number as a subscript to read a cumulative number from the Count array that is associated with the CPU and contains cumulative numbers. The obtained cumulative number is used as a pointer to store the record number in a new record number array OrdSet', followed by incrementing the cumulative number of the Count array by 1.

FIGS. 20A and 20B and FIGS. 21A through 21C are drawings showing outcomes obtained by the descending order parallel sorting method according to the embodiment of the present invention applied to the data structure shown in FIG. 4B. In this example, descending-order sorting is performed with respect to the age field, so that the obtained record number array OrdSet' includes records that are arranged in descending order of age, and have age field values 23, 21, 20, 18, and 16. Further, the order of records corresponding to the same age remains the same as the order of records as appear in the original record number array OrdSet.

[Parallel Accumulation Computation]

In the following, the accumulation step 504 described in the above embodiment will further be described in detail. When the count results as shown in FIG. 9B are obtained, the accumulation process as shown in FIGS. 10A and 10B is performed. In order to perform accumulation in parallel, each CPU is assigned with a respective range of field value sequence numbers. Field value sequence numbers 0 and 1 are assigned to CPU-0, field value sequence number 2 assigned to CPU-1, field value sequence number 3 assigned to CPU-2, and field value sequence number 4 assigned to CPU-3. When the elements of the Count arrays are represented as Count[i][j] as described above (i: CPU number performing counting, j: field value sequence numbers), the respective ranges of the CPUs for accumulation are as follows.

Range of CPU-0 (Field Value Sequence Numbers 0 and 1)
Count[0][0]=1
Count[1][0]=2
Count[2][0]=2
Count[3][0]=0
Count[0][1]=2
Count[1][1]=0
Count[2][1]=2
Count[3][1]=2

Range of CPU-1 (Field Value Sequence Number 2)
Count[0][2]=0
Count[1][2]=2
Count[2][2]=0
Count[3][2]=1

Range of CPU-2 (Field Value Sequence Number 3)
Count[0][3]=1
Count[1][3]=1
Count[2][3]=0
Count[3][3]=1

Range of CPU-3 (Field Value Sequence Number 4)
Count[0][4]=1
Count[1][4]=0
Count[2][4]=1
Count[3][4]=1

With the respective ranges as determined above, each CPU-i calculates Sum[i] that is the sum of counts within the assigned range as follows.
Sum[0]=11
Sum[1]=3
Sum[2]=3
Sum[3]=3
The computation of these sums is parallel processing.

After this, these sums are made to propagate successively from CPU-0 to CPU-3 to obtain aggregated sums Aggr_sum[i] as follows.
Aggr_sum[0]=0
Aggr_sum[1]=Aggr_sum[0]+Sum[0]=11
Aggr_sum[2]=Aggr_sum[1]+Sum[1]=14
Aggr_sum[3]=Aggr_sum[2]+Sum[2]=17
The aggregated sums are defined such that the first value is 0.

At the end, each CPU-i converts count values into cumulative numbers within the respective range, and adds derived aggregated sum Aggr_sum[i] to the cumulative numbers so as to obtain final cumulative numbers Count'. The computation of Count' is also parallel processing. With this arrangement, the following is obtained.

Range of CPU-0 (Field Value Sequence Numbers 0 and 1)
Count'[0][0]=0+Aggr_sum[0]=0+0=0
Count'[1][0]=Count'[0][0]+Count[0][0]=0+1=1
Count'[2][0]=Count'[1][0]+Count[1][0]=1+2=3
Count'[3][0]=Count'[2][0]+Count[2][0]=3+2=5
Count'[0][1]=Count'[3][0]+Count[3][0]=5+0=5
Count'[1][1]=Count'[0][1]+Count[0][1]=5+2=7
Count'[2][1]=Count'[1][1]+Count[1][1]=7+0=7
Count'[3][1]=Count'[2][1]+Count[2][1]=7+2=9

Range of CPU-1 (Field Value Sequence Number 2)
Count'[0][2]=0+Aggr_sum[1]=9+2=11
Count'[1][2]=Count'[0][2]+Count[0][2]=11+0=11
Count'[2][2]=Count'[1][2]+Count[1][2]=11+2=13
Count'[3][2]=Count'[2][2]+Count[2][2]=13+0=13

Range of CPU-2 (Field Value Sequence Number 3)
Count'[0][3]=0+Aggr_sum[2]=0+14=14
Count'[1][3]=Count'[0][3]+Count[0][3]=14+1=15
Count'[2][3]=Count'[1][3]+Count[1][3]=15+1=16
Count'[3][3]=Count'[2][3]+Count[2][3]=16+0=16

Range of CPU-3 (Field Value Sequence Number 4)
Count'[0][4]=0+Aggr_sum[3]=0+17=17
Count'[1][4]=Count'[0][4]+Count[0][4]=17+1=18
Count'[2][4]=Count'[1][4]+Count[1][4]=18+0=18
Count'[3][4]=Count'[2][4]+Count[2][4]=18+1=19

These results match the results of cumulative number computation shown in FIG. 10B.

[Multi-Stage Parallel Sorting]

The above-described parallel sorting based on counting sort may be combined with the concept of radix sort. When the size of a field value array VL is large, i.e., when the number of field value sequence numbers is large, the field value sequence numbers can be expressed by radix representations to perform the above-described parallel sort on a digit-by-digit basis, thereby achieving efficient sorting. In the following, such multi-state parallel sorting method will be described. The multi-stage parallel sorting according to this embodiment performs sorting with respect to successive digits of interest by stating from the least-significant digit, and performs sorting with respect to the most-significant digit at the end, which concludes the sorting process.

The data structure shown in FIG. 4B that is used in the example of the previously described parallel sorting method is also used in an example of the multi-stage parallel sorting method according to the embodiment of the present invention. In this embodiment, the number of CPUs is four, all of which operate in parallel. It should be noted that the number of CPUs in the system and the number of CPUs operating in parallel are not limited to this example. In the following, for the sake of convenience of explanation, a description will be given of a case in which the age field items are sorted in an ascending order of age. The items of the age field value array are arranged in an ascending order of age. In the data structure shown in FIG. 4B, the age field value sequence number VNo can assume values from 0 to 4. When the field value sequence numbers are divided by use of radix-4, the field value sequence numbers are broken into two digits comprised of an upper digit and a lower digit. Specifically, the lower digit assumes the value that is modulo(4) of the field value sequence number, and the upper digit assumes the value that is a quotient obtained by dividing the field value sequence number by 4.

FIG. 22 is a flowchart showing a multi-stage parallel sorting method according to an embodiment of the present invention. The multi-stage parallel sorting method is comprised of 5 steps, i.e., step 2201 to step 2205.

Step 2201: A radix (i.e., radix-4 in this example) for field value sequence numbers is selected according to the range of the field value sequence numbers, and an initial record number array OrdSet is used as a current record number array, with the least-significant digit of the field value sequence numbers (the value of modulo(4) of a field value sequence number) being selected as a digit of interest.

Step 2202: The current record number array is divided and allocated to the four processors.

Step 2203: Each of the four processors counts the numbers of occurrences of the values of the digit of interest in the field value sequence numbers corresponding to the records contained in the allocated portion of the record number array.

Step 2204: The range of values of the digit of interest in the field value sequence numbers is divided and allocated to the four processors.

Step 2205: Each of the four CPUs converts the numbers of occurrences of the values of the digit of interest in the allocated field value sequence numbers to cumulative numbers in the order of values of the digit of interest in the field value sequence numbers and in the order of the record number array portions within a range corresponding to the same value of the digit of interest in the field value sequence numbers.

Step 2206: Each of the four CPUs utilizes as pointers the cumulative numbers derived from the numbers of occurrences of the values of the digit of interest in the field value sequence numbers corresponding to the records contained in the allocated portion of the record number array, thereby storing the record numbers contained in the allocated record-number-array portion in a new record number array.

Step 2207: A check is made as to whether sorting is performed up to the most-significant digit of the field value sequence numbers that are expressed by radix representation, and the multi-stage parallel sorting process comes to an end if sorting has been performed up to the most-significant digit.

Step 2208: One of the remaining digits, if any, is selected as the digit of interest, and the procedure goes back to step 2202, with the new record number array then serving as a current record number array.

In the multi-stage parallel sorting method according to the embodiment of the present invention described above, the sorting process from step 2202 to step 2206 is substantially the same as the parallel sorting method of the present invention, except that the value of the digit of interest in a field value sequence number is used in place of a field value sequence number.

In the following, the multi-stage parallel sorting method according to the embodiment of the present invention will be described in detail. In this example, the data shown in FIG. 4B is sorted in ascending order of age by use of four CPUs. The initialization step 2201 makes sort settings with respect to the value of modulo-4 (MOD 4) of an age field value sequence number (i.e., the value of the lower digit) as a first-stage sorting process, and makes sort settings with respect to the value of a quotient (DIV 4) obtained by dividing an age field value sequence number by four as a second-stage sorting process.

In the initialization step 2201, arrays similar to the Count arrays shown in FIG. 6 are prepared. The arrays in this example are used to count the numbers of occurrences of the values of the digit of current interest in field value sequence numbers.

FIGS. 23A and 23B through FIGS. 25A and 25B are drawings for explaining a count step in the first stage of the multi-stage parallel sorting method. In sub-step 1 of FIG. 23A, CPU-0 reads value "0" of OrdSet[0], and uses this read value "0" as a subscript to read value "1" of VNo[0], followed by using modulo-4 (MOD4) value "1" of this value "1" as a subscript to increment value "0" of Count-0[1] to "1", for example. By the same token, CPU-1 reads value "5" of OrdSet[5], and uses this read value "5" as a subscript to read value "2" of VNo[5], followed by using MOD4 value of this value "2" as a subscript to increment value "0" of Count-1[2] to "1". Thereafter, sub-step 2 of FIG. 23B, sub-step 3 of FIG. 24A, sub-step 4 of FIG. 24B, and sub-step 5 of FIG. 25A are performed, resulting in the count-up outcomes as shown in FIG. 25B. Element Count-0[i] of the array Count-0 shown in FIGS. 23A and 23B through FIGS. 25A and 25B represents the number of occurrences of the value i of the digit of interest in an age field value sequence number corresponding to the records contained in the range from OrdSet[0] to OrdSet[4] of the array OrdSet allocated to CPU-0. For example, Count-0[0] indicates that the number of occurrences of value "0" of the lower-order digit in field value sequence numbers within the range allocated to CPU-0 is 1, and Count-3[1] indicates that the number of occurrences of value "1" of the lower-order digit in field value sequence numbers within the range allocated to CPU-3 is 2.

FIGS. 26A and 26B are drawings for explaining an accumulation step in the first stage of the multi-stage parallel sorting method. In this example, cumulative numbers are obtained in an ascending order of values of the lower-order digit in field value sequence numbers in conformity with the ascending order sorting. CPU-Q takes care of the task of obtaining cumulative numbers for the first row of the Count array (i.e., value "0" of the lower-order digit of field value sequence numbers), and CPU-1 through CPU-3 take care of the task of obtaining cumulative numbers for the second through fourth rows of the Count array (i.e., values "1" through "3" of the lower-order digit of field value sequence numbers), respectively. As shown in FIG. 26A, accumulation is first performed in the horizontal direction (i.e., with respect to a row having the same subscript), and, then, the cumulative number of the preceding row is added to the cumulative numbers of the following row, resulting in the obtainment of all the cumulative numbers. It should be noted that accumulation in the horizontal direction may be performed by each CPU in parallel as previously described, but may as well be performed by a single CPU.

FIGS. 27A and 27B through FIGS. 29A and 29B are drawings for explaining a transfer step that stores record numbers in a new record number array in the first stage of the multi-stage parallel sorting method. In the transfer step, each CPU reads a record number belonging to the allocated range from the record number array OrdSet, and uses this record number as a subscript to read the value of the lower-order digit of a field value sequence number from the pointer array VNo, followed by using this lower-order-digit value of the field value sequence number as a subscript to read a cumulative number from the Count array that is associated with the CPU and contains cumulative numbers. The obtained cumulative number is used as a pointer to store the record number in a new record number array OrdSet', followed by incrementing the cumulative number of the Count array by 1. FIG. 29B shows a record number array OrdSet' obtained by the above-described transfer step in the first stage.

In the second stage, the record number array OrdSet' obtained in the first stage is used as the initial conditions, and ascending-order sorting is performed with respect to the upper-order-digit values (DIV-4 values) of the age field value sequence numbers.

FIG. 30 is a drawing showing the preparation of Count arrays that is made by assigning the current record number array OrdSet' to the four CPUs in step 2202 of the second stage of the multi-stage parallel sorting method according to the embodiment of the present invention.

FIGS. 31A and 31B through FIGS. 33A and 33B are drawings for explaining a count step in the second stage of the multi-stage parallel sorting method. In sub-step 1 of FIG. 31A, CPU-0 reads value "2" of OrdSet'[0], and uses this read value "2" as a subscript to read value "4" of VNo[2], followed by using quotient (DIV4) value "1" obtained by dividing this value "1" by 4 as a subscript to increment value "0" of Count-0[1] to "1", for example. By the same token, CPU-1 reads value "12" of OrdSet'[5], and uses this read value "12" as a subscript to read value "4" of VNo[12], followed by using DIV4 value "1" of this value "4" as a subscript to increment value "0" of Count-1[1] to "1". Thereafter, sub-step 2 of FIG. 31B, sub-step 3 of FIG. 32A, sub-step 4 of FIG. 32B, and sub-step 5 of FIG. 33A are performed, resulting in the second-stage count-up outcomes as shown in FIG. 33B. Element Count-0[i] of the array Count-0 shown in FIGS. 31A and 31B through FIGS. 33A and 33B represents the number of occurrences of the upper-order-digit value i in age field value sequence numbers corresponding to the records contained in the range from OrdSet'[0] to OrdSet'[4] of the array OrdSet' allocated to CPU-0. For example, Count-0[0] indicates that the number of occurrences of value "0" of the upper-order digit in field value sequence numbers within the range allocated to CPU-0 is 4, and Count-3[1] indicates that the number of occurrences of value "1" of the upper-order digit in field value sequence numbers within the range allocated to CPU-3 is 0.

FIG. 34 is a drawing for explaining an accumulation step in the second stage of the multi-stage parallel sorting method. In this example, cumulative numbers are obtained in an ascending order of values of the upper-order digit in field value sequence numbers in conformity with the ascending order sorting. Since the number of the upper-order-digit values of field value sequence numbers is reduced to two through conversion into the multi-stages, CPU-0, for example, takes care of obtaining cumulative numbers for all the values in this example. As shown in FIG. 34A, CPU0 obtains cumulative numbers in the following order: Count[0][0], Count[1][0], Count[2][0], Count[3][0], Count[0][1], Count[1][1], Count[2][1], and Count[3][1]. In this example, of course, the computation of cumulative numbers may be performed by two CPUs, with upper-order-digit values "0" and "1" of field value sequence numbers being assigned to CPU-0 and CPU-1, respectively.

FIGS. 35A and 35B through FIGS. 37A and 37B are drawings for explaining a transfer step that stores record numbers in a new record number array in the second stage of the multi-stage parallel sorting method. In the transfer step, each CPU reads a record number belonging to the allocated range from the record number array OrdSet, and uses this record number as a subscript to read the value of the upper-order digit of a field value sequence number from the pointer array VNo, followed by using this upper-order-digit value of the field value sequence number as a subscript to read a cumulative number from the Count array that is associated with the CPU and contains cumulative numbers. The obtained cumulative number is used as a pointer to store the record number in a new record number array OrdSet", followed by incrementing the cumulative number of the Count array by 1. FIG. 37B shows a record number array OrdSet" obtained by the above-described transfer step in the second stage.

The multi-stage parallel sorting method of this embodiment is comprised of the two stages directed to the lower-order digit and upper-order digit of field value sequence numbers, so that no more sorting process will be performed. Namely, the record number array OrdSet" obtained in the second step is the results of ascending-order sorting regarding age performed with respect to the initial record number array OrdSet.

FIGS. 38A through 38C and FIGS. 39A and 39B are drawings showing outcomes obtained by the multi-stage ascending-order parallel sorting method according to the embodiment of the present invention applied to the data structure shown in FIG. 4B. In this example, ascending-order sorting is performed with respect to the age field, so that the obtained record number array OrdSet" includes records that are arranged in an ascending order of age, and have age field values 16, 18, 20, 21, and 23. Further, the order of records corresponding to the same age remains the same as the order of records as appear in the original record number array OrdSet. These results match the results that are obtained by applying the ascending-order parallel sorting method according to the embodiment of the present invention shown in FIGS. 14A through 14C and FIGS. 15A and 15B to the data structure shown in FIG. 4B.

Although the multi-stage parallel sorting method described above is directed to ascending-order sorting, the multi-stage parallel sorting method of the present invention may as well be applicable to descending-order sorting. As previously described, the computation of cumulative numbers in each stage of multi-stage parallel sorting may be performed in parallel by a plurality of processors, or may be performed by at least one processor, preferably by a single processor alone.

[Multi-stage Sorting]

The multi-stage parallel sorting described above performs sorting with respect to successive digits of interest by stating from the least-significant digit, and performs sorting with respect to the most-significant digit at the end, which concludes the sorting process. Alternatively, a sorting process may be performed with respect to successive digits of interest by stating from the most-significant digit, and may be performed with respect to the least-significant digit at the end, which concludes the sorting process. In the following, a brief description will be given of a method by which a sorting process is converted into multi-stages in sequence from the most-significant order to the least-significant order.

In this example, a data structure as shown in FIG. 40 is utilized. Further, the number of CPUs is one in this example. In the following, a description will be given of a case in which the age field items are sorted in ascending order of age. The total number of records is 20 from record number "0" to record number "19", and there are 9 field value sequence numbers from "0" to "8". Namely, the actual age is one of the 9 values, i.e., 15, 16, 18, 19, 20, 21, 23, 25 and 28. In the data structure shown in FIG. 40, the age field value sequence number VNo can assume values from 0 to 8. When the field value sequence numbers are divided by use of radix-4, a quotient obtained by dividing a field value sequence number by four is an upper-order-digit value, and a module-4 value of the field value sequence number is a lower-order-digit value. The upper-order digit of a field value sequence number assumes one of the three values "0", "1", and "2", and the lower-order digit assumes one of the four values "0", "1", "2", and "3".

First, an array Count-1 for counting the numbers of occurrences of the upper-digit values "0", "1", and "2" is prepared and initialized by setting "0" to all the elements thereof in the first stage. For example, Count-1[0] is an area used to count the number of records for which the upper-order value of the field value sequence number is 0.

Next, starting from the first element (i.e., record) in the record number array OrdSet, the corresponding field value sequence numbers are successively read from the array VNo, and a quotient obtained by dividing each field value sequence number by four is used as a pointer to increment the value of an element in the array Count-1. FIGS. 41A through 41D are drawings for exampling an example in which the upper-order-digit values of field value sequence numbers are computed for the three record numbers OrdSet[0]=0, OrdSet[7]=7, OrdSet[19]=19, and the corresponding counters are counted up, followed by an accumulation process. As shown in FIG. 41C, the count-up process of the first stage indicates that the number of records having upper-order-digit value "0" of a field value sequence number is 12, that the number of records having upper-order-digit value "1" is 7, and that the number of records having upper-order-digit value "2" is 1. As shown in FIG. 41D, the counted values are accumulated.

After this, array Aggr-1 in which the numbers of occurrences of upper-order-digit values of field value sequence numbers are accumulated is used to covert the record number array OrdSet into a new record number array OrdSet'. Specifically, VNo[j] is read if OrdSet[i]=j, and Aggr-1[k] is read where k is the quotient (VNo[j] DIV 4) obtained by dividing VNo[j] by four, followed by setting record number j to OrdSet [Aggr-1[k]], and then incrementing Aggr-1[k]. FIGS. 42A and 42B are illustrative drawing for explaining a record number transfer process in such multi-stage sorting. FIG. 42A shows the transfer of OrdSet[0], and FIG. 42B shows the transfer of OrdSet[19]. FIG. 43 shows the record number array OrdSet' containing the results of the first-stage record number transfer and a range of distribution of upper-order-digit values. The records having upper-order-digit value "0" are distributed within the range (section 0) from OrdSet'[0] to OrdSet'[11] of the record number array OrdSet', and the records having upper-order-digit value "1" are distributed within the range (section 1) from OrdSet'[12] to OrdSet'[18] of the record number array OrdSet', with the records having upper-order-digit value "2" being present in OrdSet'[19] (section 2) of the record number array OrdSet'.

In the second stage of the multi-stage parallel sorting, the record numbers are sorted in each section according to the lower-order-digit values of field value sequence numbers. Section 1 of OrdSet', for example, is transferred to corresponding section 1 of OrdSet'. In second-stage sorting, no record number is transferred to outside the section because the section is already determined based on the upper-order digit.

FIG. 44 is a drawing showing the initial conditions of the second stage of the multi-stage sorting. In the following, section 1 of OrdSet' will be described. When a plurality of processors are present, these processors may be assigned to respective sections, so that the following process is performed in parallel. Count-2 is used to count the numbers of occurrences of the lower-order-digit values (0, 1, 2, 3) of the field value sequence numbers in section 1.

FIGS. 45A through 45C are drawings for explaining counting-up and accumulation performed in the second stage of the multi-stage sorting. A count-up array as shown in FIG. 45B is obtained by successively performing a count-up by starting from FIG. 45A. This count-up array is subjected to accumulation as shown in FIG. 45C.

Finally, the second cumulative-number array Aggr-2 is used as pointers to transfer section 1 of the record number array OrdSet' to section 1 of the record number array OrdSet", with which the multi-stage sorting comes to an end. FIGS. 46A and 46B are drawings for explaining record-number transfer in the second stage of the multi-stage sorting. Specifically, VNo[j] is read if OrdSet'[i]=j, and Aggr-2[k] is read where k is the remainder (VNo[j] MOD 4) obtained by dividing VNo[j] by four, followed by setting record number j to OrdSet"[Aggr-2[k]], and then incrementing Aggr-2[k]. FIG. 46A shows the transfer of OrdSet'[14], and FIG. 46B shows the transfer of OrdSet'[18]. Section 1 of OrdSet" shown in FIG. 46B demonstrates the final results of sorting obtained for section 1.

Similarly to section 1, the second-stage counting-up, accumulation, and record-number transfer are performed with respect to section 0 and section 2, so that the entirety of the record number array OrdSet is transferred to the record number array OrdSet". With this, the sorting comes to an end.

As previously described, according to the embodiment of the present invention, the computer system 10 executes a program for sorting records according to the field values of the records in a predetermined field. More specifically, the program according to the present embodiment causes each CPU to perform the above-described process steps or to perform the above-described functions as will be described in the following.

In the present embodiment, the computer system 10 may be provided with an OS (e.g., Linux: registered trademark). At the initial state, a given CPU (e.g., CPU 12-1) loads the program to memory (e.g., the shared memory 14) under the control of the OS. As the program is loaded to the memory, the CPUs 12-1, 12-2, . . . , and 12-p operate under the control of the OS to perform a predetermined function when each of the CPUs is supposed to perform processing. Namely, each CPU reads predetermined process steps of the program stored in the shared memory 14, and execute these process steps. On the other hand, when a specific CPU is supposed to perform processing, this specific CPU operates under the control of the OS to perform another predetermined function. Namely, only the specific CPU reads other predetermined process steps of the program stored in the shared memory 14, and execute these other process steps. The storage location for the program executed by each CPU is not limited to the shared memory 14, but may be a local memory (not shown) associated with each CPU.

In this manner, the program causes each CPU to perform a predetermined function under the control of the OS according to the present embodiment, and may cause a specific CPU to perform another predetermined function according to need.

The present invention is not limited to the embodiments described above, and may be subject to various modifications within the scope of the invention described in the claims, with explicit understanding that such modifications are within the scope of the present invention.

BRIEF DESCRIPTION OF DRAWINGS

FIG. 2 is a drawing showing an example of table data for explaining a data management mechanism.

FIG. 3 is an illustrative drawing for explaining the data management mechanism according to the embodiment of the present invention.

FIG. 6 is an illustrative drawing for explaining an initialization step of the parallel sorting method according to the embodiment of the present invention.

FIGS. 9A and 9B are drawings (3) for explaining the count-up step of the parallel sorting method according to the embodiment of the present invention.

FIGS. 10A and 10B are drawings for explaining the accumulation step of the ascending-order parallel sorting method according to the embodiment of the present invention.

FIGS. 14A to 14C are drawings (1) showing outcomes obtained by the ascending order parallel sorting method according to the embodiment of the present invention applied to the data structure shown in FIG. 4B.

FIGS. 15A and 15B are drawings (2) showing outcomes obtained by the ascending order parallel sorting method according to the embodiment of the present invention applied to the data structure shown in FIG. 4B.

FIGS. 16A and 16B are drawings for explaining the accumulation step of the descending-order parallel sorting method according to the embodiment of the present invention.

FIGS. 17A and 17B are drawings (1) for explaining the transfer step of the descending-order parallel sorting method according to the embodiment of the present invention.

FIGS. 20A and 20B are drawings (1) showing outcomes obtained by the descending order parallel sorting method according to the embodiment of the present invention applied to the data structure shown in FIG. 4B.

FIGS. 21A to 21C are drawings (2) showing outcomes obtained by the descending order parallel sorting method according to the embodiment of the present invention applied to the data structure shown in FIG. 4B.

FIG. 22 is a flowchart showing a multi-stage parallel sorting method according to an embodiment of the present invention.

FIGS. 25A and 25B are drawings (3) for explaining the count-up step in the first stage of the multi-stage parallel sorting method according to the embodiment of the present invention.

FIGS. 26A and 26B are drawings for explaining an accumulation step in the first stage of the multi-stage ascending-order parallel sorting method according to the embodiment of the present invention.

FIG. 30 is an illustrative drawing for explaining an initialization step of the second stage of the multi-stage parallel sorting method according to the embodiment of the present invention.

FIG. 34 is an illustrative drawing for explaining an accumulation step of the second stage of the multi-stage ascending-order parallel sorting method according to the embodiment of the present invention.

FIGS. 38A to 38C are drawings (1) showing outcomes obtained by the multi-stage ascending order parallel sorting method according to the embodiment of the present invention applied to the data structure shown in FIG. 4B.

FIGS. 39A and 39B are drawings (2) showing outcomes obtained by the multi-stage ascending order parallel sorting method according to the embodiment of the present invention applied to the data structure shown in FIG. 4B.

Figure 40:
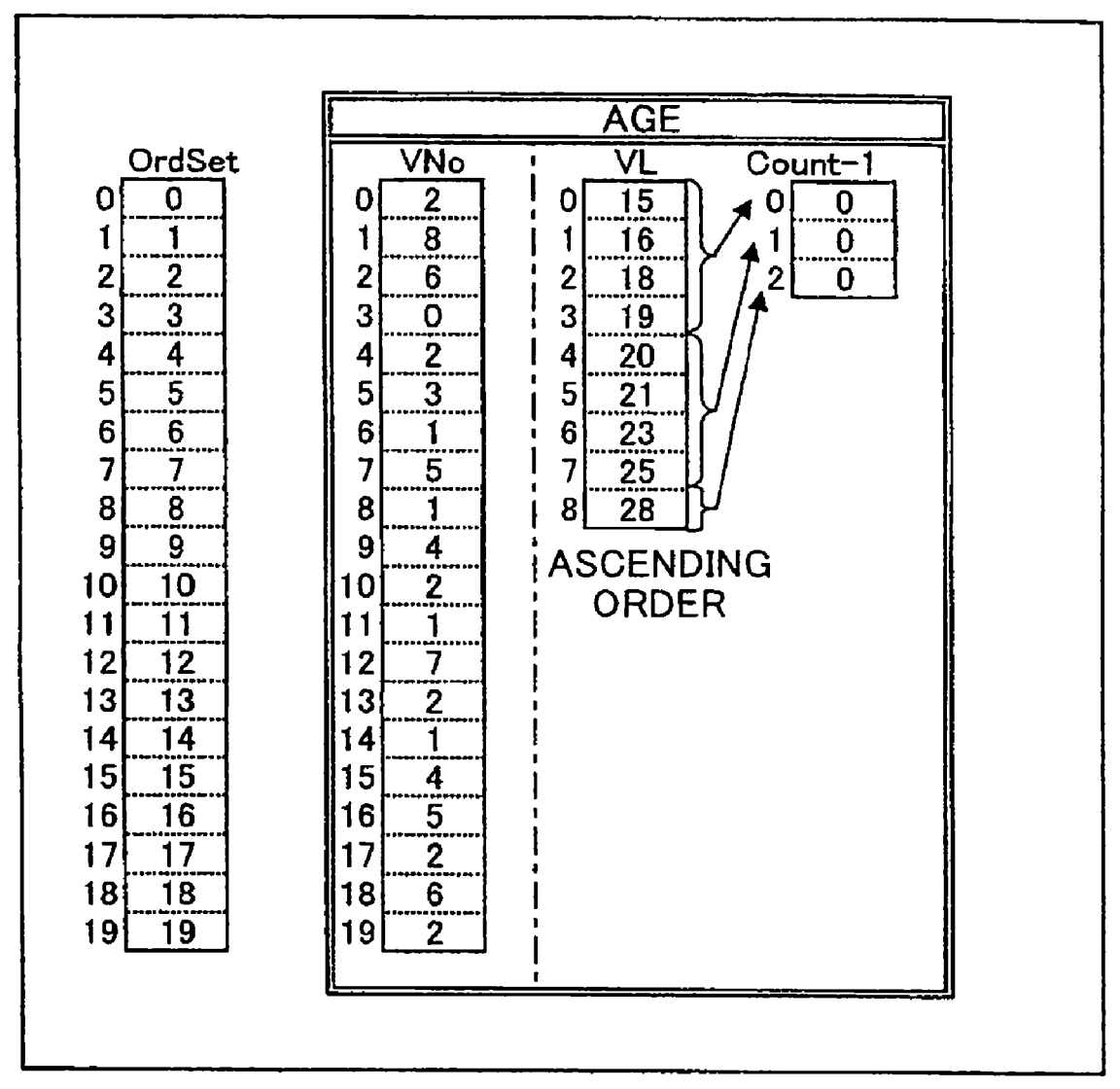

FIG. 40 is a data structure diagram for explaining multi-stage sorting.

DESCRIPTION OF REFERENCE NUMBERS

Figure 1:
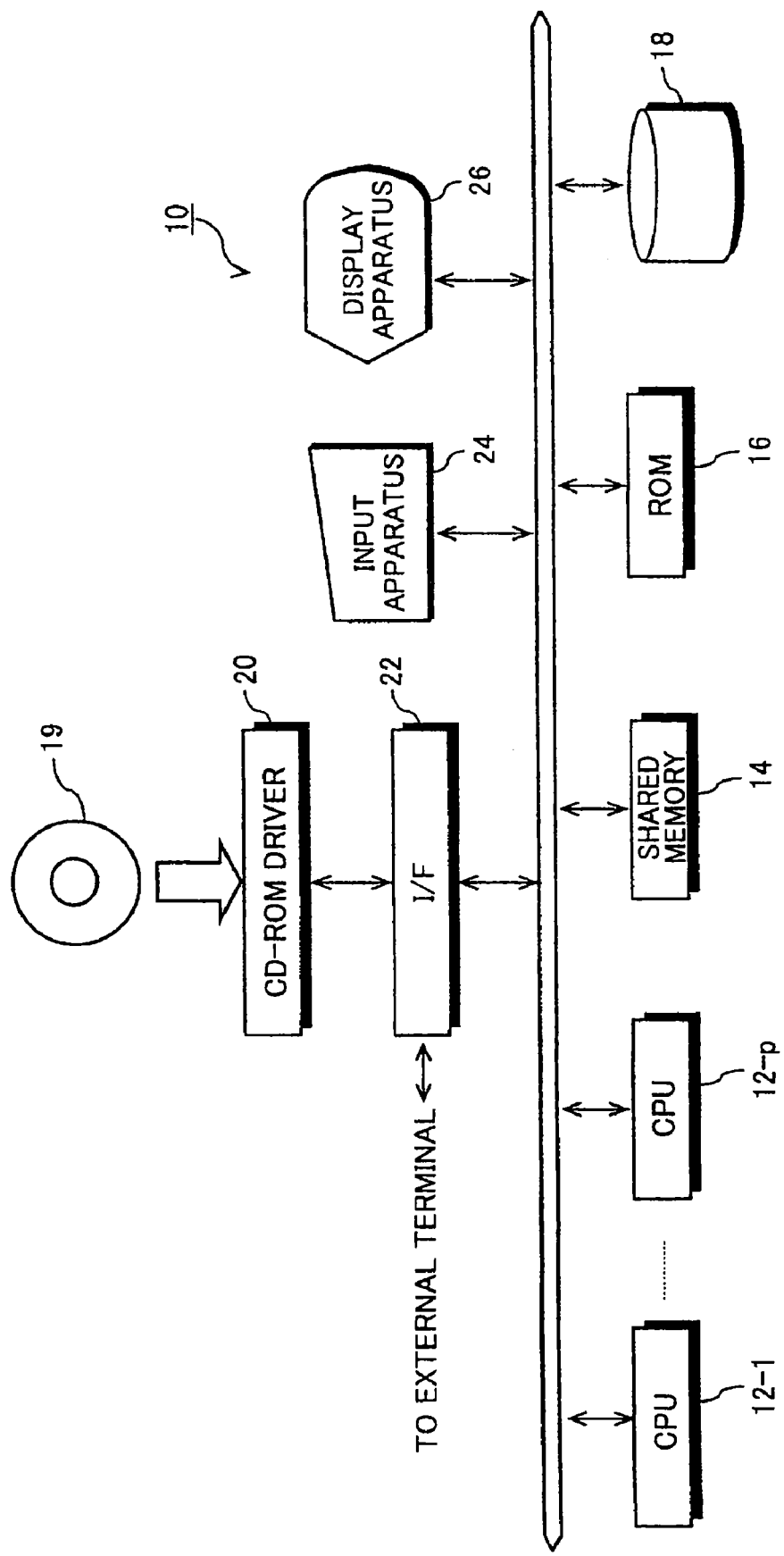
FIG. 1 is a schematic diagram of a computer system according to an embodiment of the present invention.
Figure 4:
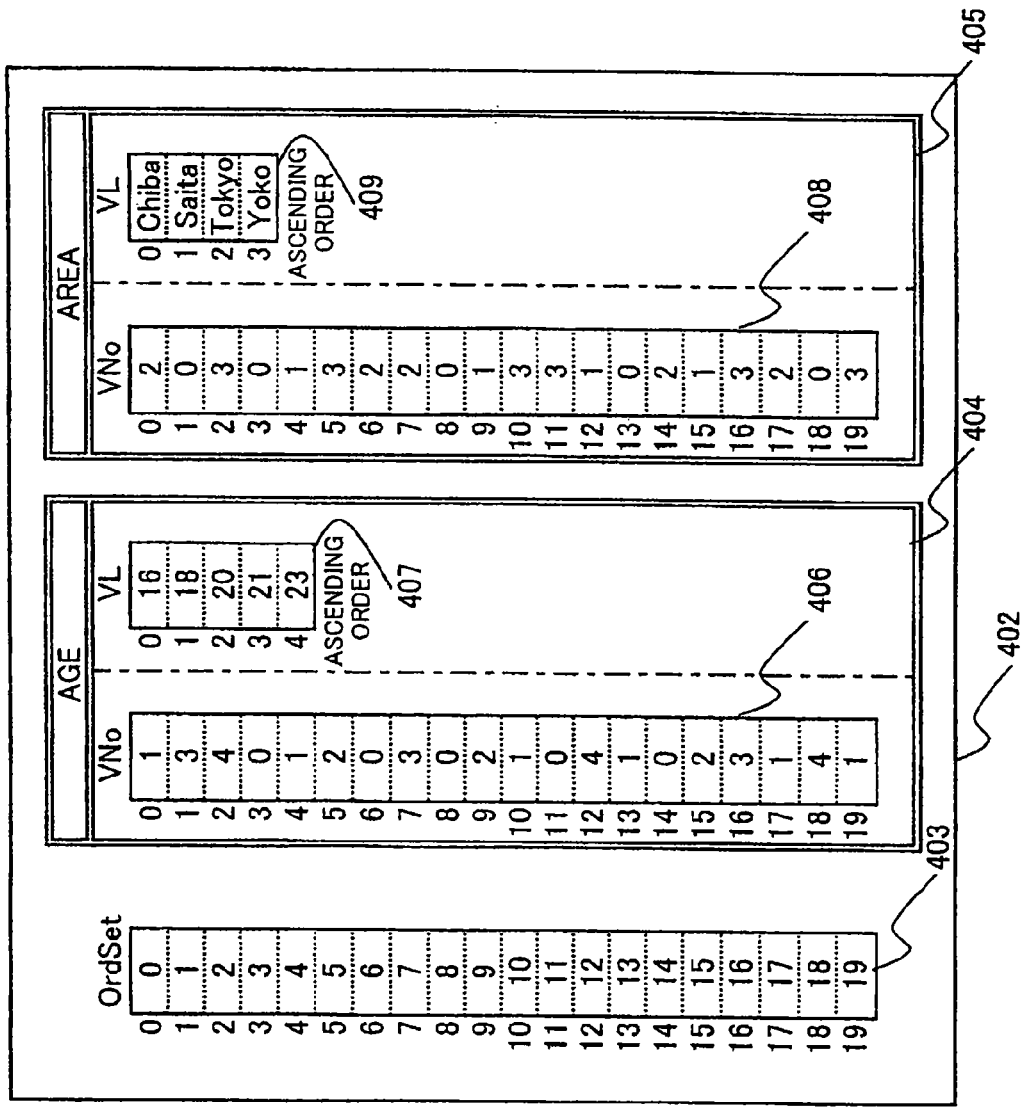
FIGS. 4A and 4B are drawings for explaining a data structure subjected to sorting according to the embodiment of the present invention.
Figure 5:
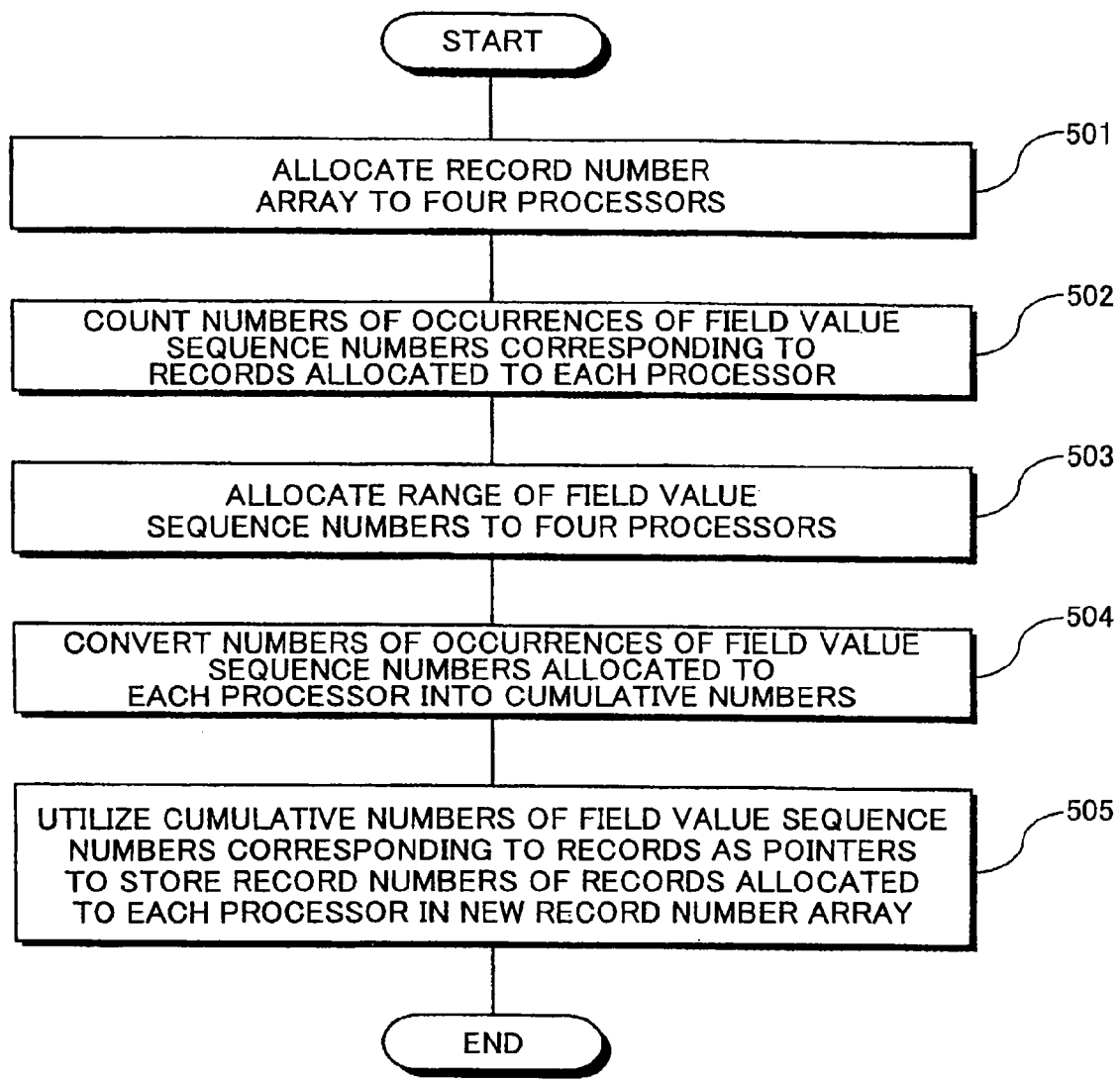
FIG. 5 is a flowchart showing a parallel sorting method according to an embodiment of the present invention.
Figure 7A:
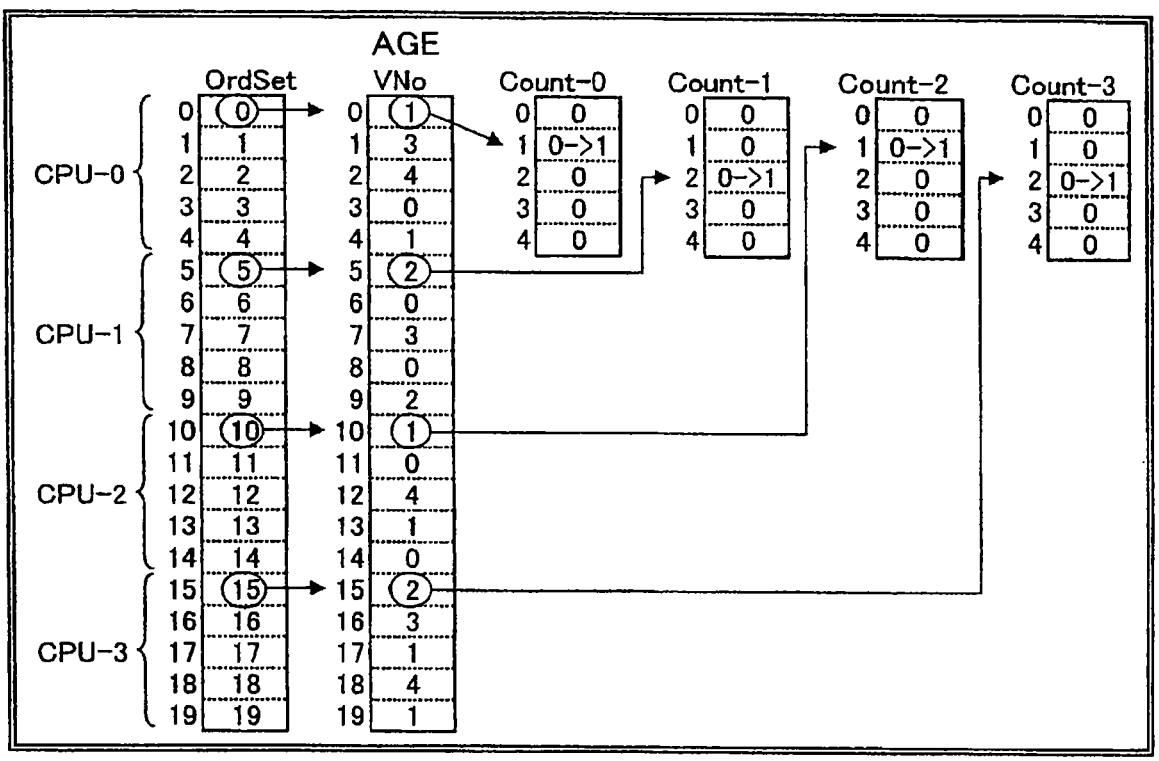
FIGS. 7A and 7B are drawings (1) for explaining the count-up step of the parallel sorting method according to the embodiment of the present invention.
Figure 7B:
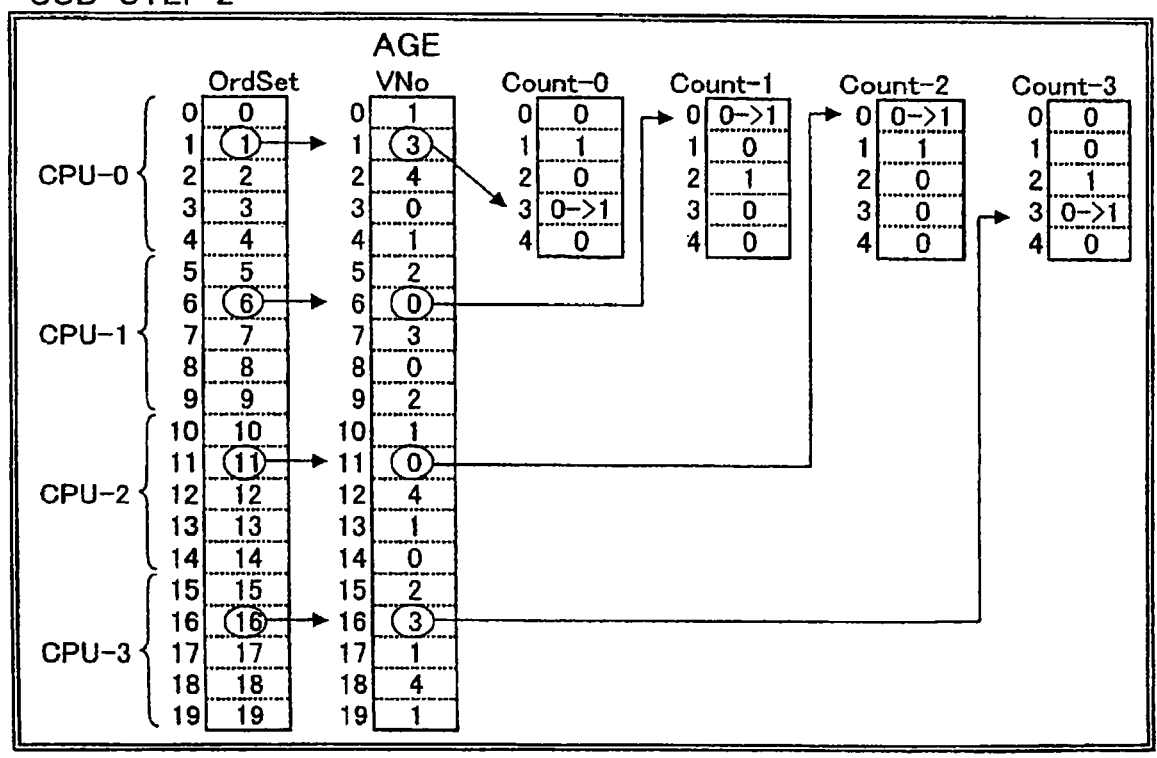
Figure 8A:
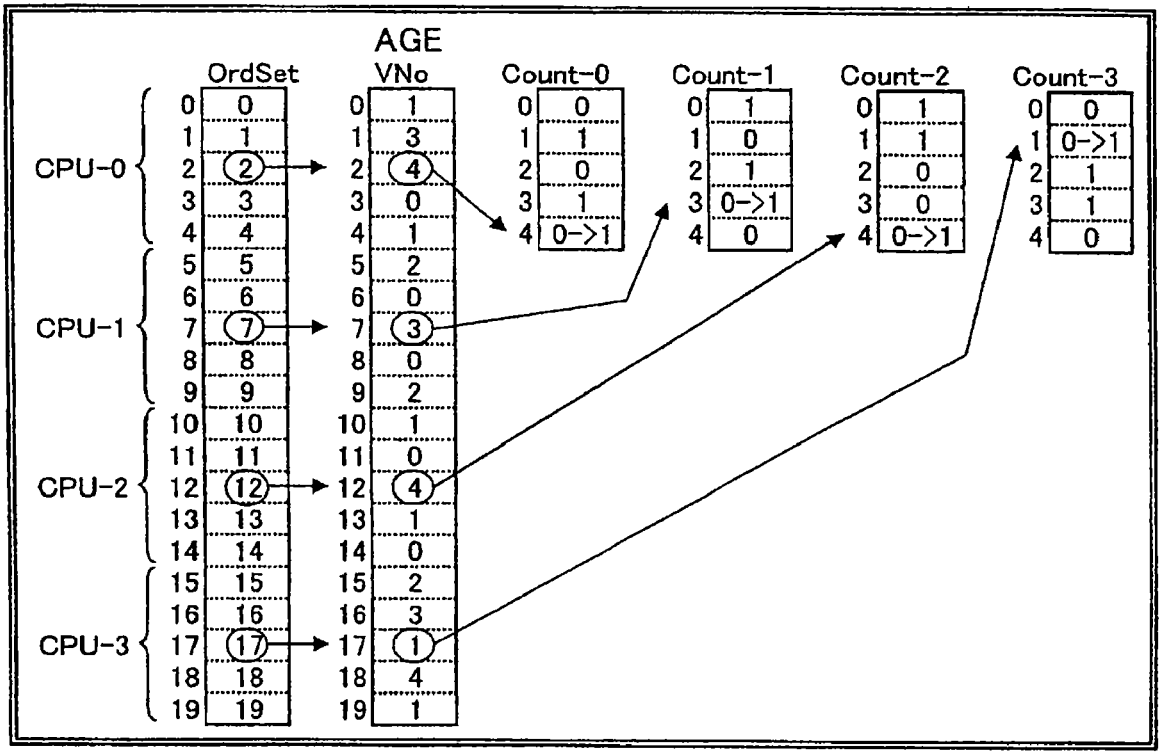
FIGS. 8A and 8B are drawings (2) for explaining the count-up step of the parallel sorting method according to the embodiment of the present invention.
Figure 8B:
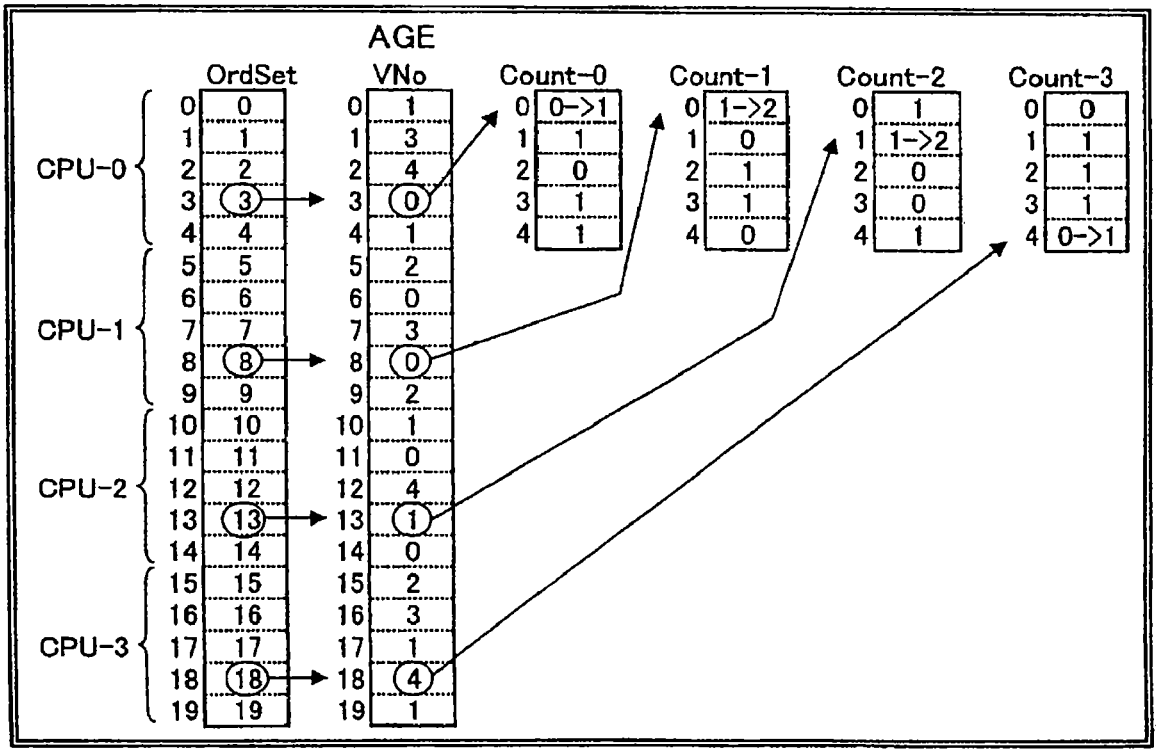
Figure 11A:
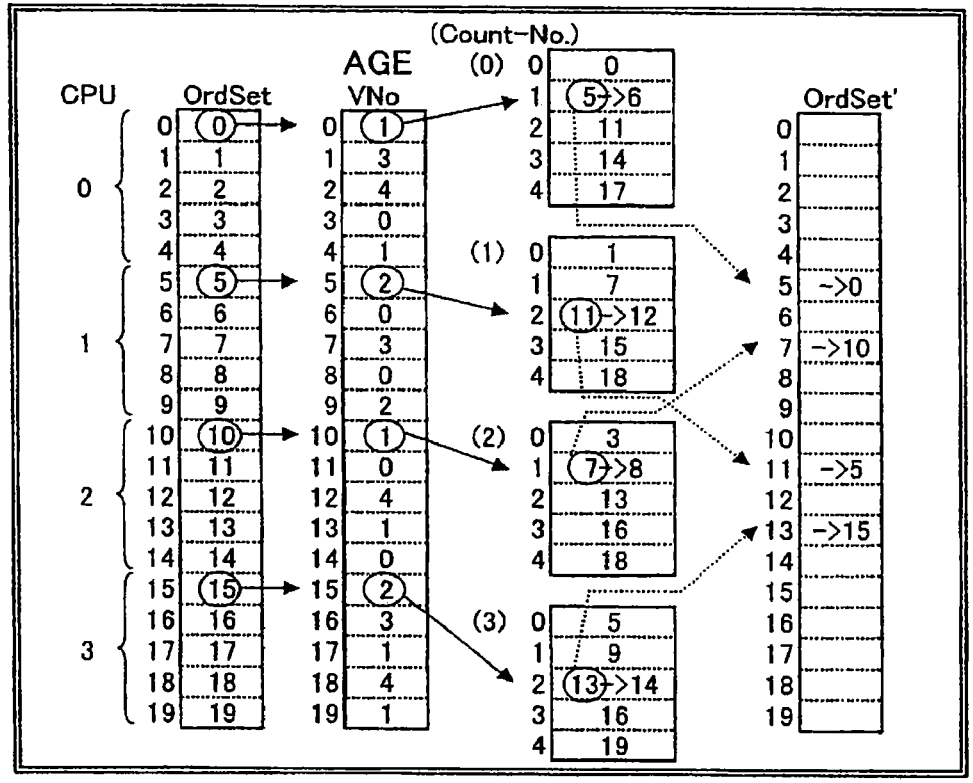
FIGS. 11A and 11B are drawings (1) for explaining the transfer step of the ascending-order parallel sorting method according to the embodiment of the present invention.
Figure 11B:
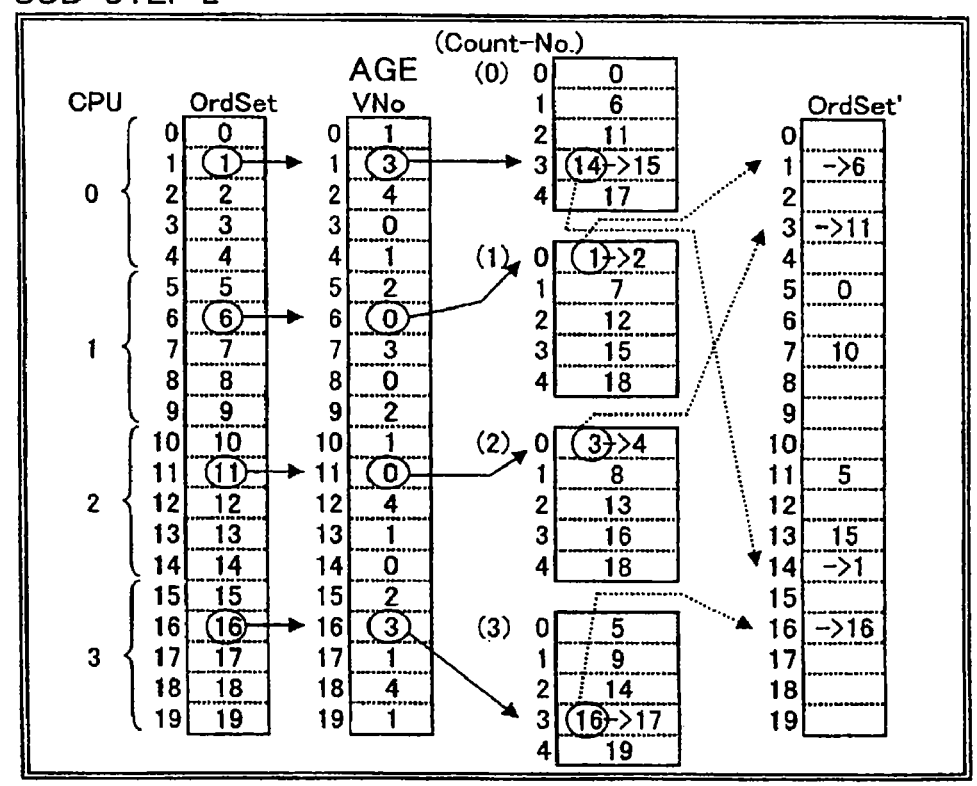
Figure 12A:
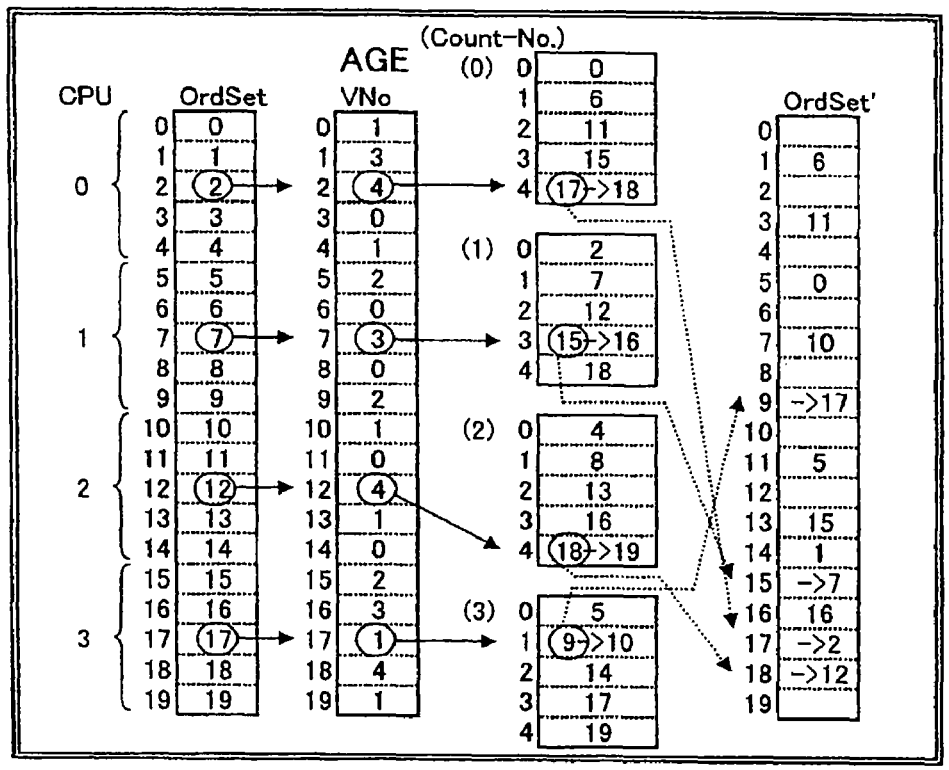
FIGS. 12A and 12B are drawings (2) for explaining the transfer step of the ascending-order parallel sorting method according to the embodiment of the present invention.
Figure 12B:
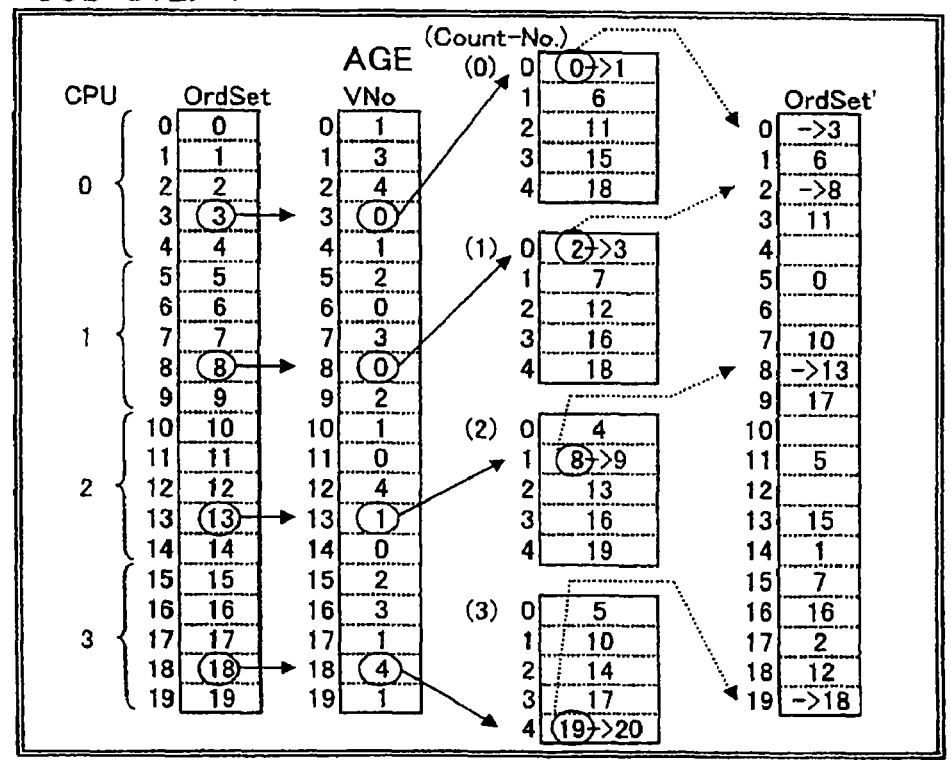
Figures 13A, 13B:
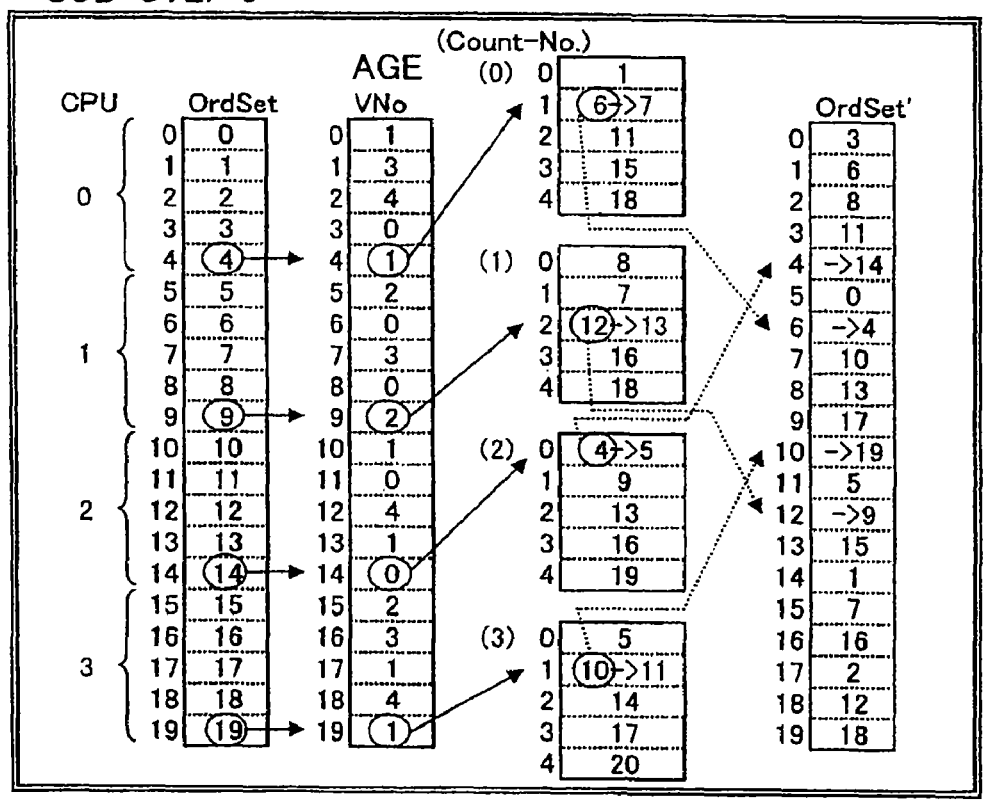
FIGS. 13A and 13B are drawings (3) for explaining the transfer step of the ascending-order parallel sorting method according to the embodiment of the present invention.
Figure 18A:
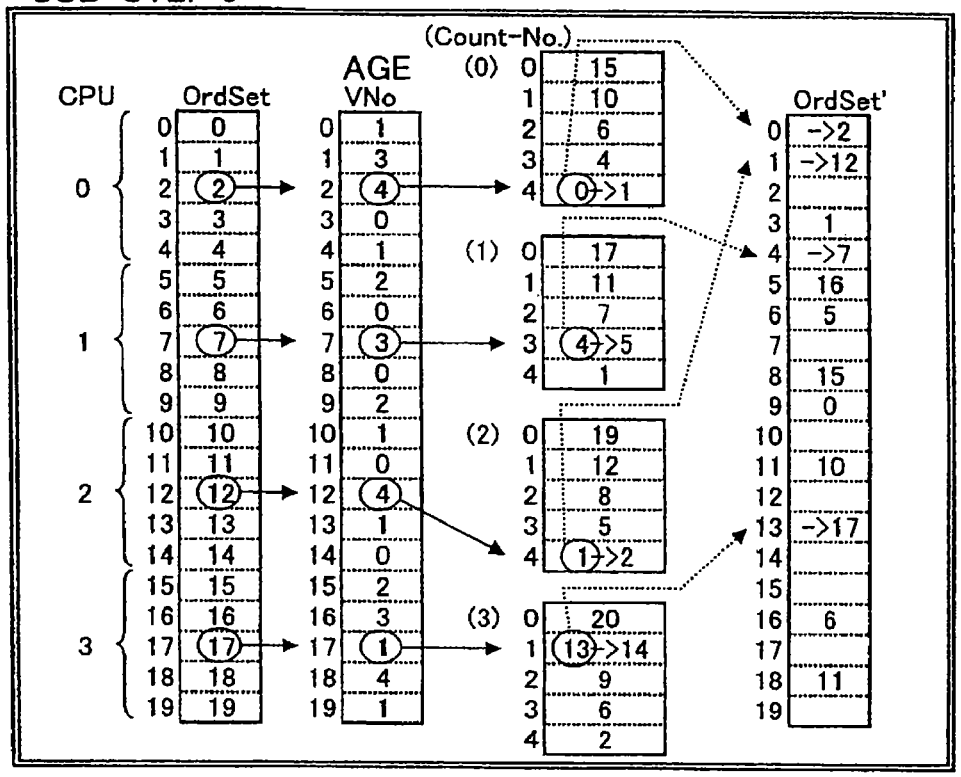
FIGS. 18A and 18B are drawings (2) for explaining the transfer step of the descending-order parallel sorting method according to the embodiment of the present invention.
Figure 18B:
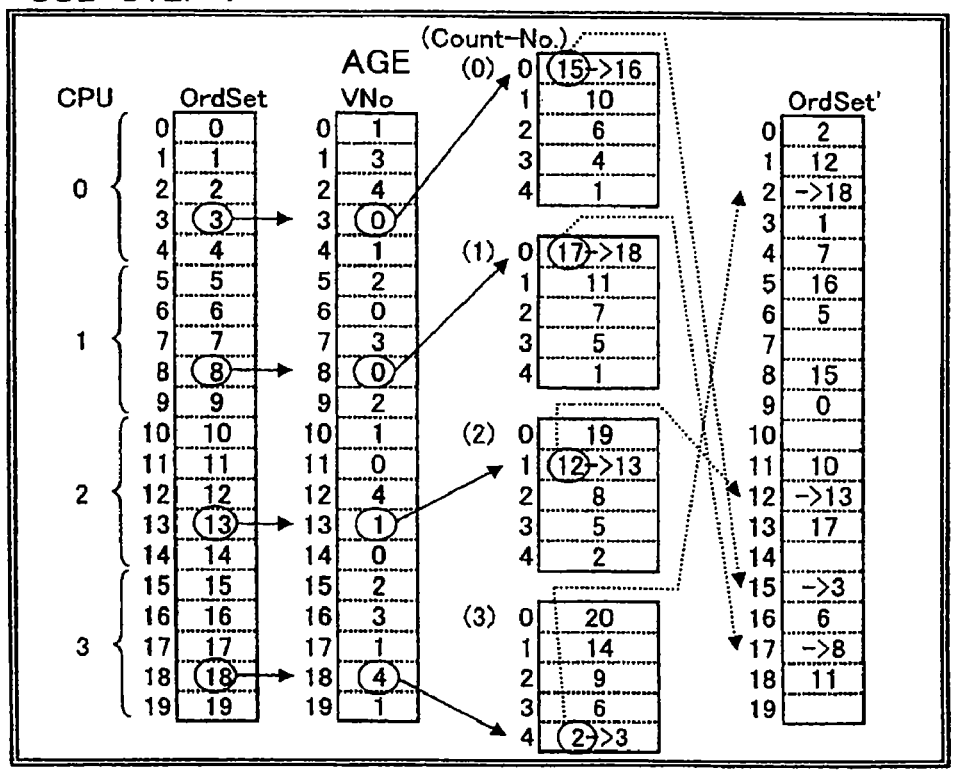
Figures 19A, 19B:
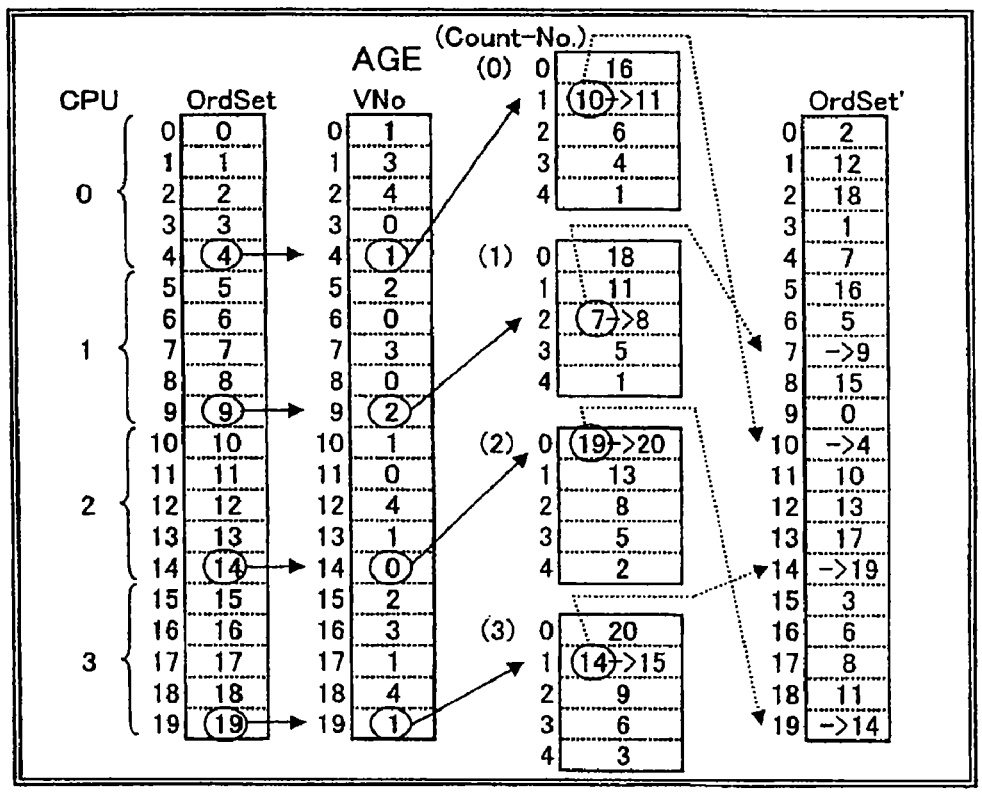
FIGS. 19A and 19B are drawings (3) for explaining the transfer step of the descending-order parallel sorting method according to the embodiment of the present invention.
Figure 23A:
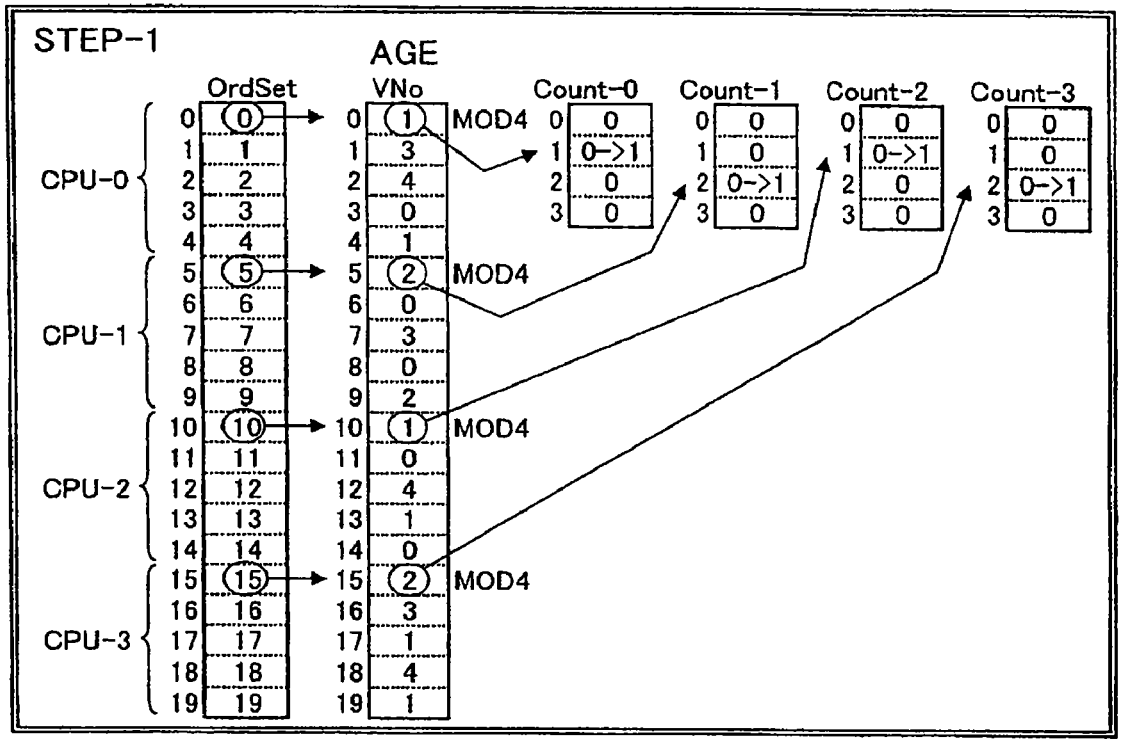
FIGS. 23A and 23B are drawings (1) for explaining a count-up step in the first stage of the multi-stage parallel sorting method according to the embodiment of the present invention.
Figure 23B:
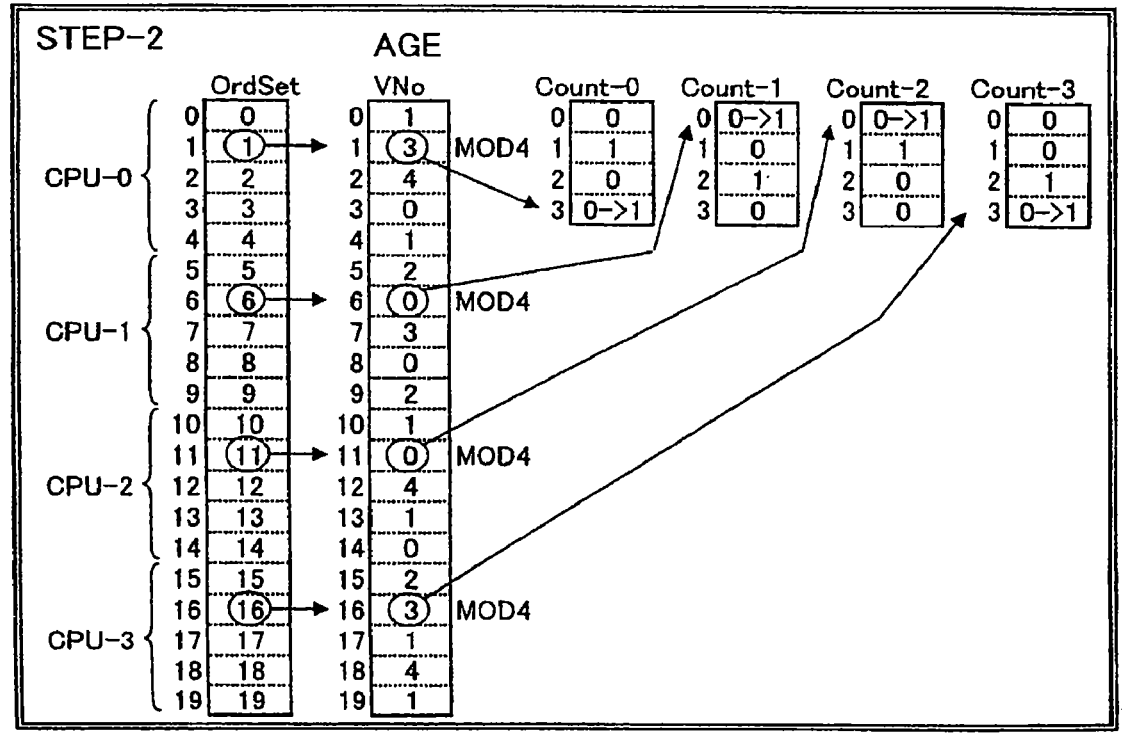
Figure 24A:
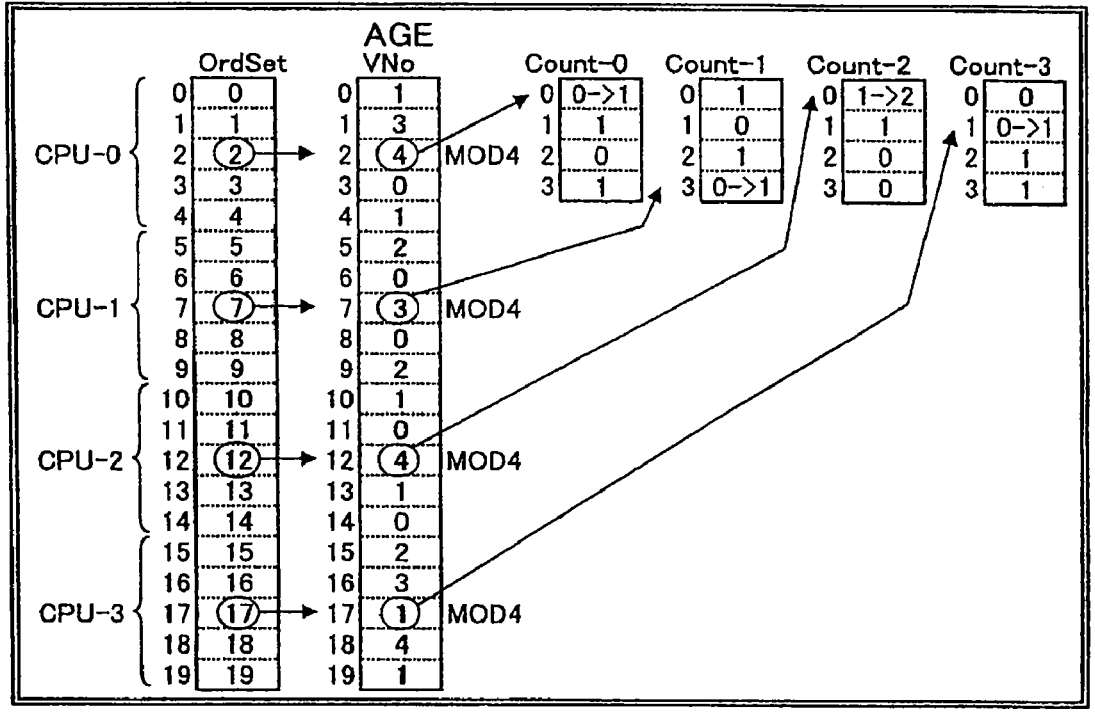
FIGS. 24A and 24B are drawings (2) for explaining the count-up step in the first stage of the multi-stage parallel sorting method according to the embodiment of the present invention.
Figure 24B:
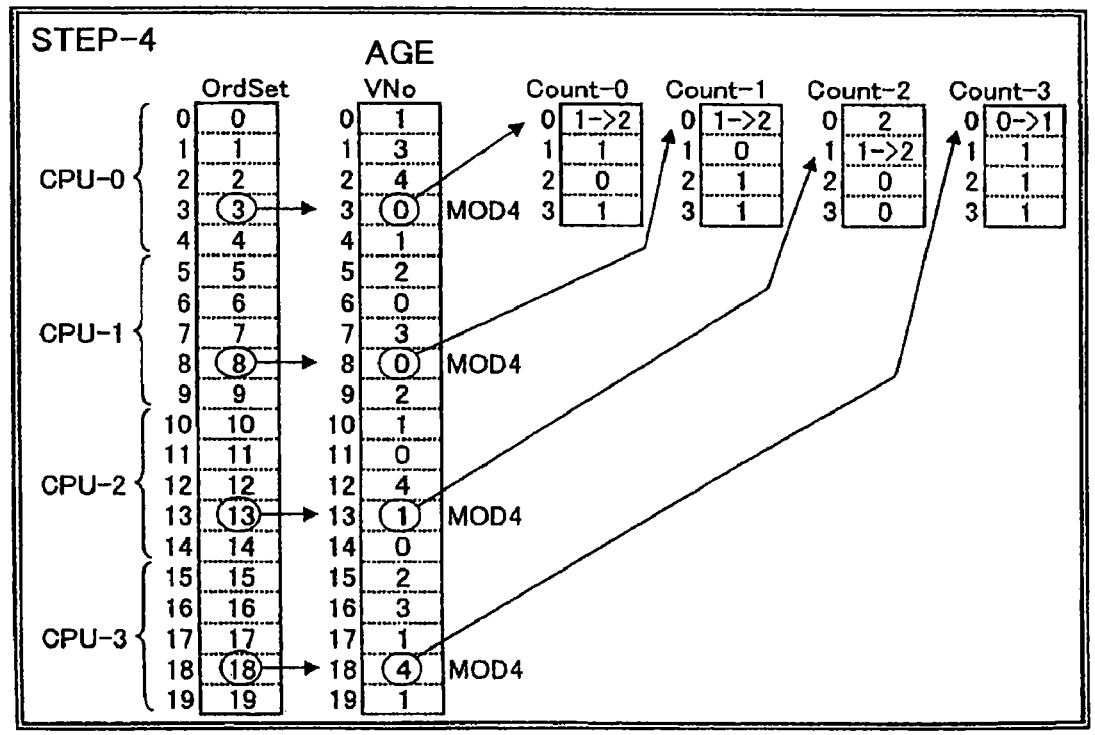
Figure 27A:
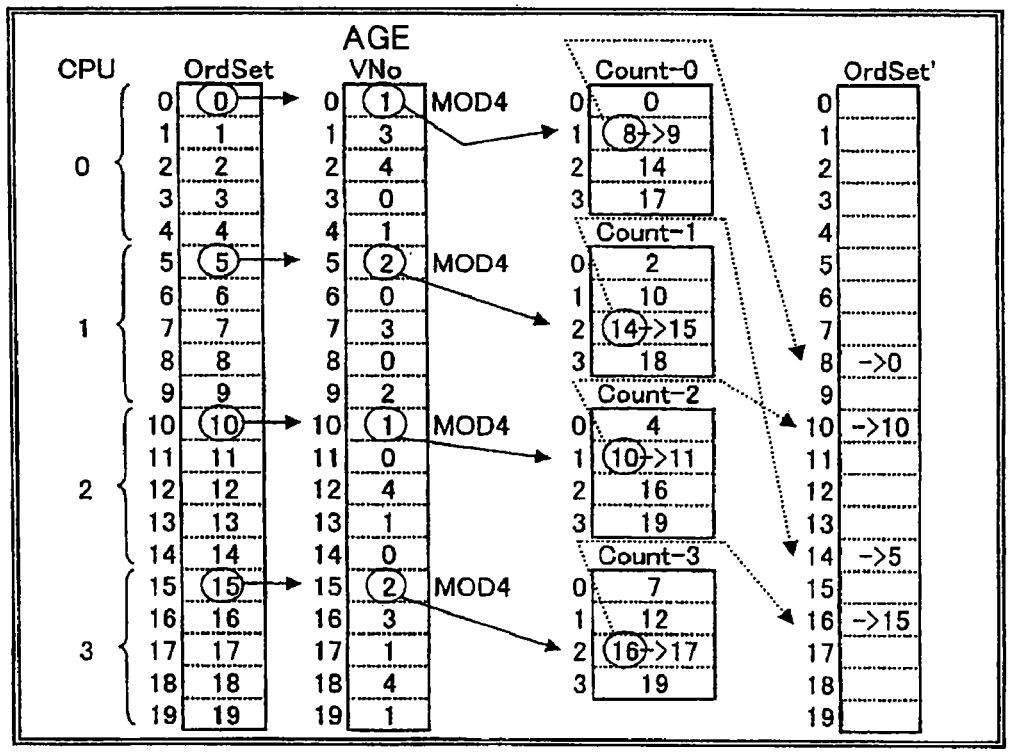
FIGS. 27A and 27B are drawings (1) for explaining a transfer step in the first stage of the multi-stage ascending-order parallel sorting method according to the embodiment of the present invention.
Figure 27B:
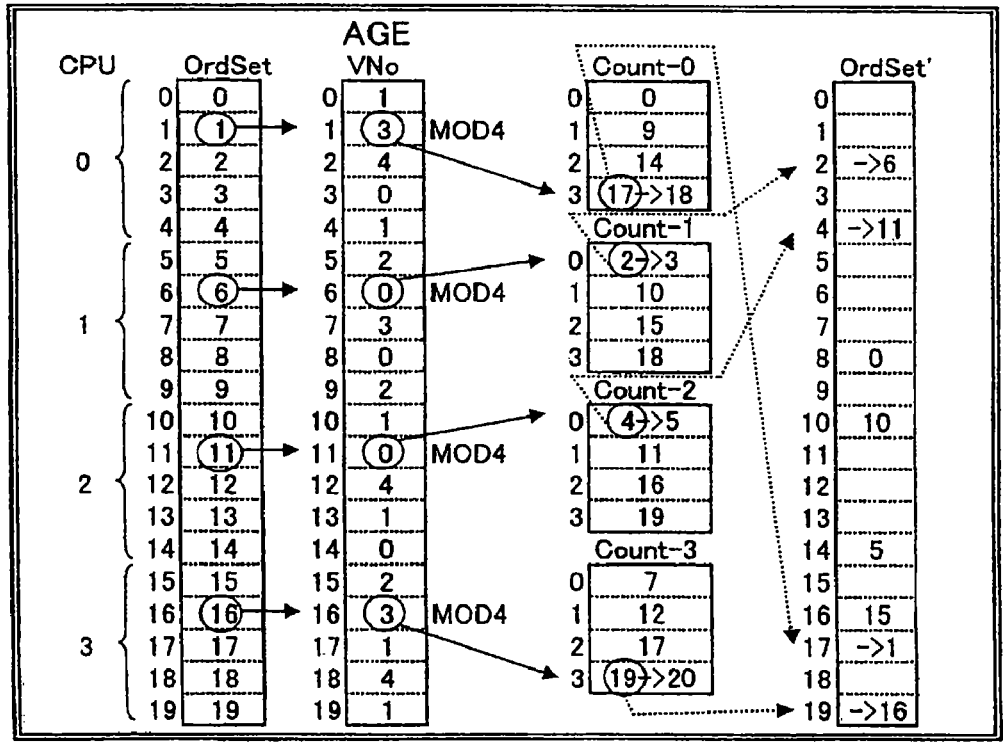
Figure 28A:
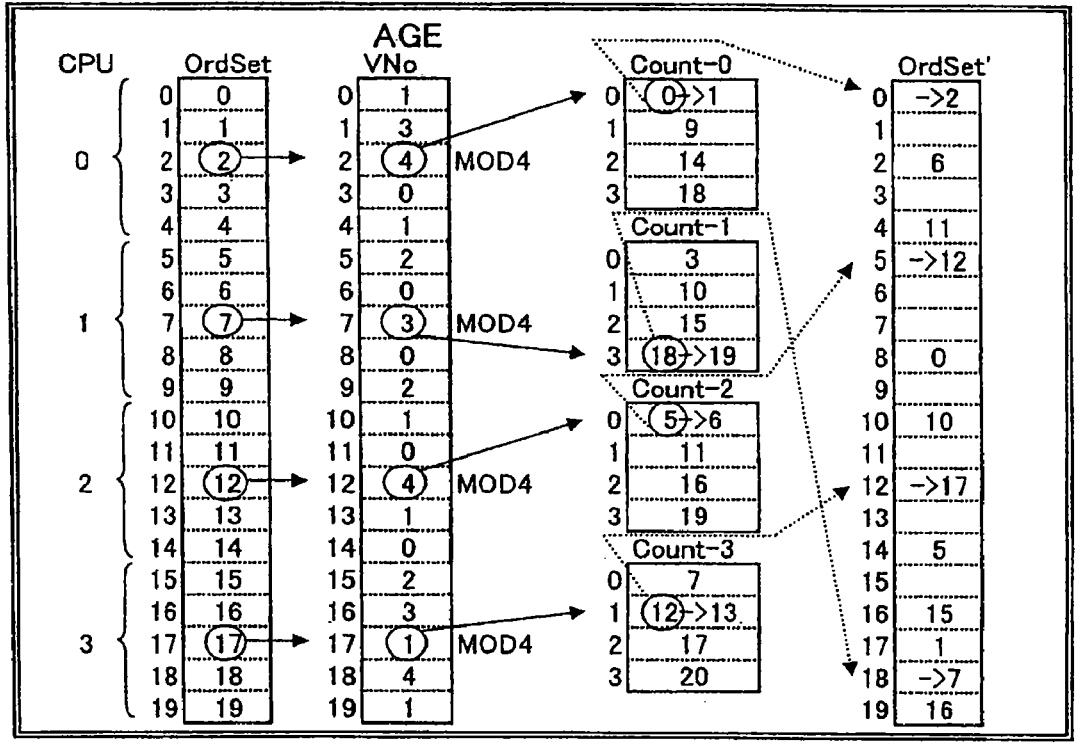
FIGS. 28A and 28B are drawings (2) for explaining the transfer step in the first stage of the multi-stage ascending-order parallel sorting method according to the embodiment of the present invention.
Figure 28B:
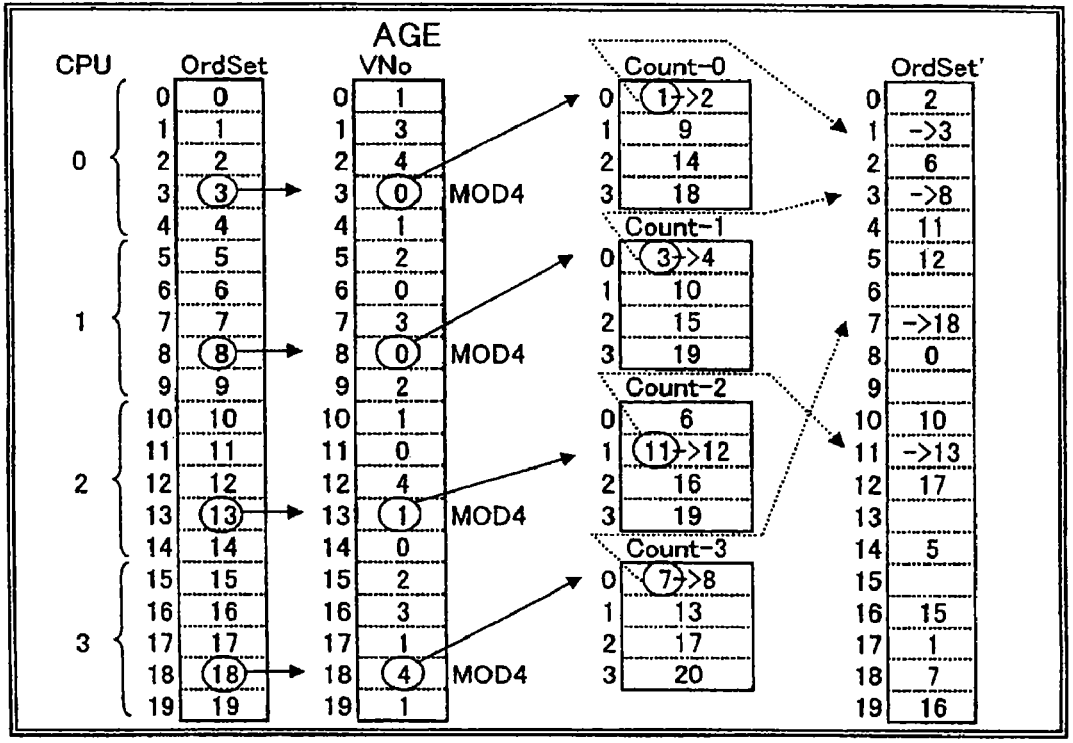
Figures 29A, 29B:
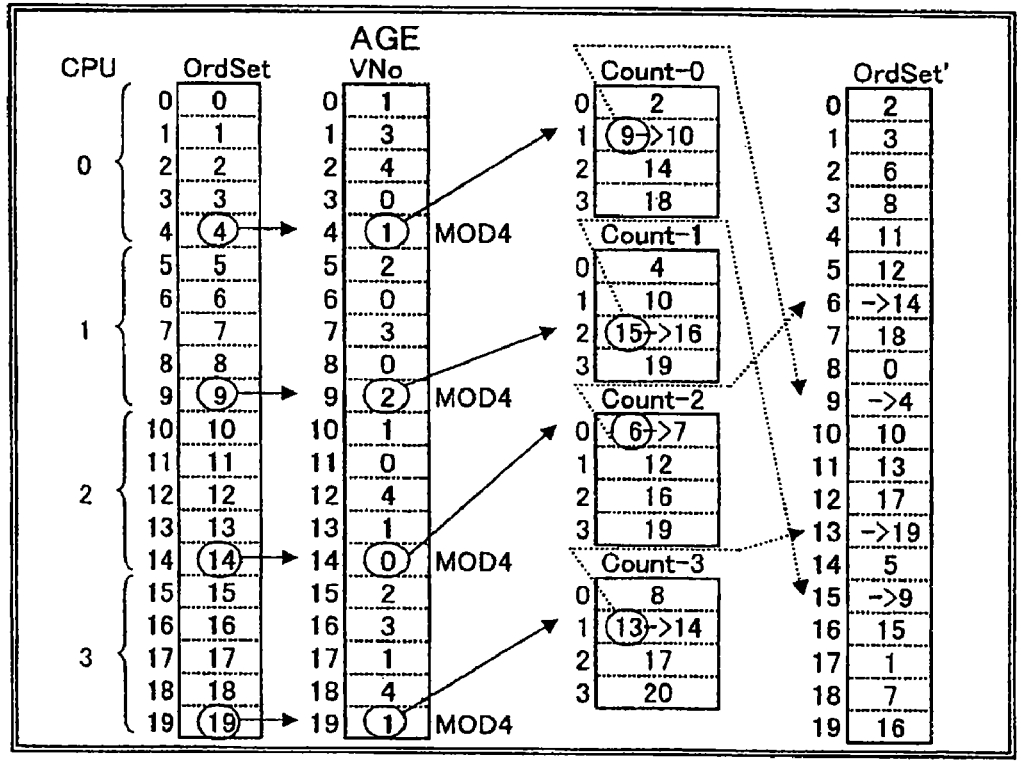
FIGS. 29A and 29B are drawings (3) for explaining the transfer step in the first stage of the multi-stage ascending-order parallel sorting method according to the embodiment of the present invention.
Figure 31A:
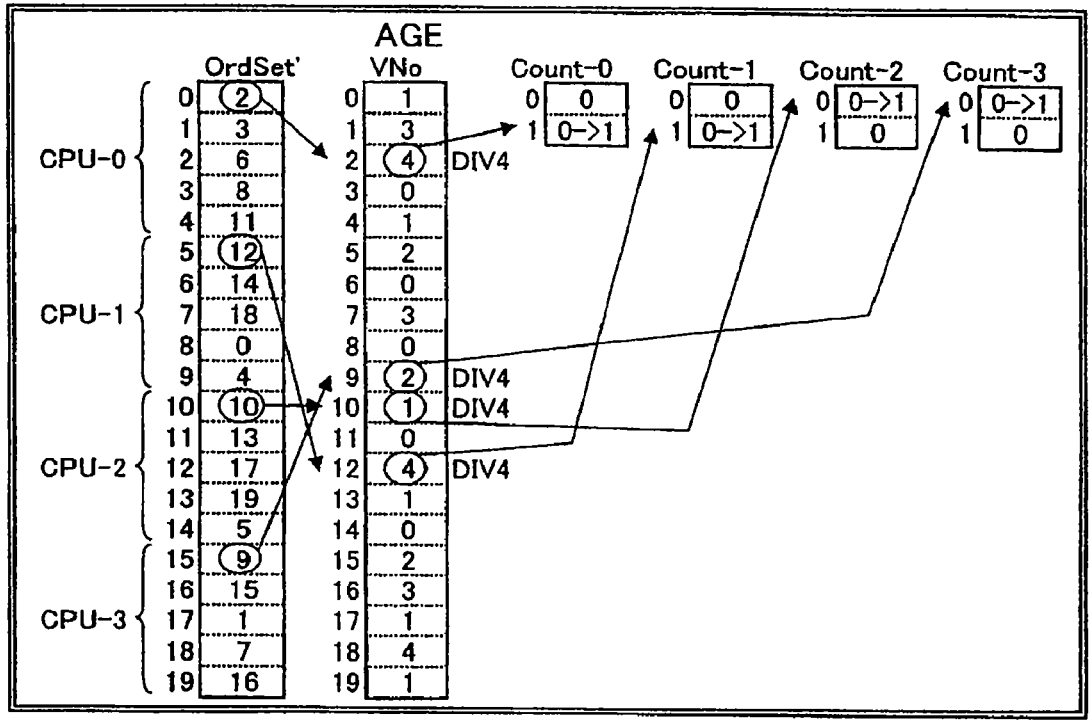
FIGS. 31A and 31B are drawings (1) for explaining a count-up step in the second stage of the multi-stage parallel sorting method according to the embodiment of the present invention.
Figure 31B:
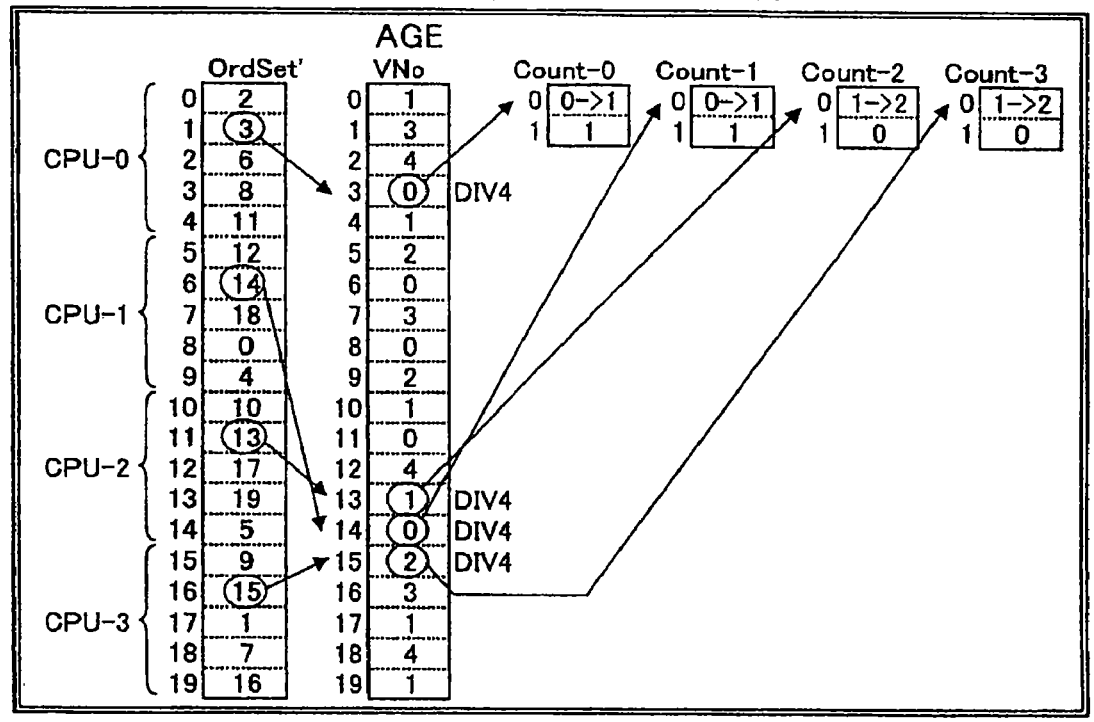
Figure 32A:
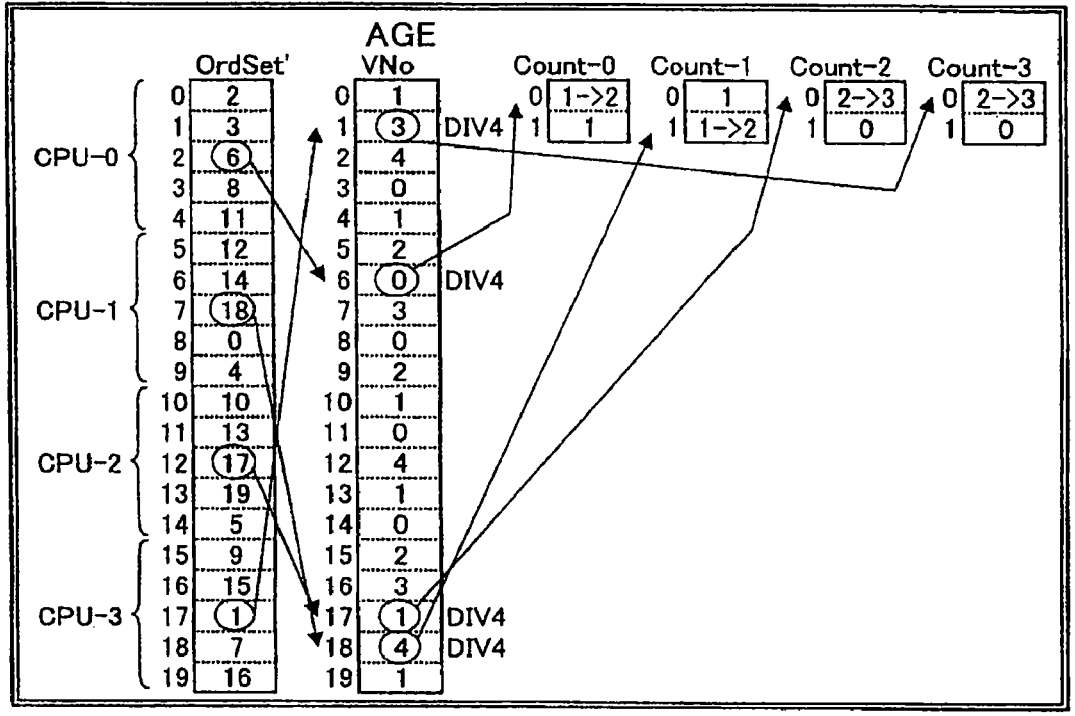
FIGS. 32A and 32B are drawings (2) for explaining the count-up step in the second stage of the multi-stage parallel sorting method according to the embodiment of the present invention.
Figure 32B:
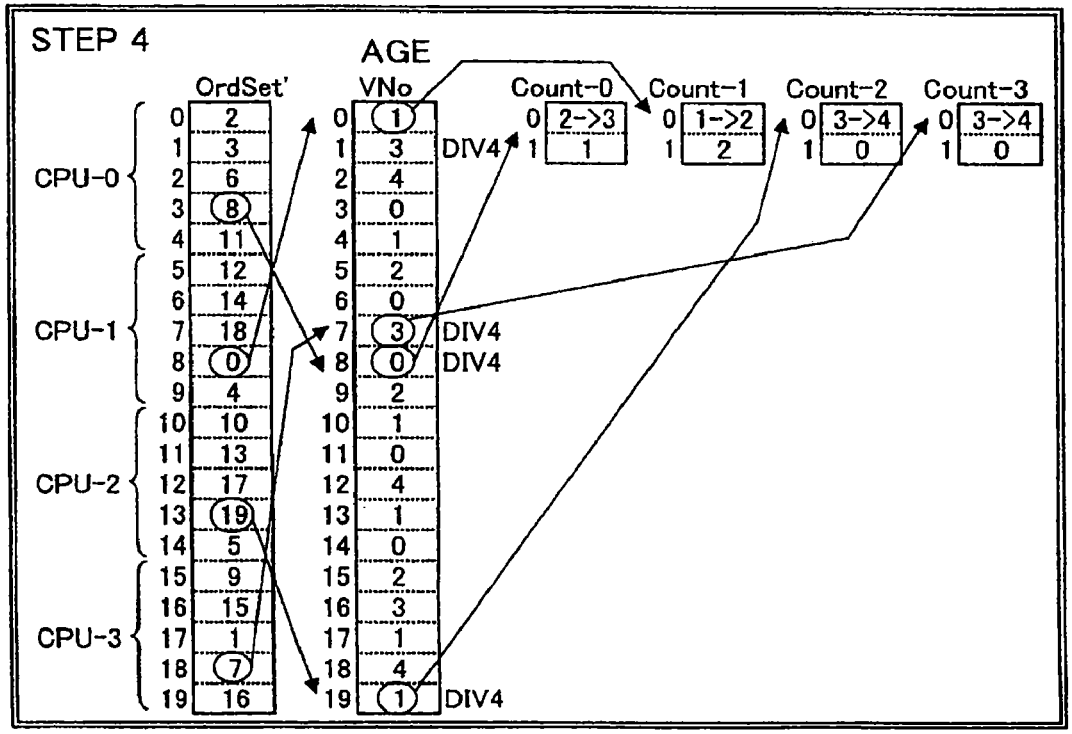
Figure 33A:
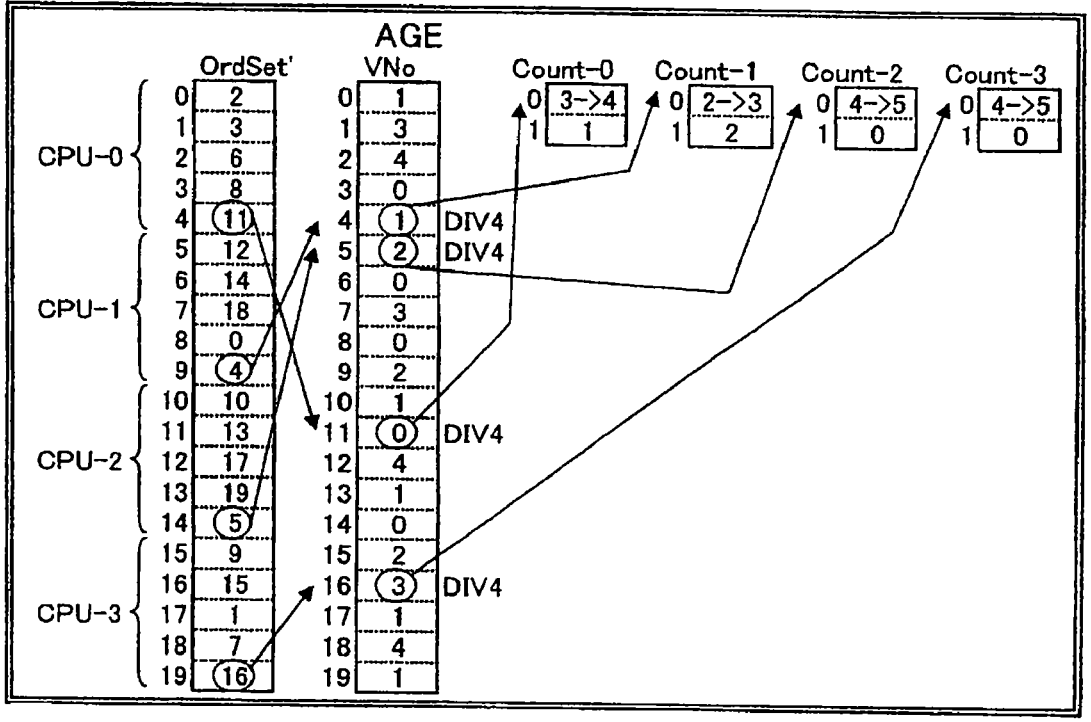
FIGS. 33A and 33B are drawings (3) for explaining the count-up step in the second stage of the multi-stage parallel sorting method according to the embodiment of the present invention.
Figure 33B:
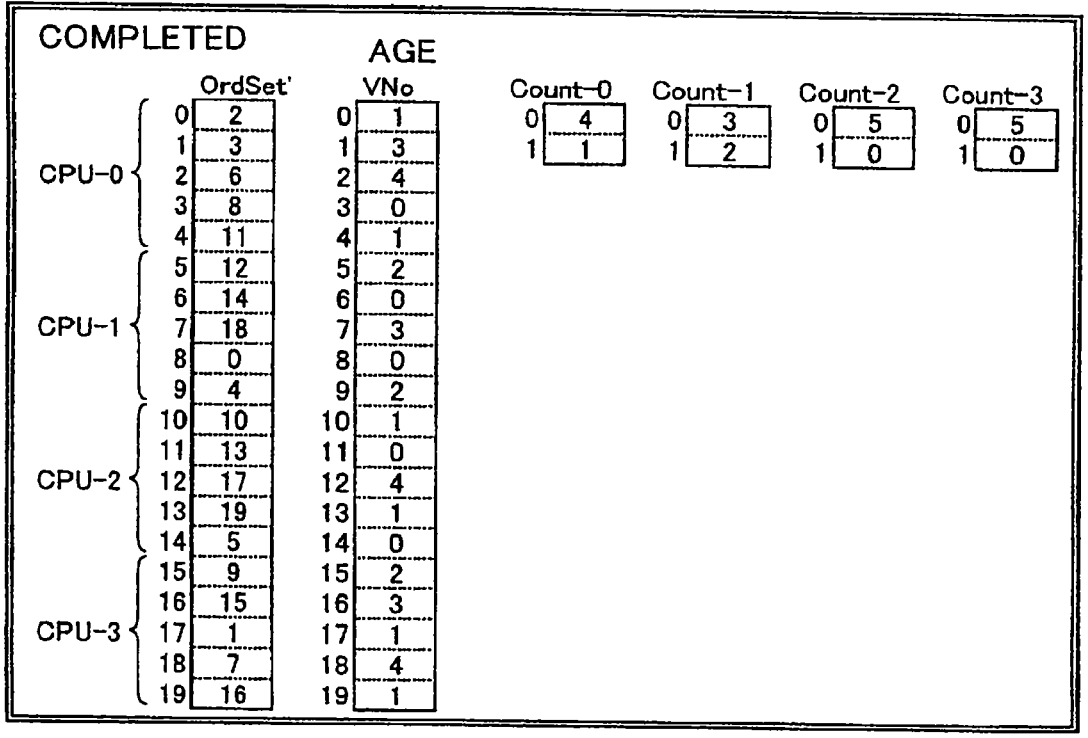
Figure 35A:
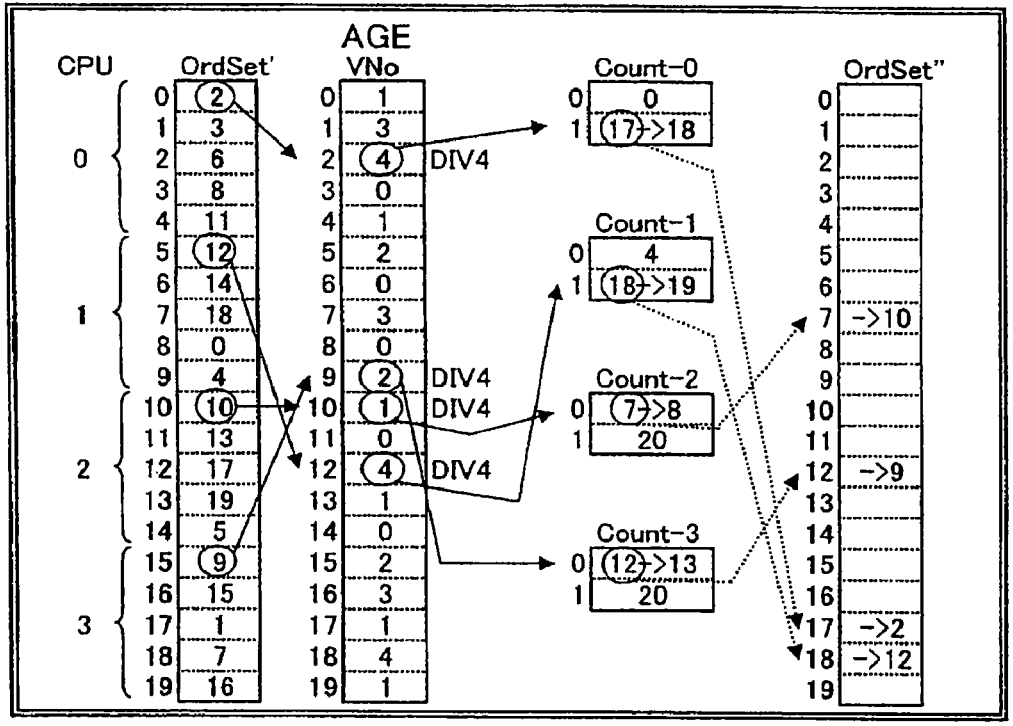
FIGS. 35A and 35B are drawings (1) for explaining a transfer step in the second stage of the multi-stage ascending-order parallel sorting method according to the embodiment of the present invention.
Figure 35B:
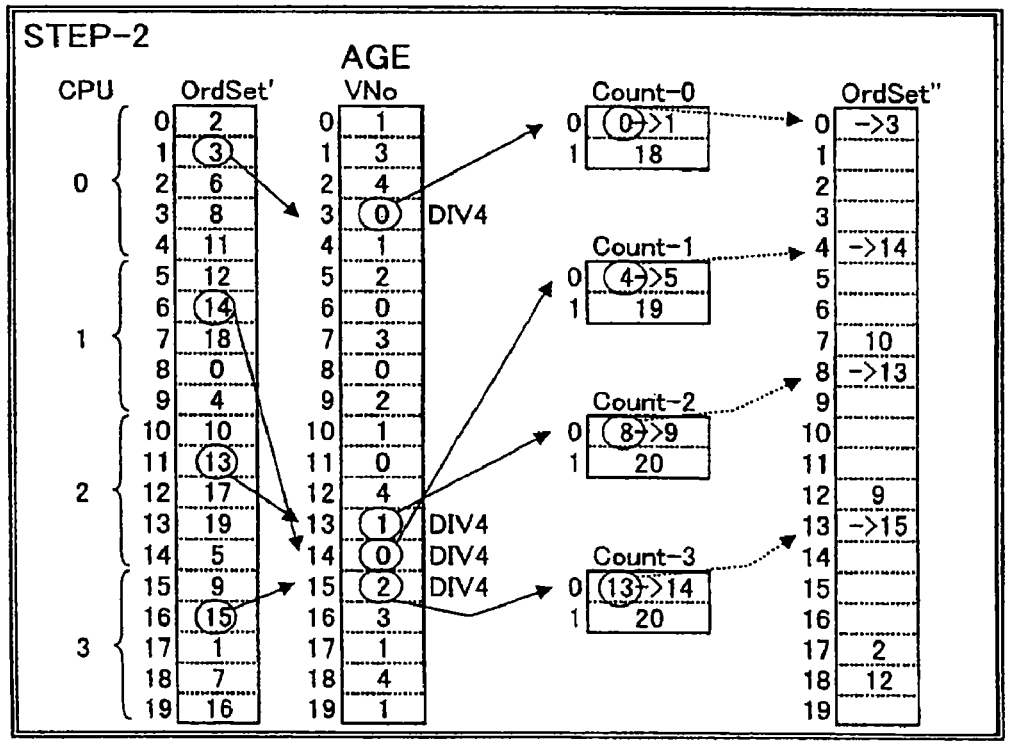
Figure 36A:
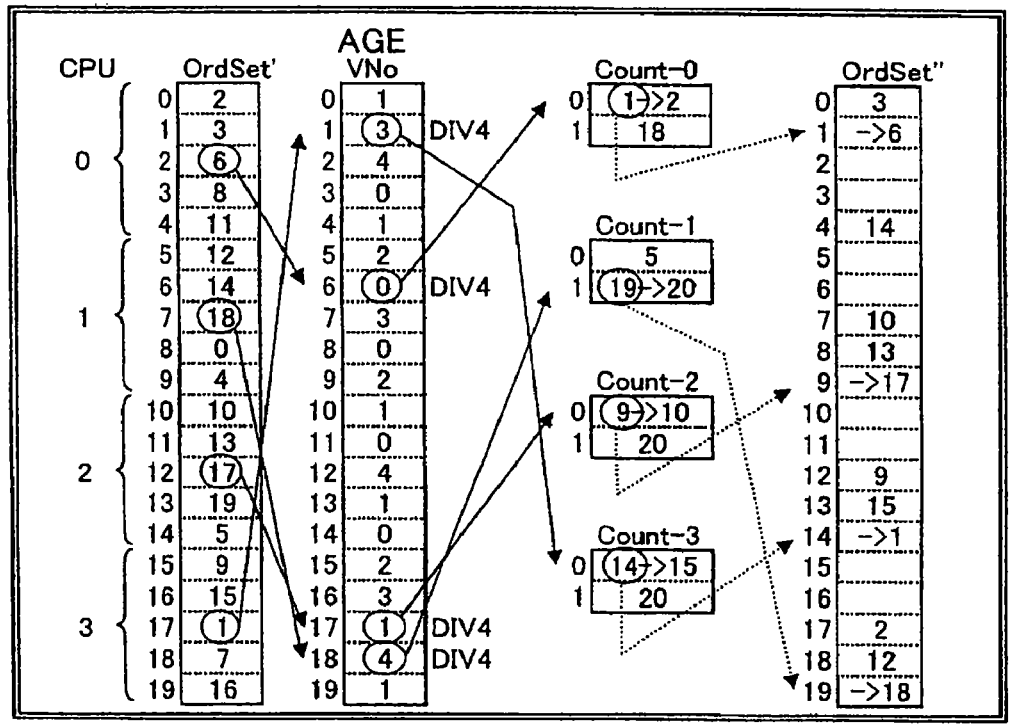
FIGS. 36A and 36B are drawings (2) for explaining the transfer step in the second stage of the multi-stage ascending-order parallel sorting method according to the embodiment of the present invention.
Figure 36B:
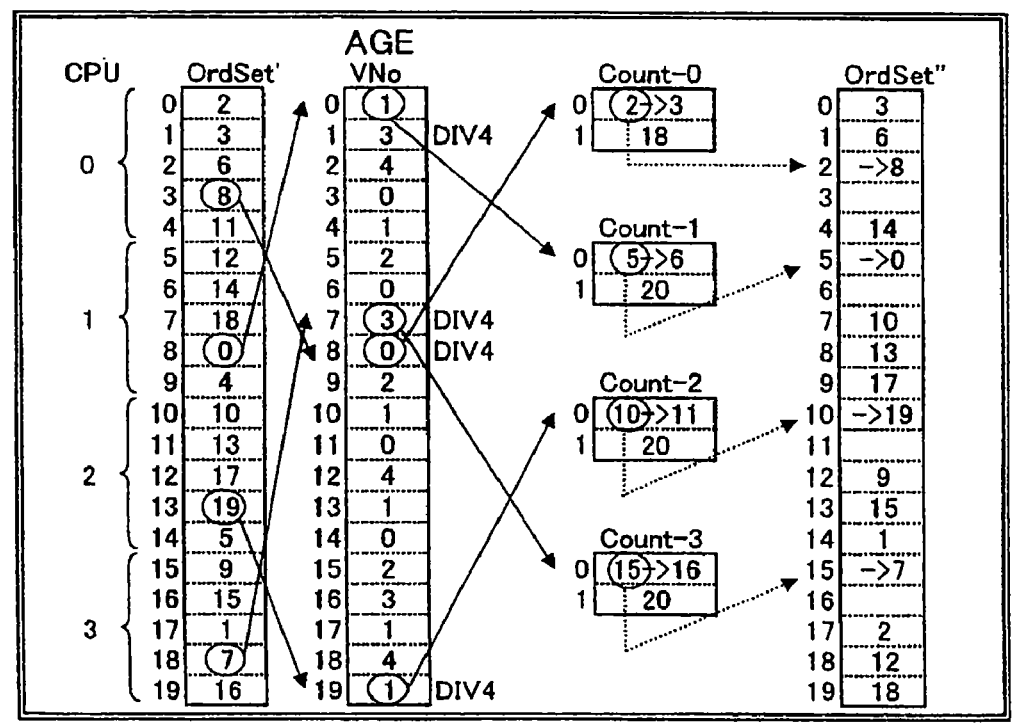
Figures 37A, 37B:
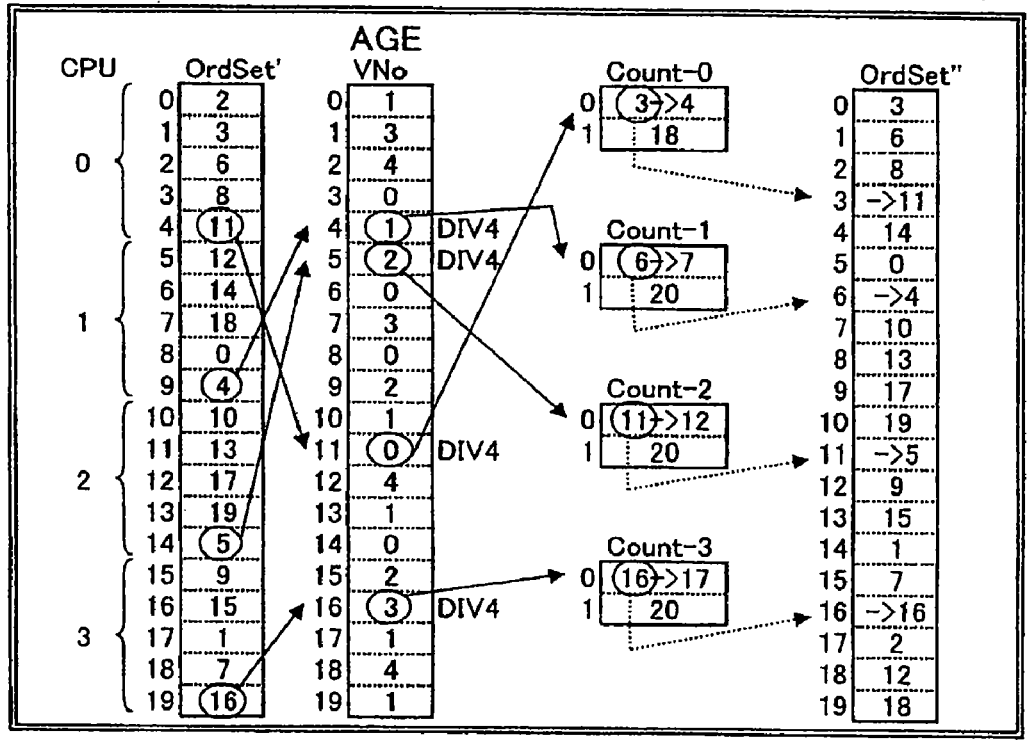
FIGS. 37A and 37B are drawings (3) for explaining the transfer step in the second stage of the multi-stage ascending-order parallel sorting method according to the embodiment of the present invention.
Figures 41A, 41B, 41C, 41D:
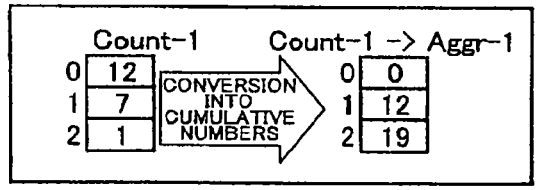
FIGS. 41A through 41D are drawings for explaining counting-up and accumulation performed in the first stage of the multi-stage sorting.
Figure 42A:
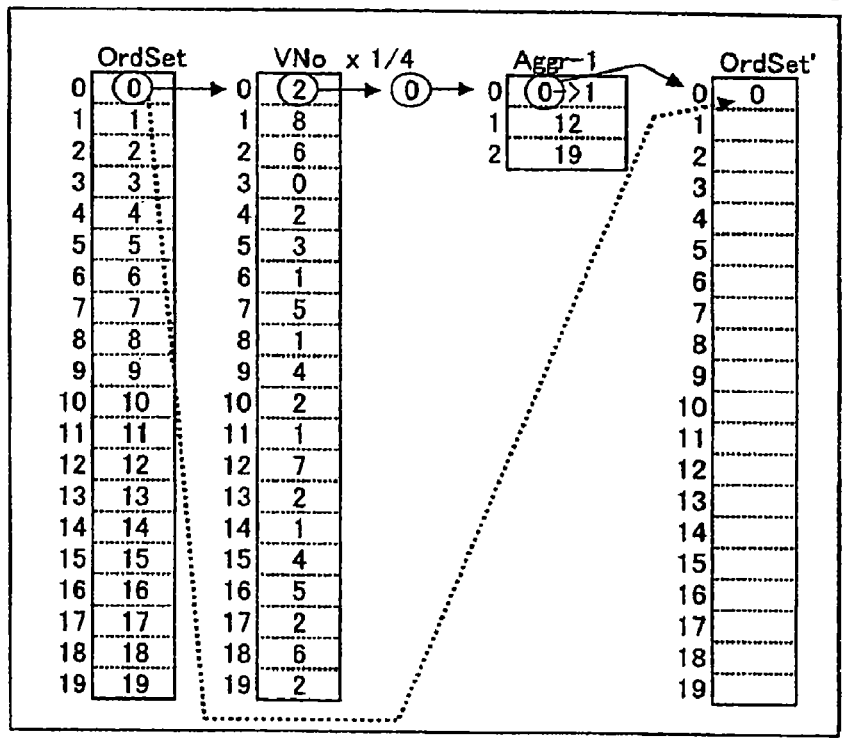
FIGS. 42A and 42B are drawings for explaining record-number transfer in the first stage of the multi-stage sorting.
Figure 42B:
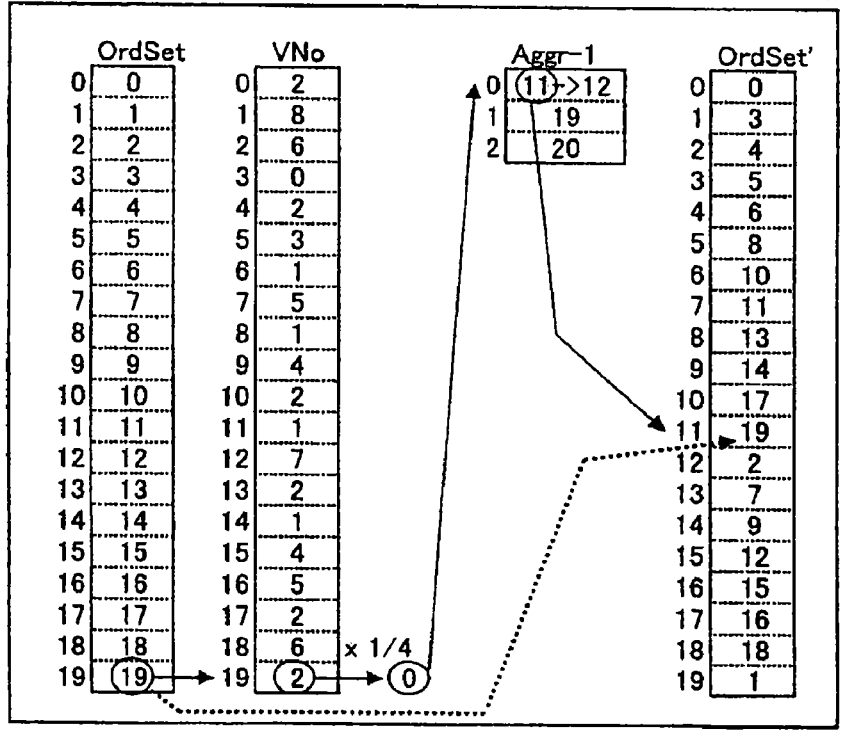
Figure 43:
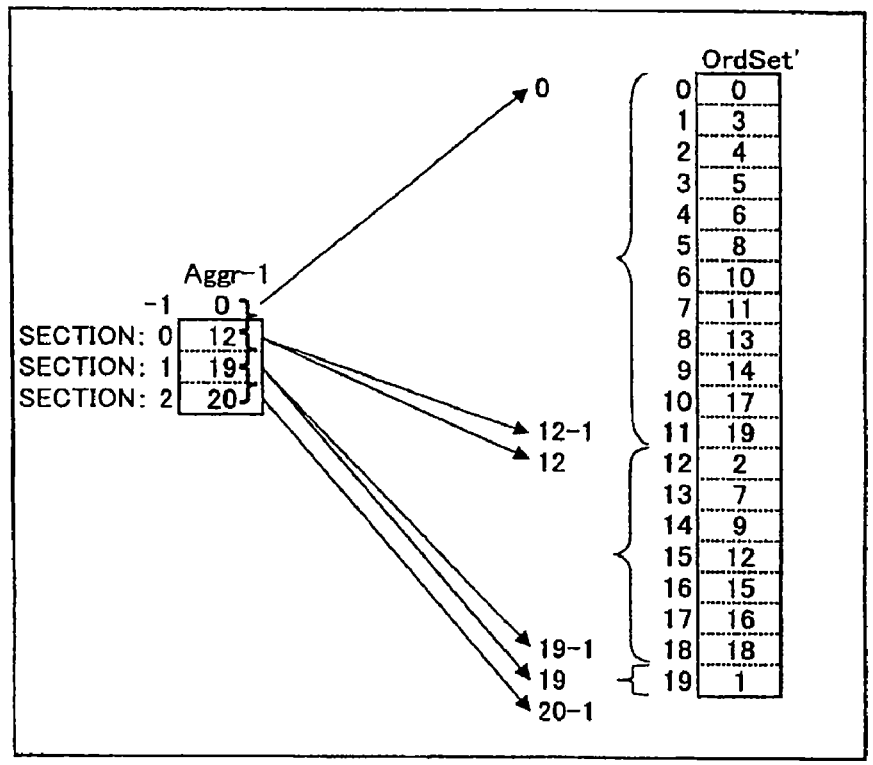
FIG. 43 is a drawing for explaining the results of record-number transfer in the first stage of the multi-stage sorting.
Figure 44:
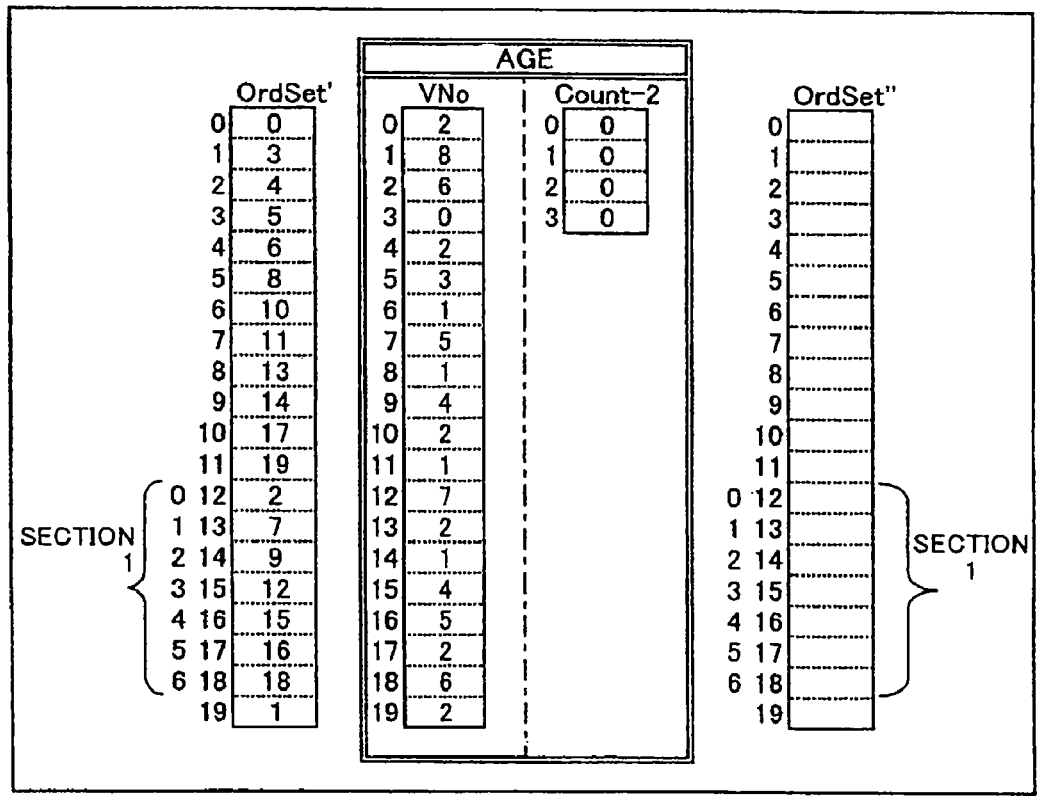
FIG. 44 is a drawing showing the initial conditions of the second stage of the multi-stage sorting.
Figure 45A:
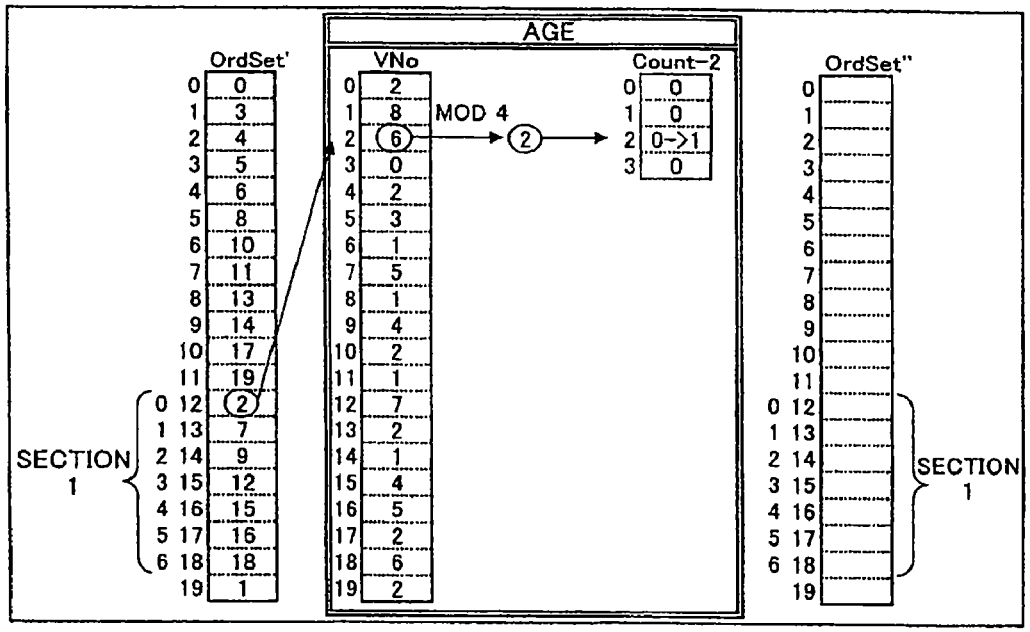
FIGS. 45A through 45C are drawings for explaining counting-up and accumulation performed in the second stage of the multi-stage sorting.
Figure 45B:
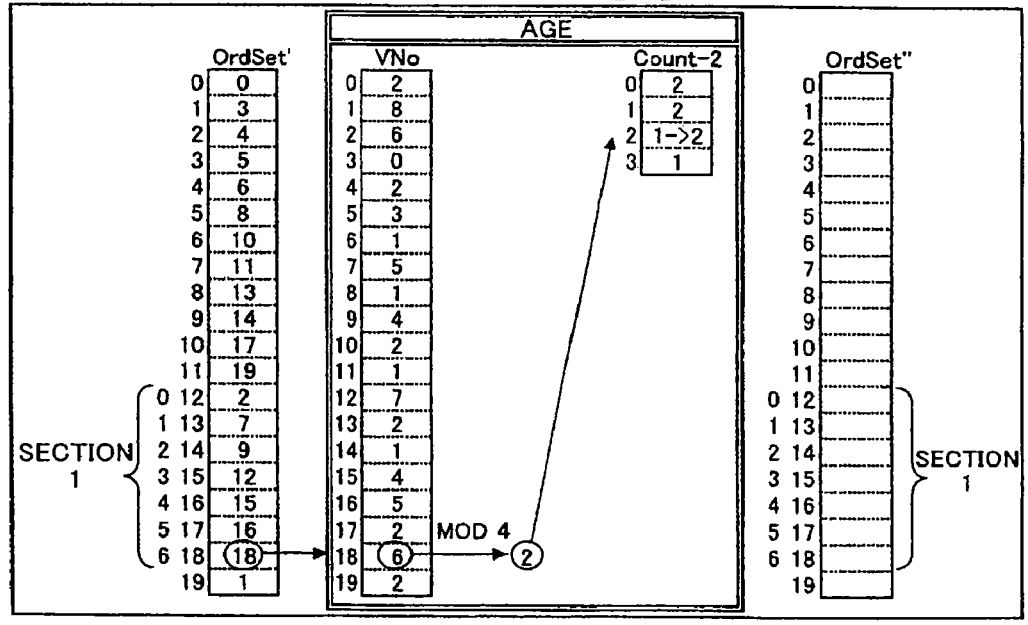
Figure 45C:
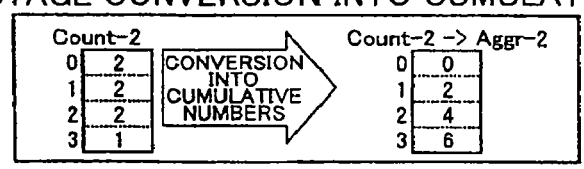
Figure 46A:
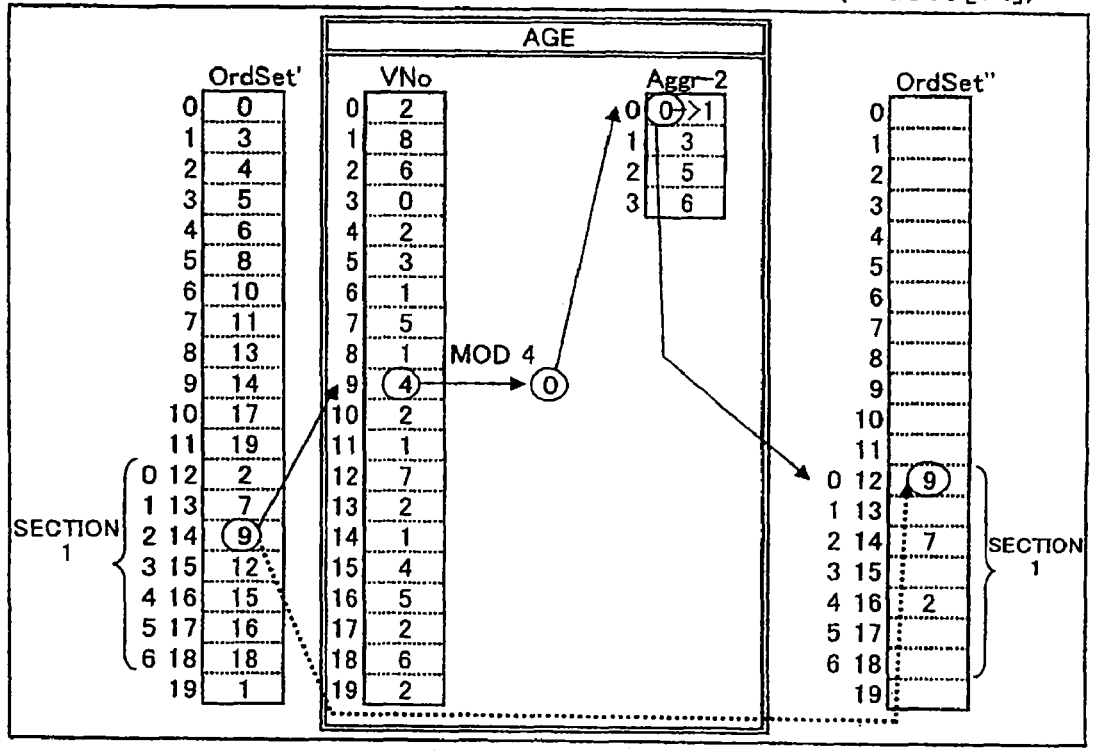
FIGS. 46A and 46B are drawings for explaining record-number transfer in the second stage of the multi-stage sorting.
Figure 46B:
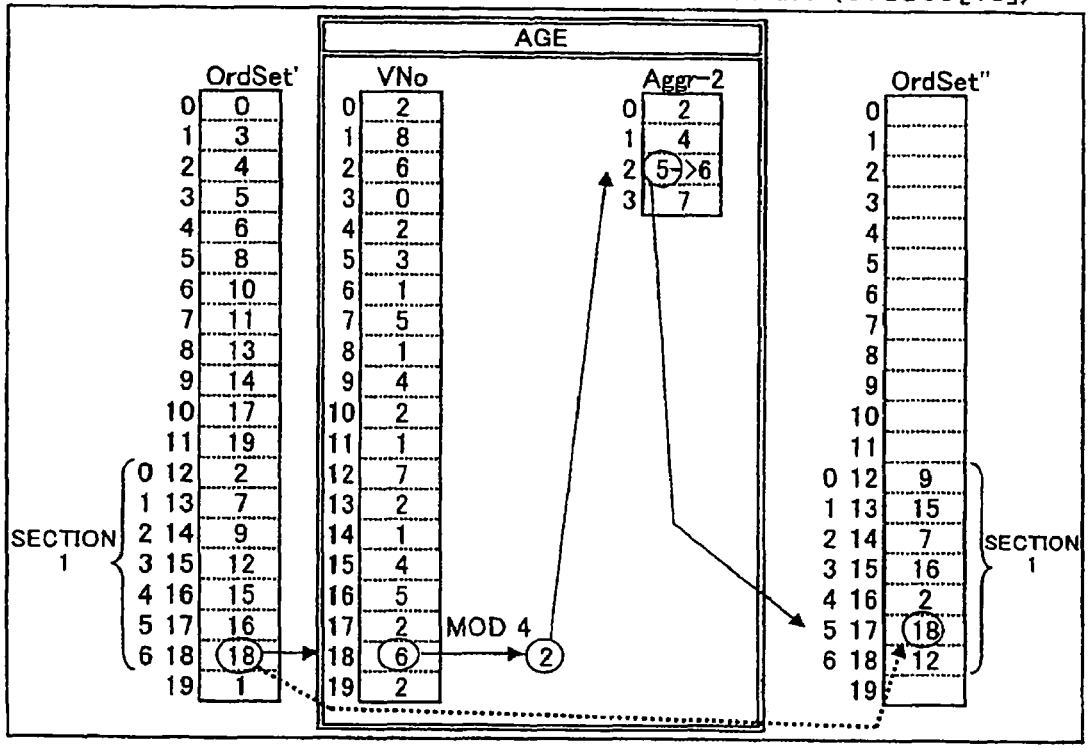

10 Computer System
12-1, 12-2, . . . , 12-p CPU
14 Shared Memory
16 ROM
18 Fixed Storage Device
20 CD-ROM Driver
22 I/F
24 Input Apparatus
26 Display Apparatus

The invention claimed is:

1. An information processing method of rearranging an order of records according to field values of the records in a predetermined field in a shared-memory multiprocessor system including a shared memory to store a record number array in which record numbers of table data records are stored according to a predetermined record order, a field value sequence number array in which field value sequence numbers corresponding to field values of the table data records in the predetermined field are stored in such a manner as to be associated with the record numbers, and a field value array in which the field values of the table data are stored according to an order of the field value sequence numbers corresponding to the field values, and further including n ($n \geq 1$) processors operable to access the shared memory, said information processing method comprising:

a step of selecting radix representation of the field value sequence numbers in response to a range of the field value sequence numbers; and a step of repeating sorting with respect to a digit of interest that is selected successively from a least significant digit to a most significant digit in the radix representation of the field value sequence numbers, by use of the record number array as a current record number array for a first time sorting and by use of a new record number array as a current record number array for a second time sorting and onward, wherein said sorting includes:

a step of dividing the current record number array into n1 ($n1 \leq n$) portions to allocate the divided portions of the current record number array to n1 processors among the n processors;

a step of counting, by each of the n1 processors, numbers of occurrences of values of the digit of interest of the field value sequence numbers associated with the record numbers contained in an allocated portion of the record number array;

a step of dividing a range of the values of the digit of interest of the field value sequence numbers into n2 ($n2 \leq n$) ranges to allocate the n2 divided ranges of the values of the digit of the field value sequence numbers to n2 processors among the n processors;

a step of converting, by each of the n2 processors, the respective numbers of occurrences of the values of the digit of interest of the field value sequence numbers counted by the n1 processors into cumulative numbers in an order of the values of the digit of interest of the field value sequence numbers where the values of the digit of interest of the field value sequence numbers are different from each other and in an order of the portions of the record number array where two or more processors have counted the numbers of occurrences of a common value of the digit of interest of the field value sequence numbers; and a step of utilizing, by each of the n1 processors, as pointers the cumulative numbers of the values of the digit of interest of the field value sequence numbers associated with the record numbers contained in the allocated portion of the record number array, thereby storing the record numbers contained in the allocated portion of the record number array in a new record number array.

2. An information processing method of rearranging an order of records according to field values of the records in a predetermined field in a shared-memory multiprocessor system including a shared memory to store a record number array in which record numbers of table data records are stored according to a predetermined record order, a field value sequence number array in which field value sequence numbers corresponding to field values of the table data records in the predetermined field are stored in such a manner as to be associated with the record numbers, and a field value array in which the field values of the table data are stored according to an order of the field value sequence numbers corresponding to the field values, and further including a plurality of processors operable to access the shared memory, said information processing method comprising:

a step of selecting radix representation of the field value sequence numbers in response to a range of the field value sequence numbers; and a step of repeating sorting with respect to a digit of interest that is selected successively from a least significant digit to a most significant digit in the radix representation of the field value sequence numbers, by use of the record number array as a current record number array for a first time sorting and by use of a new record number array as a current record number array for a second time sorting and onward, wherein said sorting includes:

a step of dividing the current record number array into portions to allocate the divided portions of the current record number array to the plurality of processors;

a step of counting, by each processor, numbers of occurrences of values of the digit of interest in the field value sequence numbers associated with the record numbers contained in an allocated portion of the record number array;

a step of converting, by at least one processor, the respective numbers of occurrences of the values of the digit of interest of the allocated field value sequence numbers into cumulative numbers in an order of the values of the digit of interest of the field value sequence numbers where the values of the digit of interest of the field value sequence numbers are different from each other and in an order of the portions of the record number array where two or more processors have counted the numbers of occurrences of a common value of the digit of interest of the field value sequence numbers; and a step of utilizing, by said each processor, as pointers the cumulative numbers of the values of the digit of interest in the field value sequence numbers associated with the record numbers contained in the allocated portion of the record number array, thereby storing the record numbers contained in the allocated portion of the record number array in the new record number array.

3. A shared-memory multiprocessor system comprising a shared memory and a plurality of processors operable to access the shared memory, wherein the shared memory stores a record number array in which record numbers of table data records are stored according to a predetermined record order, a field value sequence number array in which field value sequence numbers corresponding to field values of the table data records in the predetermined field are stored in such a manner as to be associated with the record numbers, and a field value array in which the field values of the table data are stored according to an order of the field value sequence numbers corresponding to the field values, and each of the processors includes:

a part to select radix representation of the field value sequence numbers in response to a range of the field value sequence numbers; and a part to repeat sorting by selecting a digit of interest successively from a least significant digit to a most significant digit in the radix representation of the field value sequence numbers, by use of the record number array as a current record number array for a first time sorting and by use of a new record number array as a current record number array for a second time sorting and onward, wherein said part to repeat sorting includes:

a part to determine a portion of the record number array that is to be processed by a corresponding processor; and a part to count numbers of occurrences of values of the digit of interest in the field value sequence numbers associated with the record numbers contained in the portion of the record number array, a part to determine a range of the values of the digit of interest in the field value sequence numbers that is to be processed by a corresponding processor;

a part to convert the respective numbers of occurrences of the values of the digit of interest of the allocated field value sequence numbers within the range processed by the corresponding processor into cumulative numbers in an order of the values of the digit of interest of the field value sequence numbers where the values of the digit of interest of the field value sequence numbers are different from each other and in an order of the portions of the record number array where two or more processors have counted the numbers of occurrences of a common value of the digit of interest of the field value sequence numbers; and a part to utilize as pointers the cumulative numbers of the values of the digit of interest in the field value sequence numbers associated with the record numbers contained in the portion of the record number array, thereby storing the record numbers contained in the portion of the record number array in a new record number array.

4. The shared-memory multiprocessor system as claimed in claim 3, wherein the cumulative numbers obtained by the part to convert the numbers of occurrences into the cumulative numbers in a processor processing an immediately preceding range of the digit of interest in the field value sequence numbers are referred to by the part to convert the numbers of occurrences into the cumulative numbers in a processor processing an immediately following range.

5. A shared-memory multiprocessor system comprising a shared memory and a plurality of processors operable to access the shared memory, wherein the shared memory stores a record number array in which record numbers of table data records are stored according to a predetermined record order, a field value sequence number array in which field value sequence numbers corresponding to field values of the table data records in the predetermined field are stored in such a manner as to be associated with the record numbers, and a field value array in which the field values of the table data are stored according to an order of the field value sequence numbers corresponding to the field values, and each of the processors includes:

a part to select radix representation of the field value sequence numbers in response to a range of the field value sequence numbers; and a part to repeat sorting by selecting a digit of interest successively from a least significant digit to a most significant digit in the radix representation of the field value sequence numbers, by use of the record number array as a current record number array for a first time sorting and by use of a new record number array as a current record number array for a second time sorting and onward, wherein said part to repeat sorting includes:

a part to determine a portion of the record number array that is to be processed by a corresponding processor; and a part to count numbers of occurrences of values of the digit of interest in the field value sequence numbers associated with the record numbers contained in the portion of the record number array, wherein the part to repeat sorting of at least one processor includes a part to convert the respective numbers of occurrences of the values of the digit of interest of the field value sequence numbers into cumulative numbers in an order of the values of the digit of interest of the field value sequence numbers where the values of the digit of interest of the field value sequence numbers are different from each other and in an order of the portions of the record number array where two or more processors have counted the numbers of occurrences of a common value of the digit of interest of the field value sequence numbers, and wherein said part to repeat sorting further includes a part to utilize as pointers the cumulative numbers of the values of the digit of interest in the field value sequence numbers associated with the record numbers contained in the portion of the record number array, thereby storing the record numbers contained in the portion of the record number array in the new record number array.

* * * * *